US009261758B2

(12) United States Patent
Kuwata

(10) Patent No.: US 9,261,758 B2
(45) Date of Patent: Feb. 16, 2016

(54) PROJECTION OPTICAL SYSTEM AND PROJECTION-TYPE IMAGE DISPLAY APPARATUS

(71) Applicant: Muneharu Kuwata, Tokyo (JP)
(72) Inventor: Muneharu Kuwata, Tokyo (JP)
(73) Assignee: Mitsubishi Electric Corporation, Tokyo (JP)
(*) Notice: Subject to any disclaimer, the term of this patent is extended or adjusted under 35 U.S.C. 154(b) by 0 days.
(21) Appl. No.: 14/362,077
(22) PCT Filed: Nov. 27, 2012
(86) PCT No.: PCT/JP2012/080573
§ 371 (c)(1),
(2) Date: May 30, 2014
(87) PCT Pub. No.: WO2013/080953
PCT Pub. Date: Jun. 6, 2013
(65) Prior Publication Data
US 2014/0340654 A1 Nov. 20, 2014
(30) Foreign Application Priority Data
Dec. 1, 2011 (JP) ................................. 2011-263628
(51) Int. Cl.
G03B 21/14 (2006.01)
G02B 13/16 (2006.01)
(52) U.S. Cl.
CPC .............. G03B 21/142 (2013.01); G02B 13/16 (2013.01); G03B 21/147 (2013.01)
(58) Field of Classification Search
CPC .... G03B 21/142; G03B 21/28; G03B 21/147; G02B 15/17; G02B 13/16
USPC .............. 353/69, 79, 100, 101, 102, 121, 122
See application file for complete search history.
(56) References Cited
U.S. PATENT DOCUMENTS
5,642,229 A 6/1997 Kaneko et al.
6,084,719 A 7/2000 Sugawara et al.
(Continued)

FOREIGN PATENT DOCUMENTS
CN 101162354 A 4/2008
CN 101414049 A 4/2009
(Continued)

OTHER PUBLICATIONS
Japanese Office Action issued in Japanese Patent Application No. 2013-547155 dated Feb. 18, 2014.

Primary Examiner — William C Dowling
(74) Attorney, Agent, or Firm — Birch, Stewart, Kolasch & Birch, LLP

(57) ABSTRACT

A projection-type image display apparatus includes a display device and a projection optical system. The projection optical system includes a first lens group having a positive power as a whole, and a second lens group having a negative power as a whole. The second lens group includes a first lens and a second lens in an order from the display device side, both of which have negative powers. When the first lens is moved toward the display device and the second lens is moved away from the display device with reference to positions of the first lens and the second lens in a direction of an optical axis when an image surface is planar, a focal position of the peripheral light becomes closer to the projection optical system in the direction of the optical axis than a focal position of the on-axis light, and the image surface is made concave to the projection optical system side. Further, when the first lens is moved away from the display device and the second lens is moved toward the display device, the focal position of the on-axis light becomes closer to the projection optical system in the direction of the optical axis than the focal position of the peripheral light, and the image surface is made convex to the projection optical system side. In this way, a curvature of the image surface formed by the projection optical system is changed.

20 Claims, 43 Drawing Sheets

(56) References Cited

U.S. PATENT DOCUMENTS

| | | | |
|---|---|---|---|
| 6,888,682 B2* | 5/2005 | Kawakami | G02B 15/177 353/101 |
| 7,215,477 B2* | 5/2007 | Yamasaki | G02B 15/14 353/101 |
| 7,857,462 B2* | 12/2010 | Hisada | G03B 21/28 353/101 |
| 8,228,613 B2* | 7/2012 | Sado | G02B 15/177 353/101 |
| 8,328,369 B2* | 12/2012 | Amano | G02B 15/177 353/101 |
| 8,408,717 B2* | 4/2013 | Hirata | H04N 9/317 353/101 |
| 2005/0280780 A1 | 12/2005 | Matsumoto et al. | |
| 2007/0091456 A1* | 4/2007 | Yamamoto | G02B 15/177 359/680 |
| 2008/0151380 A1 | 6/2008 | Togino | |
| 2008/0212038 A1 | 9/2008 | Hirata et al. | |
| 2009/0009878 A1 | 1/2009 | Inoko | |
| 2009/0033881 A1 | 2/2009 | Mihara et al. | |
| 2010/0046088 A1 | 2/2010 | Kuboto | |
| 2010/0079733 A1* | 4/2010 | Lu | G02B 13/06 353/69 |
| 2011/0013151 A1* | 1/2011 | Nagahara | G02B 15/177 353/101 |
| 2011/0026132 A1* | 2/2011 | Sado | G02B 13/16 359/682 |
| 2011/0267586 A1* | 11/2011 | Tsai | G02B 13/16 353/20 |
| 2014/0002802 A1* | 1/2014 | Hsu | G02B 17/08 353/69 |

FOREIGN PATENT DOCUMENTS

| | | |
|---|---|---|
| JP | 62-148914 A | 7/1987 |
| JP | 3-196009 A | 8/1991 |
| JP | 6-082689 A | 3/1994 |
| JP | 7-063987 A | 3/1995 |
| JP | 11-142731 A | 5/1999 |
| JP | 2002-258396 A | 9/2002 |
| JP | 2004-333688 A | 11/2004 |
| JP | 2004-354405 A | 12/2004 |
| JP | 20096-005534 A | 1/2006 |
| JP | 2006-330353 A | 12/2006 |
| JP | 2007-017813 A | 1/2007 |
| JP | 2007-041607 A | 2/2007 |
| JP | 2007-114397 A | 5/2007 |
| JP | 2009-014905 A | 1/2009 |
| JP | 2009-036884 A | 2/2009 |
| JP | 2010-278840 A | 12/2010 |
| JP | 2011-107238 A | 6/2011 |
| TW | M394466 U1 | 12/2010 |

* cited by examiner

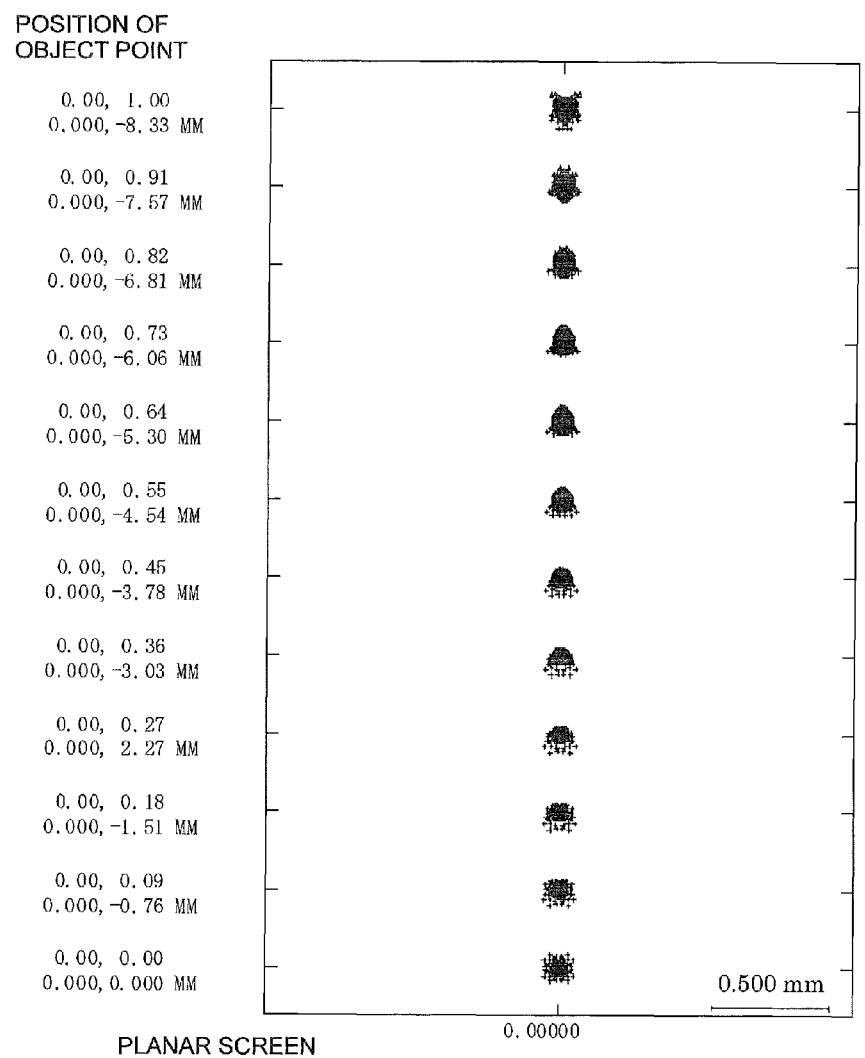

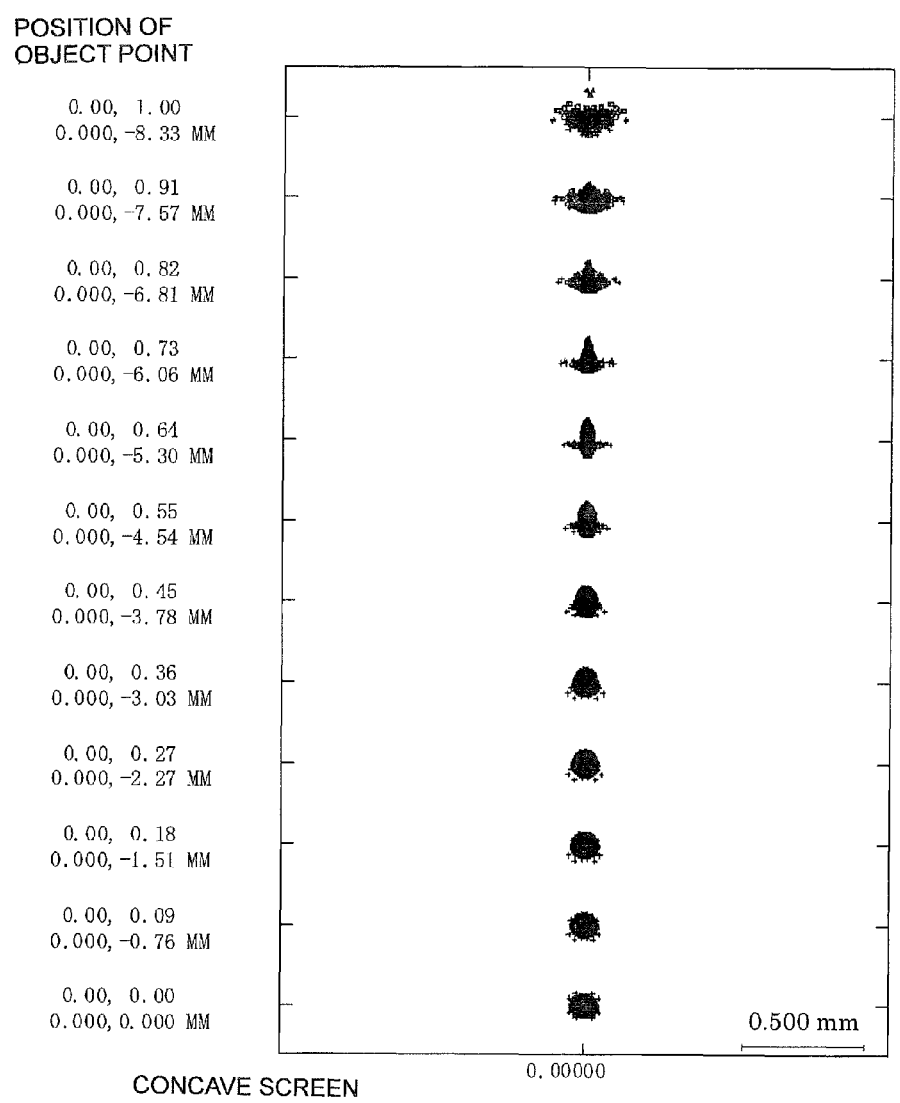

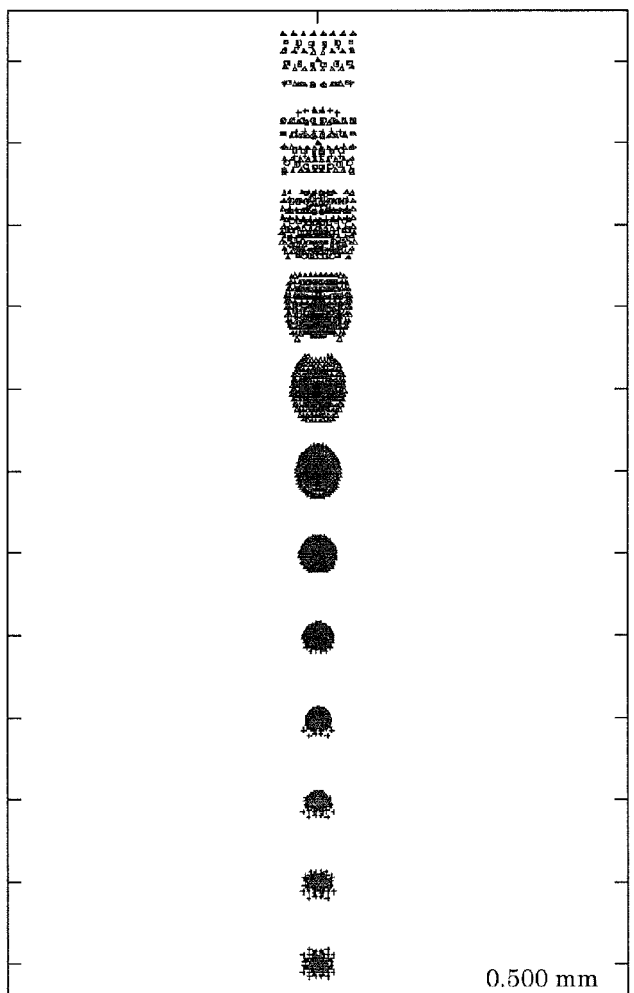

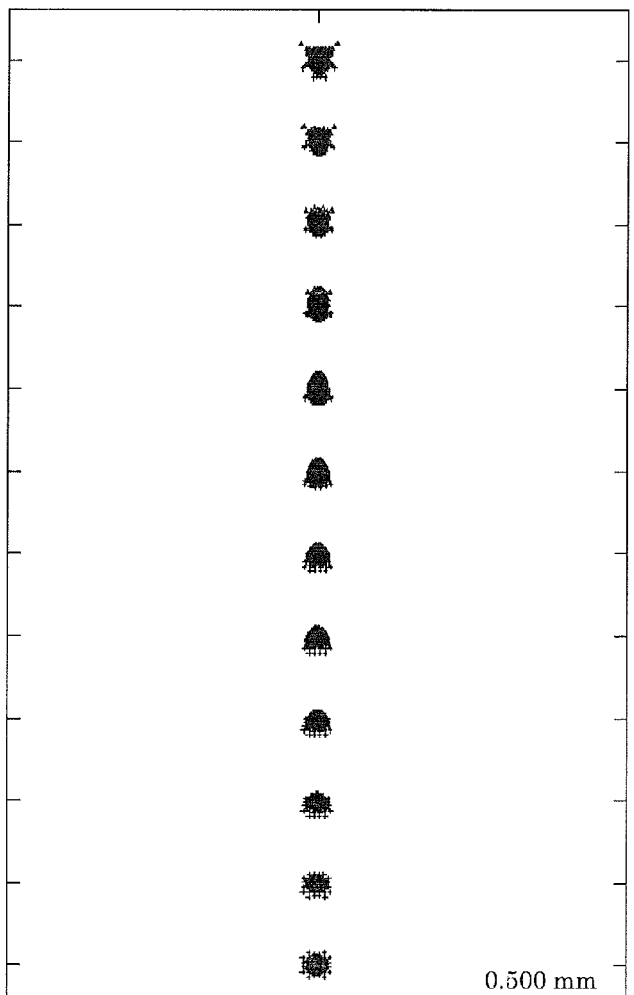

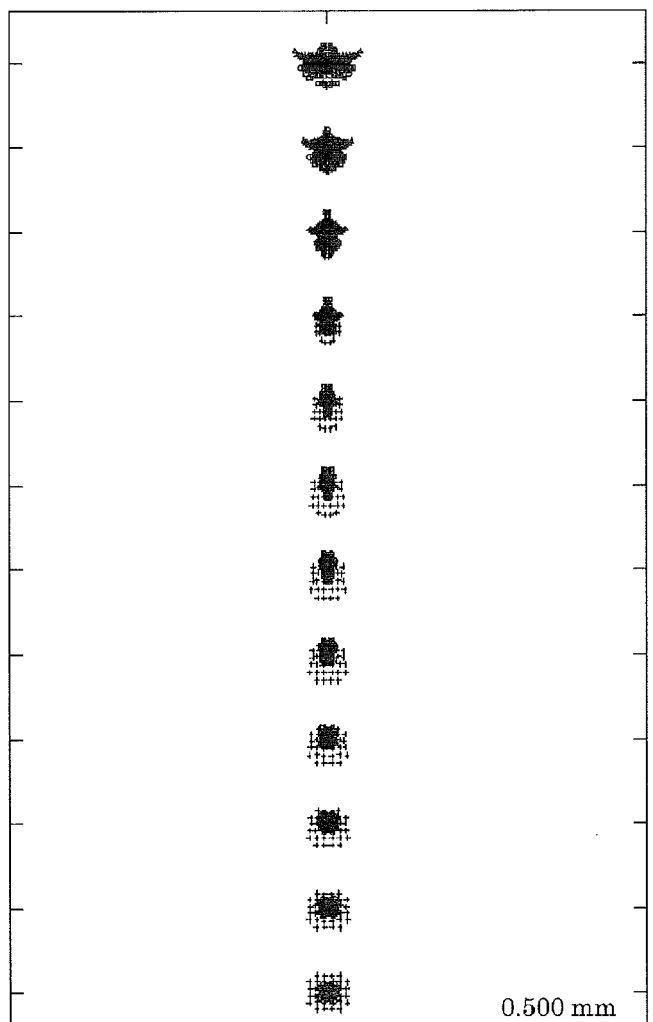

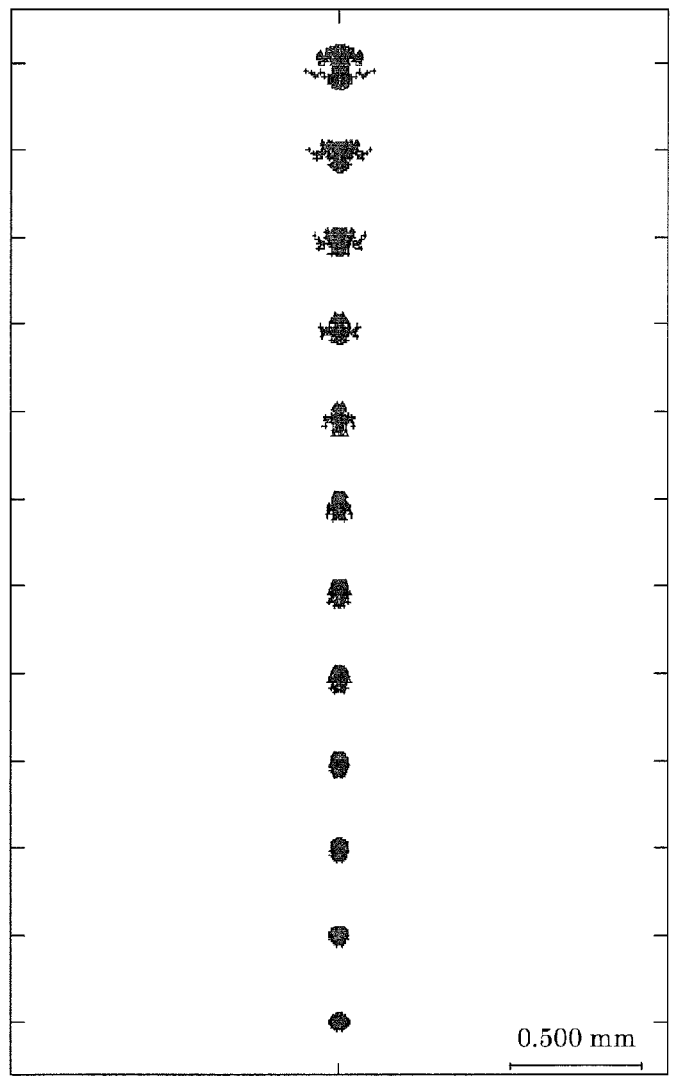

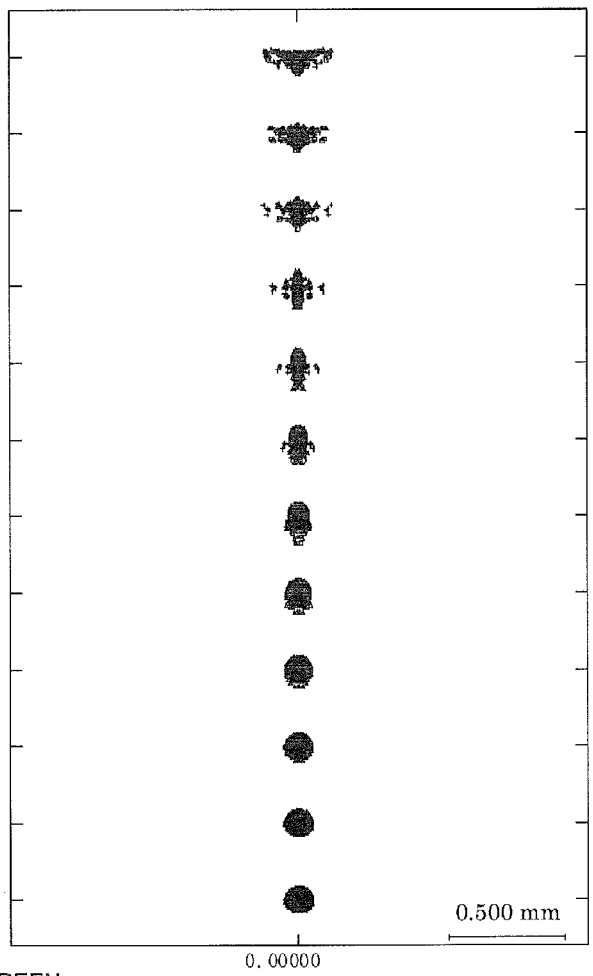

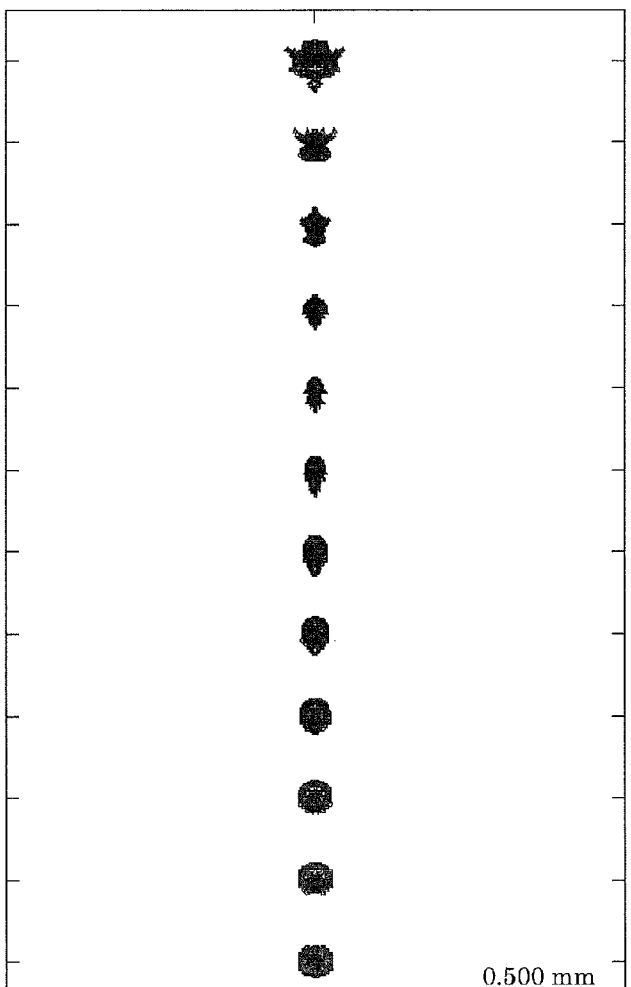

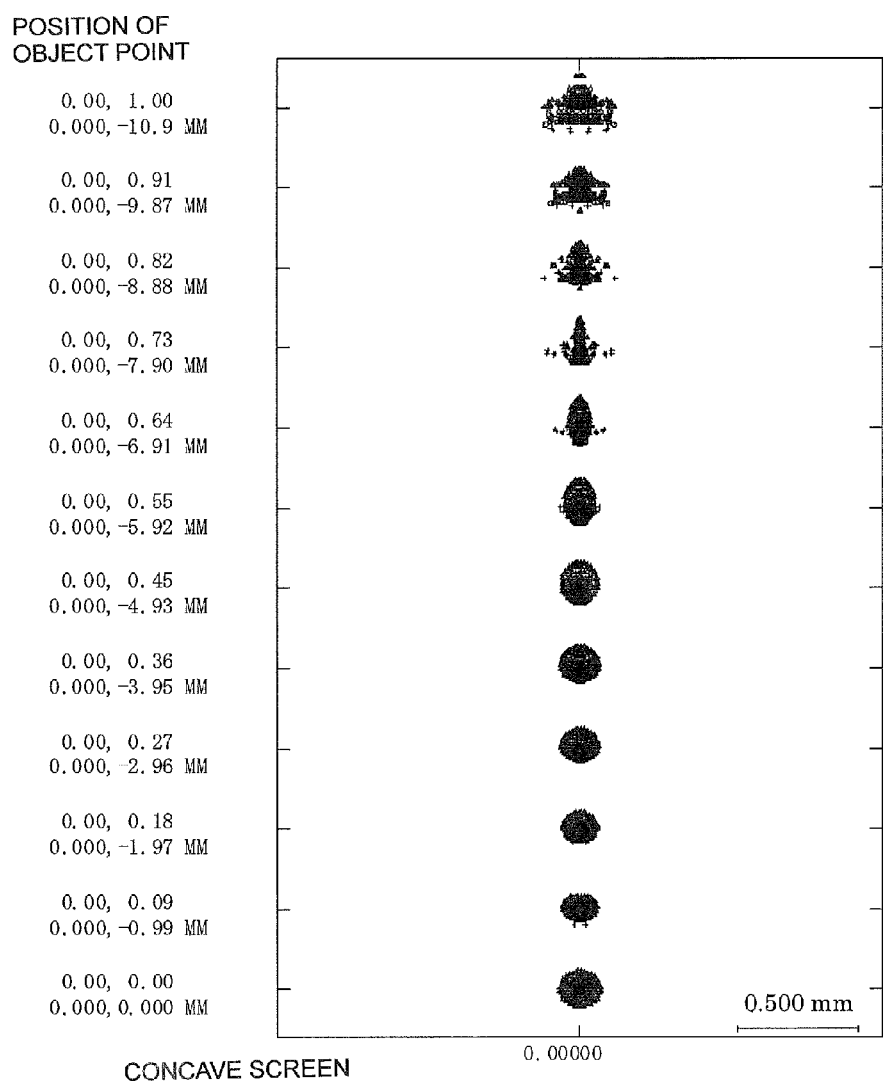

PROJECTION OPTICAL SYSTEM AND PROJECTION-TYPE IMAGE DISPLAY APPARATUS

TECHNICAL FIELD

The present invention relates to a projection-type image display apparatus capable of displaying an image on a planar surface, a curved surface or the like, and relates to a projection optical system of the projection-type image display apparatus.

BACKGROUND ART

In the field of image display apparatuses, it has been conventionally studied to project an image on a curved screen in order to obtain a high realistic feeling. Recently, regarding an image display apparatus for use in vehicle, there is a demand for an image display apparatus capable of displaying an image on a curved surface so as to match an interior of the vehicle.

In this regard, image display apparatuses using a liquid crystal or an organic EL (Electro-Luminescence) have difficulty in displaying an image on a curved surface other than a cylindrical surface because of constraints in manufacturing. In contrast, a projection-type image display apparatus is able to display an image on a curved surface other than a cylindrical surface, and therefore is advantageous in remarkably enhancing a degree of design freedom of the interior of the vehicle.

For example, Patent Document 1 discloses a projection apparatus that projects a two-dimensional image of an object on a hemispherical surface.

PRIOR ART DOCUMENT

Patent Document

Patent Document 1: Japanese Laid-Open Patent Publication No. 2006-330353 (see FIGS. 1 and 15)

SUMMARY OF THE INVENTION

Problem to be Solved by the Invention

However, in the projection apparatus disclosed in Patent Document 1, a curved shape of a screen is limited within a range of focal depth with respect to the hemispherical surface. Therefore, when a demanded screen shape is changed, it is necessary to provide an exclusive projection apparatus corresponding to the demanded screen shape, and therefore there is a lack of versatility.

The present invention is intended to solve the above described problems, and an object of the present invention is to provide a projection-type image display apparatus capable of conforming to screens having various shapes.

Means of Solving the Problem

A projection-type image display apparatus according to the present invention includes a display device that generates image light, and a projection optical system that projects the image light generated by the display device on a screen in an enlarged scale. The projection optical system includes a first lens group having a positive power as a whole, and a second lens group having a negative power as a whole. The second lens group includes a first lens and a second lens in an order from the display device side, and both of the first lens and the second lens have negative powers. Of image light, light emitted from an intersection between the display device and an optical axis of the projection optical system is referred to as on-axis light, and light emitted from a periphery of the display device is referred to as peripheral light. An image surface is formed by the projection optical system. When the first lens is moved toward the display device and the second lens is moved away from the display device with reference to positions of the first lens and the second lens in a direction of the optical axis when the image surface is planar, a focal position of the peripheral light becomes closer to the projection optical system in the direction of the optical axis than a focal position of the on-axis light, and the image surface is made concave to the projection optical system side. When the first lens is moved away from the display device and the second lens is moved toward the display device with reference to the positions of the first lens and the second lens in the direction of the optical axis when the image surface is planar, the focal position of the on-axis light becomes closer to the projection optical system in the direction of the optical axis than the focal position of the peripheral light, and the image surface is made convex to the projection optical system side. A curvature of the image surface is changed by making the image surface convex or concave.

Further, a projection-type image display apparatus according to the present invention includes a display device that generates image light, and a projection optical system that projects the image light generated by the display device on a screen in an enlarged scale. The projection optical system includes a first lens group including at least one lens and having a positive power as a whole, and a second lens group including at least one lens and having a negative power as a whole, in an order from the display device side toward the screen side. A curvature of an image surface formed by the projection optical system is changed by adjusting a position of at least one lens among respective lenses constituting the first lens group and the second lens group in a direction of an optical axis. When the image surface is concave to the projection optical system side, a focal position of on-axis light is located on a side opposite to the second lens with reference to a focal position of the on-axis light when the image surface is planar. When the image surface is convex to the projection optical system side, the focal position of the on-axis light is located on the same side as the second lens with reference to the focal position of the on-axis light when the image surface is planar.

A projection optical system according to the present invention is a projection optical system that projects image light generated by a display device on a screen in an enlarged scale. The projection optical system includes a first lens group having a positive power as a whole, and a second lens group having a negative power as a whole. The second lens group includes a first lens and a second lens in an order from the display device side, and both of the first lens and the second lens have negative powers. Of image light, light emitted from an intersection between the display device and an optical axis of the projection optical system is referred to as on-axis light, and light emitted from a periphery of the display device is referred to as peripheral light. An image surface is formed by the projection optical system. When the first lens is moved toward the display device and the second lens is moved away from the display device with reference to positions of the first lens and the second lens in a direction of the optical axis when the image surface is planar, a focal position of the peripheral light becomes closer to the projection optical system in the direction of the optical axis than a focal position of the on-axis light, and the image surface is made concave to the projection optical system side. When the first lens is moved away from the display device and the second lens is moved toward the display device with reference to the positions of the first lens and the second lens in the direction of the optical axis when the image surface is planar, the focal position of the on-axis light becomes closer to the projection optical system in the direction of the optical axis than the focal position of the peripheral light, and the image surface is made convex to the projection optical system side. A curvature of the image surface is changed by making the image surface convex or concave.

Further, a projection optical system according to the present invention is a projection optical system that projects image light generated by a display device on a screen in an enlarged scale. The projection optical system includes a first lens group including at least one lens and having a positive power as a whole, and a second lens group including at least one lens and having a negative power as a whole, in an order from the display device side toward the screen side. A curvature of an image surface formed by the projection optical system is changed by adjusting a position of at least one lens among respective lenses constituting the first lens group and the second lens group in a direction of an optical axis. When the image surface is concave to the projection optical system side, a focal position of on-axis light is located on a side opposite to the second lens with reference to a focal position of the on-axis light when the image surface is planar. When the image surface is convex to the projection optical system side, the focal position of the on-axis light is located on the same side as the second lens with reference to the focal position of the on-axis light when the image surface is planar.

Effect of the Invention

According to the present invention, a projection optical system and a projection-type image display apparatus capable of conforming to various screen shapes can be provided.

BRIEF DESCRIPTION OF DRAWINGS

FIG. 11A is a diagram showing a spot diagram when the screen has a planar shape in Embodiment 2.

FIG. 11B is a diagram showing a spot diagram when the screen has a concave shape in Embodiment 2.

FIG. 12 is a diagram showing a spot diagram of a reference example with respect to Embodiment 1.

FIG. 18A is a diagram showing a spot diagram when the screen has the planar shape in Embodiment 3.

FIG. 18C is a diagram showing a spot diagram when the screen has the convex shape in Embodiment 3.

FIG. 28A is a diagram showing a spot diagram when the screen has the planar shape in Embodiment 4.

FIG. 28B is a diagram showing a spot diagram when the screen has the concave shape in Embodiment 4.

FIG. 28C is a diagram showing a spot diagram when the screen has the convex shape in Embodiment 4.

FIG. 35B is a diagram showing a spot diagram when the screen has the concave shape in Embodiment 5.

MODE FOR CARRYING OUT THE INVENTION

Embodiment 1

Figure 1:
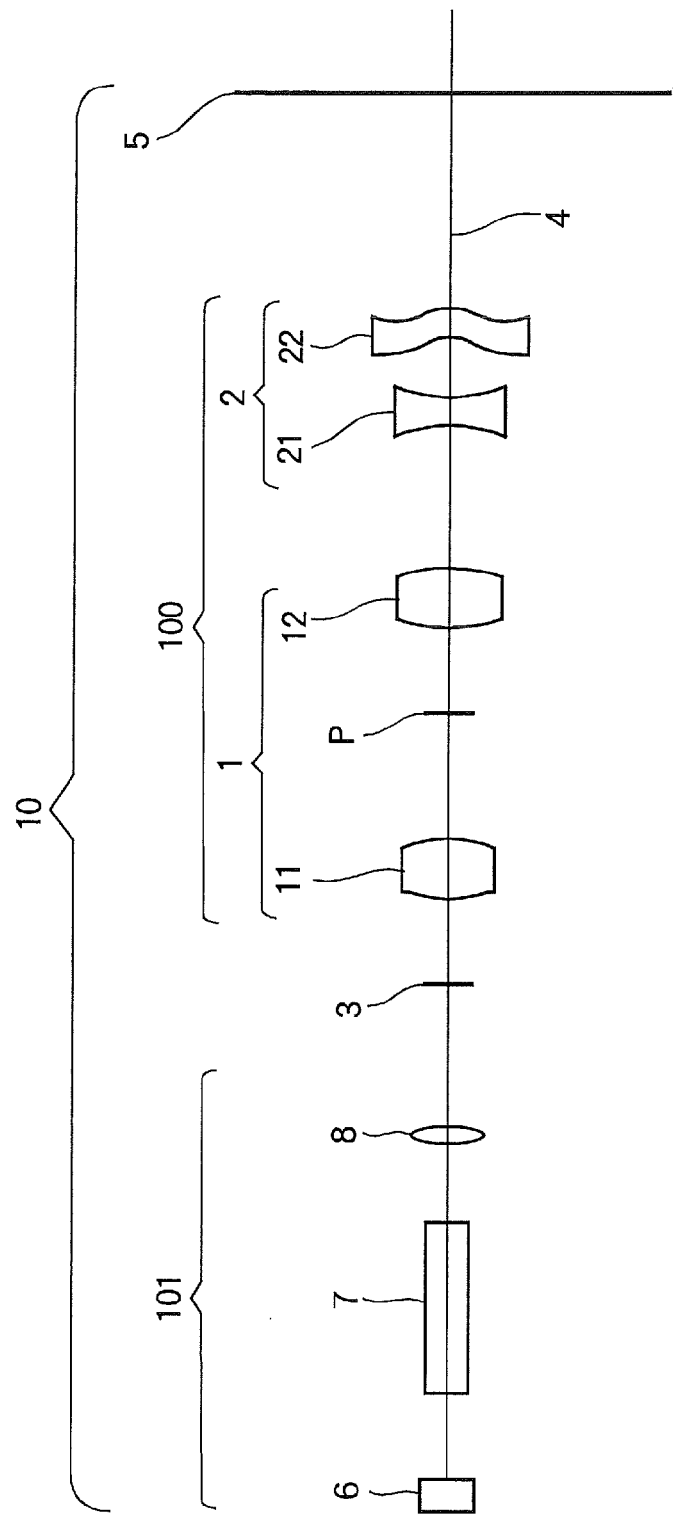
FIG. 1 is a diagram showing a configuration of a projection-type image display apparatus according to Embodiment 1 of the present invention.

FIG. 1 is a diagram showing a configuration of a projection-type image display apparatus 10 according to Embodiment 1 of the present invention. The projection-type image display apparatus 10 shown in FIG. 1 includes an illumination optical system 101 that emits light, a display device 3 that receives the light emitted from the illumination optical system 101 and emits image light, and a projection optical system 100 that projects the image light emitted by from the display device 3 on a screen 5 in an enlarged scale.

The illumination optical system 101 includes a light source 6, a light uniformizing element 7 that uniformizes intensity distribution of light emitted from the light source 6 in a cross section perpendicular to an optical axis, and an illumination optical element (i.e., a relay optical element) 8 that guides the light emitted from the light uniformizing element 7 to the display device 3.

The light source 6 is composed of, for example, an ultra-high pressure mercury lamp, an LED (light emitting diodes), a laser or the like. The light uniformizing element 7 is composed of, for example, a rod integrator in the form of a rectangular column, a hollow light pipe, a fly-eye integrator or the like. The illumination optical element 8 is configured to irradiate a predetermined area of the display device 3 at a predetermined angle with light having intensity distribution uniformized by the light uniformizing element 7. The illumination optical element 8 is composed of, for example, a lens, a mirror or the like.

The display device 3 is composed of, for example, a DLP (Digital Light Processing) chip, a transmission-type liquid crystal, a reflection-type liquid crystal or the like.

The projection optical system 100 includes a first lens group 1 having a positive power as a whole, and a second lens group 2 having a negative power as a whole. Numeral 4 indicates an optical axis of the projection optical system 100. The optical axis 4 defines an optical axis of the entire projection-type image display apparatus 10. Here, the projection optical system 100 is configured to be substantially telecentric on the display device 3 side.

The first lens group 1 includes a lens 11 and a lens both of which have positive powers. The second lens group 2 includes a lens 21 (i.e., a first lens) and a lens 22 (i.e., a second lens) both of which have negative powers. A pupil P is provided between the lens 11 and lens 12.

The lens 21 and lens 22 of the second lens group 2 are respectively movable in a direction of the optical axis (i.e. a direction of the optical axis 4). In this regard, the term "movable" is used to mean that positions of the lens 21 and lens 22 are respectively adjustable in the direction of the optical axis. The positions of the lens 21 and lens 22 are respectively adjusted and determined so as to form a desired image surface as described below.

The screen 5 is, for example, a combination of a Fresnel screen that deflects the image light projected by the projection optical system 100 toward an observer, and a lenticular lens for widening a viewing angle and constituted by arranging, for example, a large number of semi-cylindrical lenses. In this regard, a size of the screen 5 is, for example, 10 inches (221 mm×125 mm) through 20 inches (443 mm×249 mm), but is not limited thereto.

The intensity distribution of the light emitted from the light source 6 is uniformized by the light uniformizing element 7, and a beam shape of the light is shaped in accordance with a shape of the display device 3, so that illumination light is generated. The illumination light is incident on the display device 3 via the illumination optical element 8. The light irradiated on the display device 3 is spatially modulated by the display device 3, and the image light is generated. The image light generated by the display device 3 is projected by the projection optical system 100 in an enlarged scale, and an image is displayed on the screen 5.

If the DLP chip is used as the display device 3, a total reflection prism may be disposed between the display device 3 and the lens 11 in order to separate a light path of the illumination light for illuminating the display device 3 and a light path of the image light generated by the display device 3. If the reflective-type liquid crystal is used as the display device 3, a polarizing prism or a wire-grid polarizer plate may be disposed, for example, between the display device 3 and the lens 11 in order to separate the light path of the illumination light and the light path of the image light. It is also possible to employ a three plate method in which three display devices 3 are used, and image lights generated by the respective display devices 3 are synthesized using an X prism (i.e., a dichroic prism).

Generally, a projection optical system used in the projection-type image display apparatus is required to have a wide view angle in order to shorten a projection distance. Therefore, in the projection optical system 100, the first lens group 1 having a positive power for converging the image light from the display device 3, and the second lens group 2 having a negative power for widening the view angle are arranged in an order from the display device 3 side.

The image light generated by the display device 3 is refracted and converged by the lens 11 having a positive power, and the pupil P is formed. The light diverged from the pupil P is refracted and converged by the lens 12 having a positive power. The light from the lens 12 is largely diverged by the lens 21 and lens 22 of the second lens group 2. In order to correct distortion at the wide view angle, it is preferred that the lens 22 having a large light ray height from the optical axis 4 has an aspherical surface.

Figure 2:
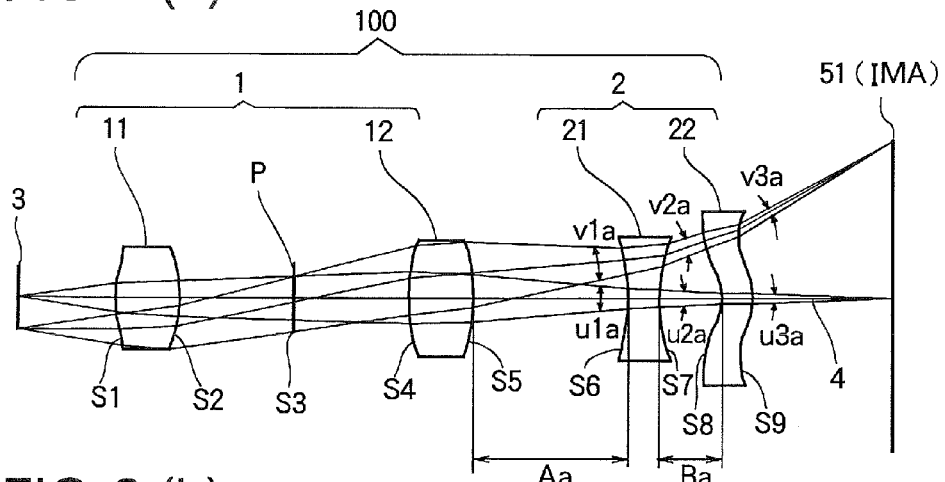
FIGS. 2(a), 2(b) and 2(c) are diagrams showing operations in which a projection optical system according to Embodiment 1 projects image light on screens having a planar shape, a concave shape and a convex shape.
Figure 2:
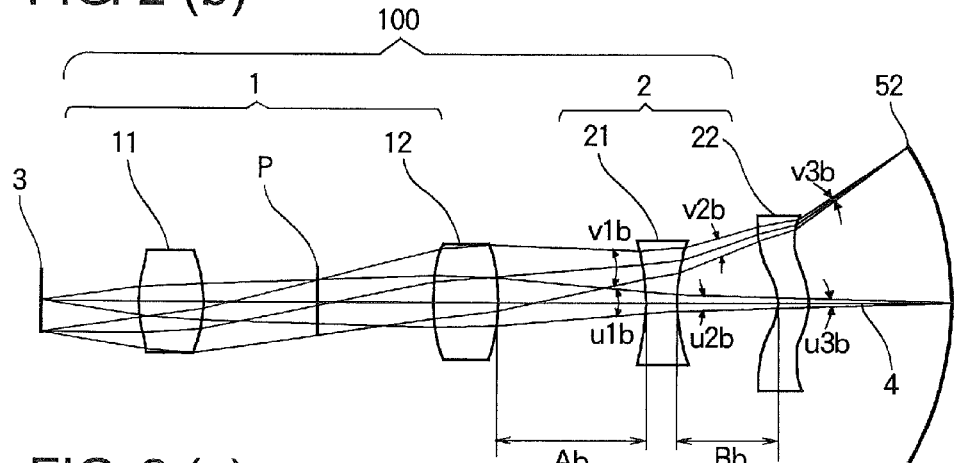
Figure 2:
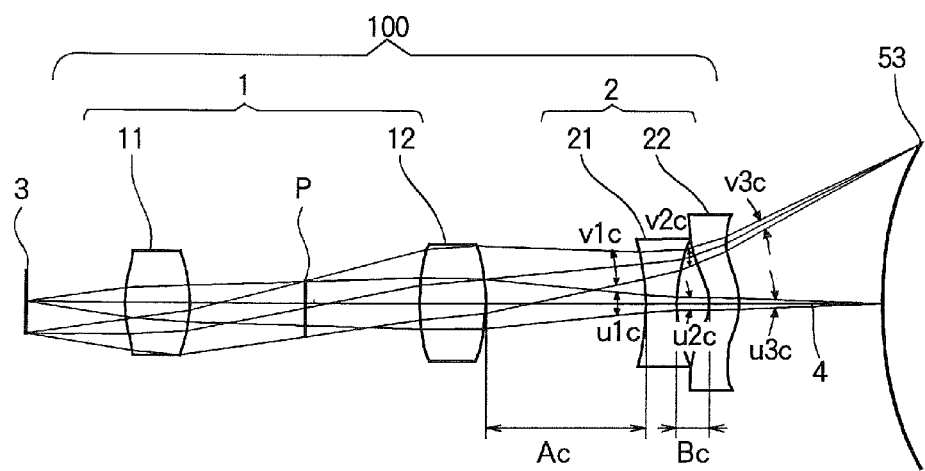

FIG. 2 is a diagram for illustrating functions of the projection optical system 100. FIG. 2(a) shows a case where the image light from the display device 3 is projected on a screen 51 having a planar shape. FIG. 2(b) shows a case where the image light from the display device 3 is projected on a screen 52 having a concave shape on the projection optical system 100 side. FIG. 2(c) shows a case where the image light from the display device 3 is projected on a screen 53 having a convex shape on the projection optical system 100 side.

In this embodiment, positions of the lens 21 and the lens 22 of the second lens group 2 in the direction of the optical axis are adjusted according to the shapes of the screen 5 (planar, concave and convex). Therefore, a distance (Aa, Ab, Ac) between the lens 12 and the lens 21 and a distance (Ba, Bb, Bc) between the lens 21 and the lens change, while the shape of each lens is the same throughout FIGS. 2(a), 2(b) and 2(c).

In FIG. 2(a), light emitted from an intersection between the display device 3 and the optical axis 4 (referred to as on-axis light) is refracted by the first lens group 1, and then is incident on the lens 21 of the second lens group 2. A divergent angle of the on-axis light incident on the lens 21 is expressed as uta. A divergent angle of the on-axis light emitted from the lens 21 (equal to a divergent angle of the on-axis light incident on the lens 22) is expressed as u2a. A divergent angle of the on-axis light emitted from the lens 22 is expressed as u3a.

In FIG. 2(a), light emitted from a periphery of the display device 3 (referred to as peripheral light) is refracted by the first lens group 1, and then is incident on the lens 21. A divergent angle of the peripheral light incident on the lens 21 is expressed as v1a. A divergent angle of the peripheral light emitted from the lens 21 (equal to a divergent angle of the peripheral light incident on the lens 22) is expressed as v2a. A divergent angle of the peripheral light emitted from the lens 22 is expressed as v3a.

As is apparent from the figure, both of the on-axis light and the peripheral light become convergent light after passing the first lens group 1. The "divergent angle" of the convergent light indicates a divergent angle as seen from a focus spot side. Further, the divergent angle of the convergent light may also be referred to as "convergent angle".

Similarly, in FIG. 2(b), a divergent angle of the on-axis light incident on the lens 21 is expressed as u1b. A divergent angle of the on-axis light emitted from the lens 21 is expressed as u2b. A divergent angle of the on-axis light emitted from the lens 22 is expressed as u3b. A divergent angle of the peripheral light incident on the lens 21 is expressed as v1b. A divergent angle of the peripheral light emitted from the lens 21 is expressed as v2b. A divergent angle of the peripheral light emitted from the lens 22 is expressed as v3b.

Similarly, in FIG. 2(c), a divergent angle of the on-axis light incident on the lens 21 is expressed as u1c. A divergent angle of the on-axis light emitted from the lens 21 is expressed as u2c. A divergent angle of the on-axis light emitted from the lens 22 is expressed as u3c. A divergent angle of the peripheral light incident on the lens 21 is expressed as v1c. A divergent angle of the peripheral light emitted from the lens 21 is expressed as v2c. A divergent angle of the peripheral light emitted from the lens 22 is expressed as v3c.

The first lens group 1 (i.e., the lenses 11 and 12) does not move, and therefore the divergent angle of the light incident on the lens 21 from the lens 12 is the same throughout the FIGS. 2(a), 2(b) and 2(c) (in other words, u1a=u1b=u1c, and v1a=v1b=v1c).

In FIGS. 2(a) through 2(c), the distances Aa, Ab and Ac between the lens 12 and the lens 21, and the distances Ba, Bb and Bc between the lens 21 and the lens 22 satisfy the following expressions (1) and (2):

$$Ac > Aa > Ab \quad (1)$$

$$Bb > Ba > Bc \quad (2)$$

In addition, the divergent angles u1a, u1b, u1c, u2a, u2b, u2c, u3a, u3b and u3c of the on-axis light, and the divergent angles v1a, v1b, v1c, v2a, v2b, v2c, v3a, v3b and v3c of the peripheral light satisfy the following expressions (3) through (14).

$$u1a = u1b = u1c \quad (3)$$

$$u2c > u2a > u2b \quad (4)$$

$$u3c > u3a > u3b \quad (5)$$

$$v1a = v1b = v1c \quad (6)$$

$$v2c > v2a > v2b \quad (7)$$

$$v3c > v3a > v3b \quad (8)$$

$$u1a - u2a > v1a - v2a \quad (9)$$

$$u1b - u2b > v1b - v2b \quad (10)$$

$$u1c - u2c > v1c - v2c \quad (11)$$

$$(u1c - u2c) - (v1c - v2c) > (u1a - u2a) - (v1a - v2a) > (u1b - u2b) - (v1b - v2b) \quad (12)$$

$$(v2c - v3c) - (u2c - u3c) > (v2a - v3a) - (u2a - u3a) > (v2b - v3b) - (u2b - u3b) \quad (13)$$

$$(v1c - v3c) - (u1c - u3c) > (v1a - v3a) - (u1a - u3a) > (v1b - v3b) - (u1b - u3b) \quad (14)$$

With reference to a case where the image light is projected on the screen 51 having the planar shape (FIG. 2(a)), when the image light is projected on the screen 52 having the concave shape (FIG. 2(b)), the lens 21 is located closer to the lens 12. In contrast, when the image light is projected on the screen 53 having the convex shape (FIG. 2(c)), the lens 21 is located farther from the lens 12 (expression (1)).

In other words, the lens 21 moves toward the display device 3 during a change from a state shown in FIG. 2(a) to a state shown in FIG. 2(b). The lens 21 moves toward the screen 5 during a change from the state shown in FIG. 2(a) to a state shown in FIG. 2(c).

Further, with reference to the state of FIG. 2(a), the lens 22 is located farther from the lens 21 in FIG. 2(b). In contrast, the lens 22 is located closer to the lens 21 in FIG. 2(c) (expression (2)).

In other words, the lens 22 moves toward the screen 5 during the change from the state shown in FIG. 2(a) to the state shown in FIG. 2(b). The lens 22 moves toward the display device 3 during the change from the state shown in FIG. 2(a) to the state shown in FIG. 2(c).

In FIGS. 2(a) through 2(c), as the on-axis light and the peripheral light pass sequentially through the lens 21 and the lens 22 both having negative powers, the divergent angles of the on-axis light and the peripheral light gradually decrease. Therefore, the view angle can be widened, and a ratio of the projection distance to a screen size can be reduced.

Here, a difference between a divergent angle of light incident on a lens and a divergent angle of light emitted from the lens is expressed as a divergence power of the lens. The lens 21 has a larger divergence power for the on-axis light than for the peripheral light (expressions (9) through (11)). Hereinafter, the shapes of the image surface formed by the projection optical system 100 will be described.

First, in FIG. 2(a), the on-axis light and the peripheral light having passed through the lenses 21 and 22 are focused on the screen 51 having the planar shape.

In FIG. 2(b), the lens 21 is located closer to the lens 12 as compared with FIG. 2(a), and therefore the peripheral light is incident on the lens 21 at a position closer to the optical axis 4. Therefore, as compared with FIG. 2(a), the divergence power of the lens 21 for the peripheral light becomes larger relative to the divergence power for the on-axis light. As a result, in FIG. 2(b), a difference between the divergence powers of the lens 21 for the on-axis light and for the peripheral light becomes smaller than in FIG. 2(a) (expression (12)). Further, as compared with FIG. 2(a), the lens 22 is located farther from the lens 21 in FIG. 2(b), and therefore the peripheral light is incident on the lens 22 at a position farther from the optical axis 4.

As compared with FIG. 2(a), the lens 22 has a shape such that the divergence power for the peripheral light becomes smaller in FIG. 2(b). The divergence power of the lens 22 for the on-axis light is smaller than for the peripheral light, but there is little difference between the divergence powers in FIG. 2(a) and FIG. 2(b). Therefore, as compared with FIG. 2(a), a difference between the divergence powers of the lens 22 for the on-axis light and for the peripheral light becomes smaller in FIG. 2(b) (expression (13)).

From the above, a difference between the divergence powers of a combination of the lens 21 and the lens 22 for the on-axis light and for the peripheral light becomes smaller in FIG. 2(b) than in FIG. 2(a) (expression (14)). In other words, in FIG. 2(b), the focal position of the peripheral light shifts toward the lens 22 (i.e., to the left in the figure) with reference to the focal position of the on-axis light as compared with FIG. 2(a). As a result, the image surface formed by the projection optical system 100 of the display device 3 becomes the concave shape to the projection optical system 100 side as a whole.

In this way, by moving the lenses 21 and 22 as shown in FIG. 2(b), the image surface formed by the projection optical system 100 changes from the planar shape to the concave shape. In other words, regarding the image light emitted from the projection optical system 100, the focal position of the peripheral light is closer to the projection optical system 100 (on the optical axis 4) than the focal position of the on-axis light is to the projection optical system 100.

In this regard, it is conceived that even when the divergence power becomes small, the image surface may be formed on a position far from the lens 22 (i.e., the right side in the figure) if a spot size of light incident on the lens 22 (i.e., a cross sectional area of the incident light at an incident surface of the lens) is large. However, the lens 22 is farther from the lens 21 in FIG. 2(b) than in FIG. 2(a), and therefore the spot size of the light emitted by the lens 21 and incident on the lens 22 becomes smaller in FIG. 2(b), with the result that the image surface is formed at a position closer to the lens 22 (i.e., the left side in the figure).

Similarly, in FIG. 2(c), the lens 21 is located farther from the lens 12 as compared with FIG. 2(a), and therefore the peripheral light is incident on the lens 21 at a position farther from the optical axis 4. Therefore, as compared with FIG. 2(a), the divergence power of the lens 21 for the peripheral light becomes smaller relative to the divergence power for the on-axis light. As a result, in FIG. 2(c), a difference between the divergence powers of the lens for the on-axis light and for the peripheral light becomes larger than in FIG. 2(a) (expression (12)). Further, in FIG. 2(c), the lens 22 is located closer to the lens 21 than in FIG. 2(a), and therefore the peripheral light is incident on the lens 22 at a position closer to the optical axis 4.

The lens 22 has a shape such that the divergence power for the peripheral light becomes larger in FIG. 2(c) than in FIG. 2(a). Further, as described above, the divergence power of the lens 22 for the on-axis light is smaller than for the peripheral light, but there is little difference between the divergence powers in FIG. 2 (a) and in FIG. 2(c). Therefore, in FIG. 2(c), a difference between the divergence powers of the lens 22 for the on-axis light and for the peripheral light becomes larger as compared with FIG. 2(a)(expression (13)).

From the above, a difference between the divergence powers of the combination of the lens 21 and the lens 22 for the on-axis light and for the peripheral light becomes larger in FIG. 2(c) than in FIG. 2(a) (expression (14)). In other words, in FIG. 2(c), the focal position of the peripheral light shifts away from the lens 22 (i.e., to the right in the figure) with reference to the focal position of the on-axis light as compared with FIG. 2(a). As a result, the image surface formed by the projection optical system 100 of the display device 3 becomes convex to the projection optical system 100 side as a whole.

In this way, by moving the lenses 21 and 22 as shown in FIG. 2(c), the image surface formed by the projection optical system 100 changes from the planar shape to the convex shape. In other words, regarding the image light emitted from the projection optical system 100, the focal position of the on-axis light is closer to the projection optical system 100 (on the optical axis 4) than the focal position of the peripheral light is to the projection optical system 100.

With the above described configuration, it becomes possible to obtain the image surfaces having desired curvatures as shown in FIGS. 2(a) through 2(c) by adjusting the positions of the lenses 21 and 22 in the direction of the optical axis, and it becomes possible to conform to the screens having various shapes.

In other words, it becomes possible to determine the screen shape taking into consideration shapes or the like of surroundings where the projection-type image display apparatus 10 is located, to adjust the positions of the lenses 21 and 22, and to position (fix) the lenses 21 and 22 so as to form the image surface having the shape (curvature) corresponding to the screen shape. Therefore, it becomes possible to flexibly conform to a change in a demanded screen shape, and versatility is enhanced.

In this regard, it has been described that the positions of the lenses 21 and 22 are respectively adjustable along the optical axis 4. However, it is also possible to provide a driving mechanism for moving the lenses 21 and 22 respectively in the direction of the optical axis.

Further, here, the lenses 21 and 22 are composed of single lenses. However, the lenses 21 and 22 are not limited thereto. The lenses 21 and 22 may respectively be composed of a plurality of lenses. In this case, the plurality of lenses may include a lens having a positive power. Further, if the lenses 21 and 22 are respectively composed of a plurality of lenses, the on-axis light or the peripheral light may be partially diverged by action of the plurality of lenses after being incident on the lens 21 and before being emitted from the lens 21, or after being incident on the lens 22 and before being emitted from the lens 22.

Numerical Examples

Hereinafter, numerical examples of the projection optical system 100 of this embodiment will be described. Table 1 shows optical data of the projection optical system 100.

TABLE 1

| Si (SURFACE NUMBER) | LENS | Ri (RADIUS OF CURVATURE) | Di (SURFACE INTERVAL) | Nd (REFRACTIVE INDEX) | vd (ABBE NUMBER) |
|---|---|---|---|---|---|
| OBJ | | Infinity | 3 | | |
| S1* | 11 | 3.441 | 2 | 1.5168 | 64.2 |
| S2* | | −6.200 | 3.681 | | |
| S3 | | Infinity | 3.681 | | |
| S4* | 12 | 4.697 | 2 | 1.5168 | 64.2 |
| S5* | | −10.730 | (a)5 (b)5.206 (c)4.782 | | |
| S6 | 21 | −6.353 | 1 | 1.5168 | 64.2 |
| S7 | | 5.641 | (a)2.047 (b)1 (c)3.269 | | |
| S8* | 22 | −1.052 | 1 | 1.5168 | 64.2 |
| S9* | | −1.263 | 4.487 | | |
| IMA | | (a)Infinity (b)10 (c)−10 | | | |

In the optical data shown in Table 1, a column of a surface number Si shows a surface number of an i-th surfaces (i= 1, . . . 9) corresponding to a mark Si shown in FIG. 2(a). The surface number of a surface of a most object-side element (i.e., an element closest to the display device 3) is 1, and surface numbers sequentially increase toward an image side. In the column of the surface number Si, the display device 3 is expressed as OBJ, and the screen 5 is expressed as IMA. The surface number S3 indicates the pupil P.

A column of a curvature radius Ri in Table 1 shows a curvature radius of the i-th surface from the object-side. A column of a surface interval Di shows an interval between the surface Si of the i-th surface (from the object-side) and the surface Si+1 of the (i+1)-th surface in the direction of the optical axis. The curvature radius Ri and the surface interval Di are expressed in unit of millimeter (mm). Columns of Nd and vd respectively show a refractive index for d-line (wavelength is 587.6 nm) and an Abbe number.

Marks (a), (b) and (c) in Table 1 respectively correspond to optical data shown in FIGS. 2(a), 2(b) and 2(c).

Further, an asterisk "*" attached to an upper right of the surface number in Table 1 indicates that the lens surface is an aspherical surface. In this example, both surfaces (S1 and S2) of the lens 11 and both surfaces (S4 and S5) of the lens 12 of the first lens group 1 and both surfaces (S8 and S9) of the lens 22 of the second lens group 2 are aspherical surfaces. Table 2 shows aspherical surface data.

In this regard, k represents a conic coefficient. C represents a curvature at a vertex. Ai represents aspherical coefficient of i-th order.

Further, in Table 2, the symbol E indicates that a numerical value following the symbol E is a power exponent having a base of 10. For example, "1.0E-03" indicates "$1.0 \times 10^{-3}$".

The optical data shown in Table 1 and Table 2 are merely for explaining the functions of the projection optical system 100 of this embodiment. For example, although many aspherical lenses are used here, the aspherical lenses may be replaced with a plurality of spherical lenses. Further, the reason why a single glass material is used is that a single wavelength is used for convenience of illustration. It is also possible to combine various kinds of glass materials having different refractive indexes or Abbe numbers in order to correct various aberrations such as chromatic aberration.

Table 3 shows the divergent angles of the on-axis light and the peripheral light when the light is incident on the lens 21 and is emitted from the lens 21 in the projection optical system 100 shown in Table 1 and Table 2 in the states shown in FIGS. 2(a), 2(b) and 2(c) and the divergence power of the lens 21. Table 4 shows the divergent angles of the on-axis light and the peripheral light when the light is incident on the lens 22 and is emitted from the lens 22 and the divergence power of the lens 22.

In Table 3 and Table 4, marks indicating the divergent angles of light flux in FIGS. 2(a), 2(b) and 2(C) are shown within brackets.

TABLE 2

| SURAFCE NUMBER | k | A4 | A6 | A8 | A10 |
|---|---|---|---|---|---|
| S1 | −2.979495E−01 | −2.675418E−04 | −7.522218E−03 | 1.380484E−03 | −4.414820E−04 |
| S2 | −1.044270E+02 | −1.475127E−03 | −3.589546E−03 | 3.313929E−04 | −3.210885E−05 |
| S4 | −4.816904E+02 | −8.089843E−03 | −1.139043E−04 | −4.476372E−05 | −1.196628E−05 |
| S5 | 1.834620E+00 | −9.772419E−03 | 8.468169E−04 | −1.511940E−04 | 3.417017E−06 |
| S8 | 2.402866E+00 | −2.684177E−03 | 4.055395E−03 | −5.618362E−04 | 2.619420E−05 |
| S9 | −1.008183E+01 | 1.289741E−02 | 3.600387E−04 | −7.026192E−05 | 1.888507E−06 |

The aspherical surface data in Table 2 show respective aspherical coefficients k and Ai of the expression of the aspherical surface expressed by the following expression (15). Z is an aspherical sag (depth: mm) at a radius r from an optical axis.

$$Z1(r) = C \cdot r^2 / (1 + (1 - (1+k) \cdot C^2 \cdot r^2)^{1/2}) + \Sigma Ai \cdot ri \quad (i=1 \ldots n) \quad (15)$$

Although not shown in Table 3 and Table 4, the divergent angles of the on-axis light and the peripheral light emitted from the display device 3 are both 8.6°. This value is the same through FIGS. 2(a) through 2(c). However, the above described divergent angles are not limited to this value, and may be set in accordance with a divergent angle from the light source or a desired brightness. Further, the "divergence power of a combination of both lenses" in Table 4 corresponds to the divergence power of the combination of the lens 21 and the lens 22.

surface (i.e., change the image surface to the planar surface, the concave surface or the convex surface) by moving the lenses 21 and 22. Therefore, the image surface that matches a

TABLE 3

|  | FIG. 2 (a) | | FIG. 2 (b) | | FIG. 2 (c) | |
| --- | --- | --- | --- | --- | --- | --- |
|  | ON-AXIS LIGHT | PERIPHERAL LIGHT | ON-AXIS LIGHT | PERIPHERAL LIGHT | ON-AXIS LIGHT | PERIPHERAL LIGHT |
| (1) DIVERGENT ANGLE (°) OF INCIDENT LIGHT ON LENS 21 | 10.44 (u1a) | 9.98 (v1a) | 10.44 (u1b) | 9.98 (v1b) | 10.44 (u1c) | 9.98 (v1c) |
| (2) DIVERGENT ANGLE (°) OF EMITTED LIGHT FROM LENS 21 | 5.09 (u2a) | 6.20 (v2a) | 4.68 (u2b) | 5.48 (v2b) | 5.47 (u2c) | 6.89 (v2c) |
| (3) = (1) − (2) DIVERGENCE POWER (°) OF LENS 21 | 5.35 (u1a − u2a) | 3.78 (v1a − v2a) | 5.76 (u1b − u2b) | 4.50 (v1b − v2b) | 4.97 (u1c − u2c) | 3.09 (v1c − v2c) |
| (4) DIFFERENCE (°) BETWEEN DIVERGENCE POWERS (3) FOR ON-AXIS LIGHT AND PERIPHERAL LIGHT | 1.57 ((u1a − u2a) − (v1a − v2a)) | | 1.26 ((u1b − u2b) − (v1b − v2b)) | | 1.88 ((u1c − u2c) − (v1c − v2c)) | |

TABLE 4

|  | FIG. 2 (a) | | FIG. 2 (b) | | FIG. 2 (c) | |
| --- | --- | --- | --- | --- | --- | --- |
|  | ON-AXIS LIGHT | PERIPHERAL LIGHT | ON-AXIS LIGHT | PERIPHERAL LIGHT | ON-AXIS LIGHT | PERIPHERAL LIGHT |
| (5) DIVERGENT ANGLE (°) OF INCIDENT LIGHT ON LENS 22 | 5.09 (u2a) | 6.20 (v2a) | 4.68 (u2b) | 5.48 (v2b) | 5.47 (u2c) | 6.89 (v2c) |
| (6) DIVERGENT ANGLE (°) OF EMITTED LIGHT FROM LENS 22 | 4.56 (u3a) | 2.96 (v3a) | 4.16 (u3b) | 2.66 (v3b) | 4.93 (u3c) | 3.27 (v3c) |
| (7) = (5) − (6) DIVERGENCE POWER (°) OF LENS 22 | 0.53 (u2a − u3a) | 3.24 (v2a − v3a) | 0.52 (u2b − u3b) | 2.82 (v2b − v3b) | 0.54 (u2c − u3c) | 3.62 (v2c − v3c) |
| (8) DIFFERENCE (°) BETWEEN DIVERGENCE POWERS (7) FOR ON-AXIS LIGHT AND PERIPHERAL LIGHT | 2.71 ((v2a − v3a) − (u2a − u3a)) | | 2.30 ((v2b − v3b) − (u2b − u3b)) | | 3.08 ((v2c − v3c) − (u2c − u3c)) | |
| (9) = (1) − (6) DIVERGENCE POWER (°) OF COMBINATION OF BOTH LENSES | 5.88 (u1a − u3a) | 7.02 (v1a − v3a) | 6.28 (u1b − u3b) | 7.32 (v1b − v3b) | 5.51 (u1c − u3c) | 6.71 (v1c − v3c) |
| (10) DIFFERENCE (°) BETWEEN DIVERGENCE POWERS (9) FOR ON-AXIS LIGHT AND PERIPHERAL LIGHT | 1.14 ((v1a − v3a) − (u1a − u3a)) | | 1.04 ((v1b − v3b) − (u1b − u3b)) | | 1.20 ((v1c − v3c) − (u1c − u3c)) | |

From Table 3 and Table 4, it will be appreciated that the above described expressions (3) through (14) are satisfied.

As described above, the projection optical system 100 of Embodiment 1 is able to change the curvature of the image surface (i.e., change the image surface to the planar surface, the concave surface or the convex surface) by moving the lenses 21 and 22. Therefore, the image surface that matches a desired screen shape can be obtained. Further, since the image surface that matches the screen shape can be obtained, it becomes possible to prevent performance deterioration caused by defocusing of the image light.

Figure 3:
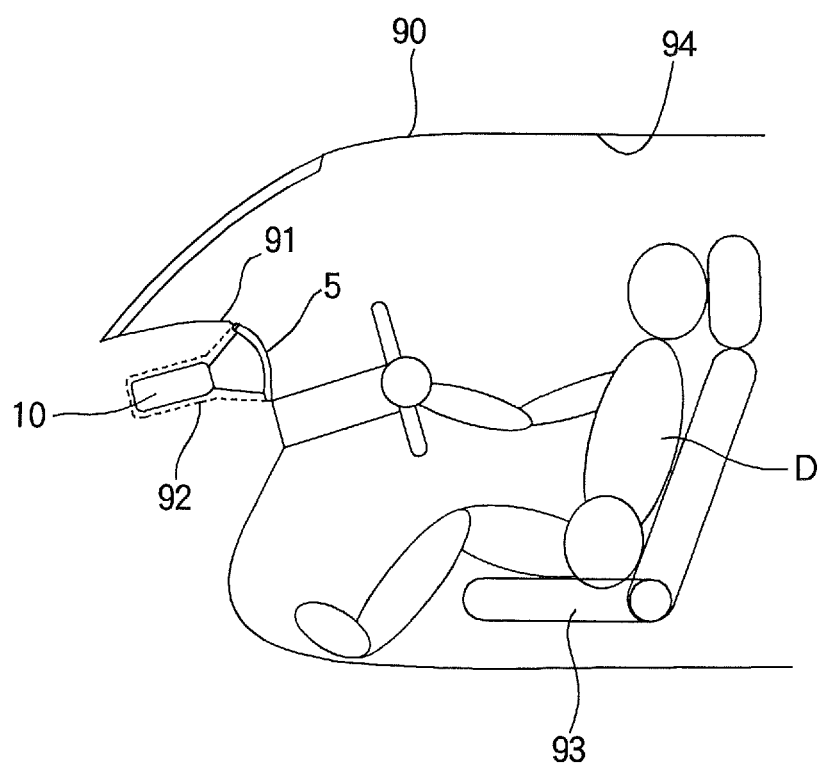
FIG. 3 is a diagram showing a configuration example of a projection-type image display apparatus for use in vehicle employing the projection optical system according to Embodiment 1.

FIG. 3 shows an example a projection-type image display apparatus for use in vehicle employing the projection-type image display apparatus of Embodiment 1. In the example shown in FIG. 3, the screen 5 is provided above a dashboard 91 of a vehicle 90. The projection-type image display apparatus 10 (i.e., the light source 60, the light uniformizing element 7, the illumination optical element 8, the display device 3 and the projection optical system 100 shown in FIG. 1) is housed in a recess 92 provided on the dashboard 91. A driver (occupant) D seated on a driver's seat 93 can visually recognize image information displayed on the screen 5.

As described above, the projection optical system 100 (FIGS. 1 and 2) is able to change the curvature of the image surface by adjusting the positions of the lenses 21 and 22, and therefore a screen shape matching a shape of the dashboard 91 can be obtained. Here, the screen shape which is concave to the projection optical system 100 side (i.e., the shape of the screen 52 shown in FIG. 2(b)) is selected, so as to match the shape of the dashboard 91.

The example shown in FIG. 3 is merely an example. For example, it is also possible to provide the screen 5 on a ceiling of a vehicle interior 94 so that an occupant of a rear seat can view an image. It is also possible to project an image on a front window as a head-up display.

Further, needless to say, the above described projection-type image display apparatus can be used as a projection-type image display apparatus other than that for use in vehicle. In any case, it is possible to conform to various screen shapes by adjusting the positions of the lenses 21 and 22 of the projection optical system 100 to change the curvature of the image surface.

In this regard, the projection optical system 100 of Embodiment 1 is configured so as to be substantially telecentric on the display device 3 side (i.e., an entrance pupil is at infinity). However, the present invention is not limited to such a projection optical system. For example, it is also possible to employ a non-telecentric configuration in which a pupil is located in the vicinity of the lens close to the display device. With such a configuration, an outer diameter of the lens close to the display device can be reduced. Therefore, it becomes possible to prevent unnecessary light such as diffracted light originating from the display device from entering into the projection optical system, and to enhance contrast.

Further, in Embodiment 1, the curvature of the image surface is changed by moving (i.e., by adjusting positions of) two lenses 21 and 22 belonging to the second lens group 2 of the projection optical system 100. However, it is also possible to move three or more lenses.

In Embodiment 1, the light emitted from the intersection between the display device 3 and the optical axis of the projection optical system 100 is projected. However, the present invention is not limited to such a configuration. The display device may be disposed at a largely offset position so that the display device may not intersect the optical axis of the projection optical system. In this case, the same can be considered as in the above described Embodiment 1 by regarding light (among the light emitted by the display device) closest to the optical axis of the projection optical system as the on-axis light.

Embodiment 2

Figure 4:
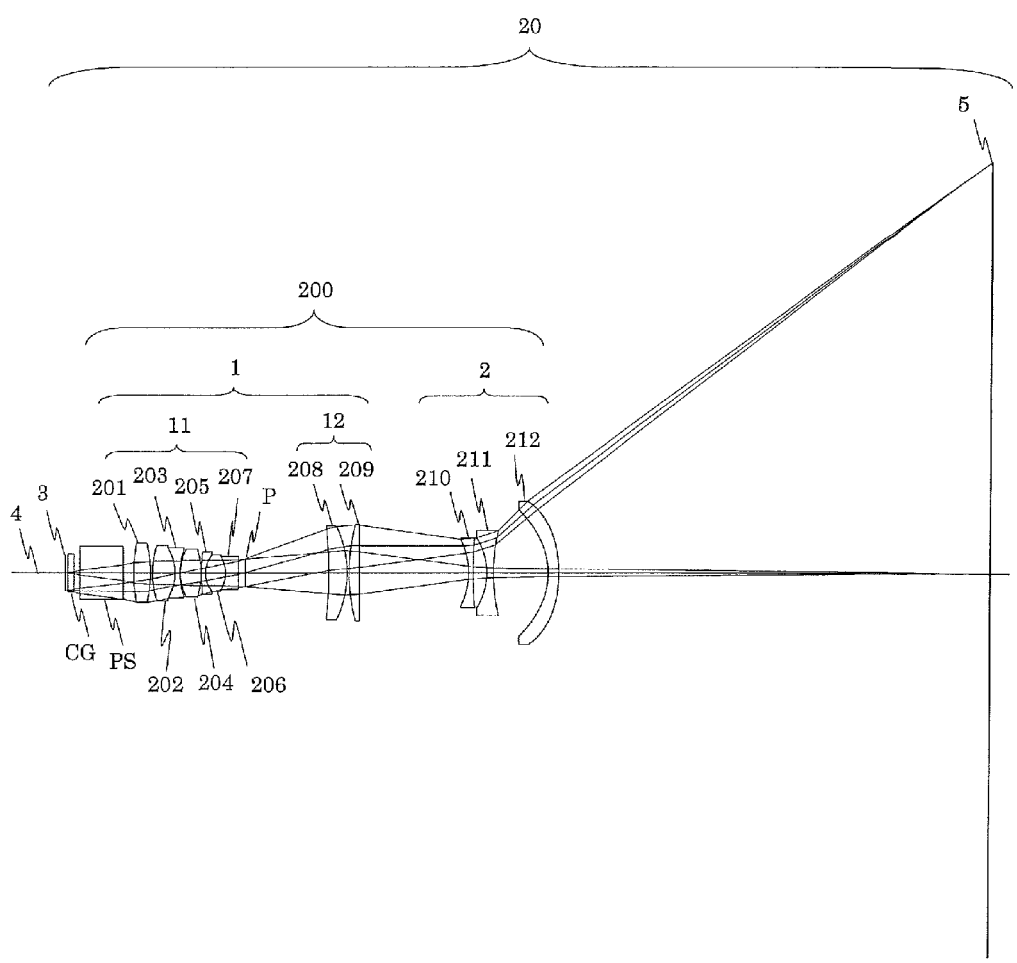
FIG. 4 is a diagram showing a configuration of a projection-type image display apparatus according to a second embodiment of the present invention.

FIG. 4 is a diagram showing a configuration of a projection-type image display apparatus 20 according to Embodiment 2 of the present invention. An illumination optical system (including a light source) and the like are the same as those of Embodiment 1 (FIG. 1), and are omitted in the figure. Components that are the same as those shown in FIG. 1 are assigned with the same reference numerals. As for light paths, a light path of the on-axis light and a light path of the peripheral light (i.e., a light path passing through a point on the display device 3 farthest from the optical axis, and reaching an outermost peripheral portion of a projected image) are shown.

The projection-type image display apparatus 20 includes a projection optical system 200. The projection optical system 200 includes a first lens group 1 having a positive power, and a second lens group 2 having a negative power, in an order from the display device 3 side (hereinafter referred to a reduction side) toward the screen side (hereinafter referred to as an enlargement side). The first lens group 1 includes a sub-lens group 11 having a positive power, and a sub-lens group 12 having a positive power, in the order from the reduction side. The sub-lens group 11 includes a biconvex lens 201, a biconvex lens 202, a biconcave lens 203, a biconvex lens 204, a negative meniscus lens 205 whose concave surface faces the enlargement side, and a biconvex lens 206 and a biconcave lens 207, in the order from the reduction side. The sub-lens group 12 includes a positive meniscus lens 208 whose convex surface faces the enlargement side, and a biconvex lens 209, in the order from the reduction side. The second lens group 2 includes biconcave lenses 210 and 211 and an aspherical lens 212. In FIG. 4, reference numeral 3 indicates a position of a cover glass of the display device 3 (here, a DLP chip). PS indicates a total reflection prism disposed between the display device 3 and the lens 11.

Figure 5:
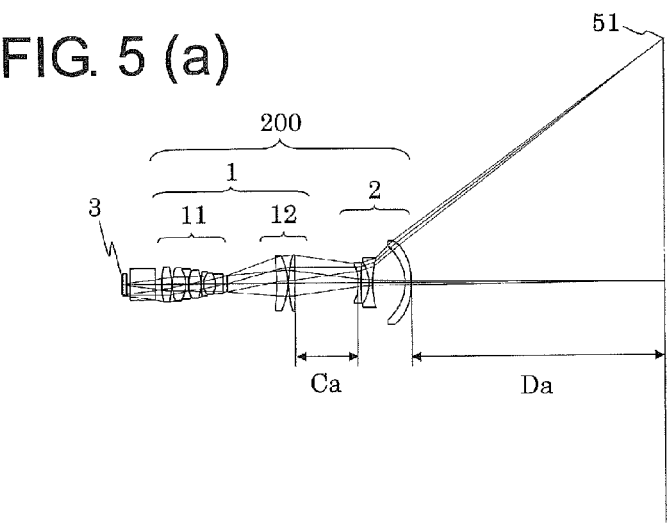
FIGS. 5(a), 5(b) and 5(c) are diagrams showing operations in which a projection optical system according to Embodiment 2 projects images on screens having a planar shape, a concave shape and a convex shape.
Figure 5:
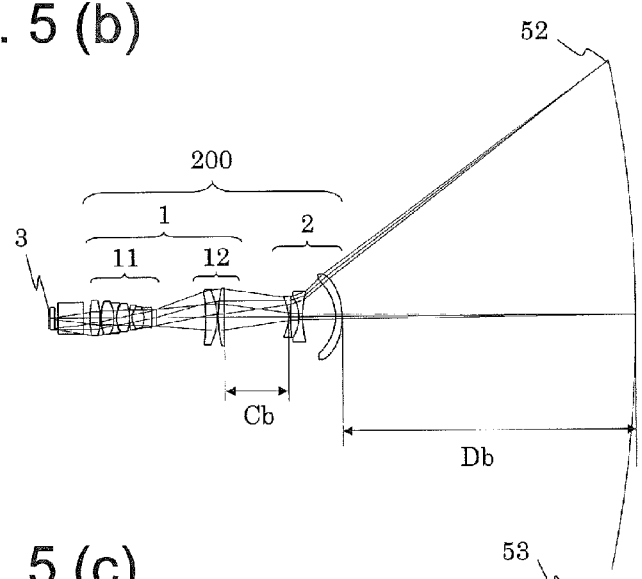
Figure 5:
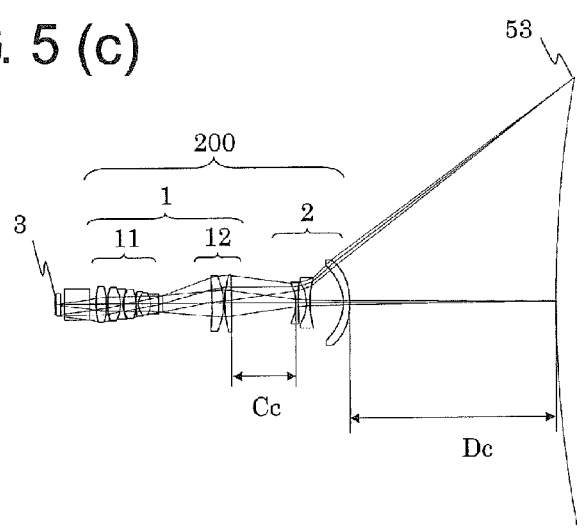

FIG. 5 is a diagram for illustrating functions of the projection optical system 200. FIG. 5(a) shows a case where image light from the display device 3 is projected on the screen 51 having the planar shape. FIG. 5(b) shows a case where the image light from the display device 3 is projected on the screen 52 having the concave shape to the projection optical system 200 side. FIG. 5(c) shows a case where the image light from the display device 3 is projected on the screen 53 having the convex shape to the projection optical system 200 side.

In this embodiment, a position of the second lens group 2 is adjusted in the direction of the optical axis in accordance with the shape (i.e., the planar shape, the concave shape or the convex shape) of the screen 5. Therefore, a distance (Ca, Cb, Cc) between the lens 12 and the second lens group 2 and a distance (Da, Db, Dc) between the second lens group 2 and the screen 51, 52 and 53 change, while the shape of each lens is the same throughout FIGS. 5(a), 5(b) and 5(c).

Figure 6:
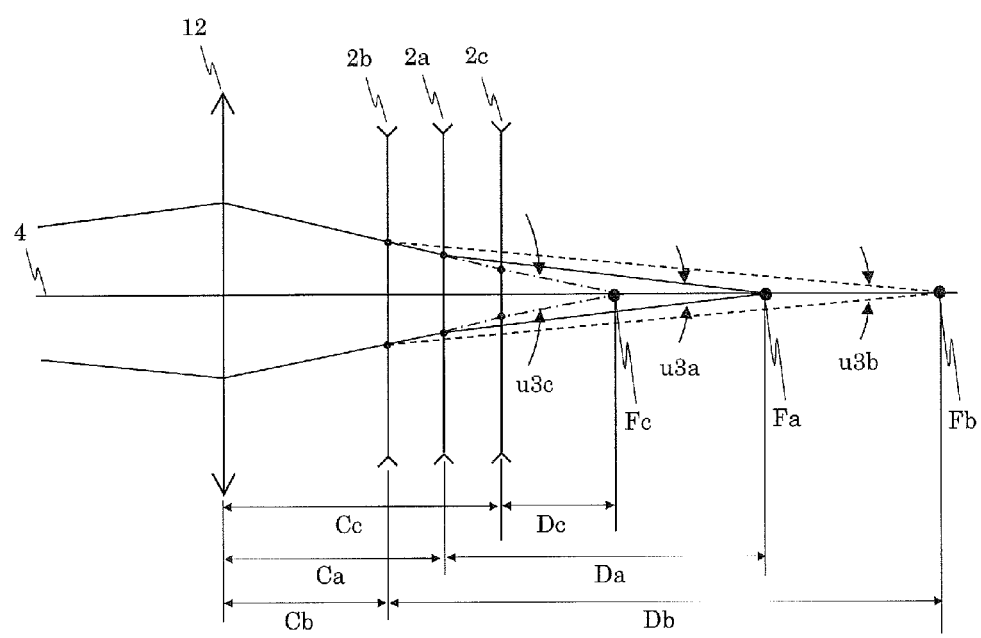
FIG. 6 is a diagram showing a convergent state of on-axis light in Embodiment 2.

FIG. 6 is a diagram for illustrating a change in position of the image surface on the optical axis. In FIG. 6, the sub-lens group 12 of the first lens group 1 is schematically illustrated as a thin lens. 2a, 2b and 2c indicate the second lens group 2 located at positions shown in FIGS. 5(a), 5(b) and 5(c), which are schematically illustrated as thin lenses. u3a, u3b and u3c indicate respective convergent angles of the on-axis light when emitted from the second lens group 2a, 2b and 2c. Fa, Fb and Fc indicate respective focal points of the on-axis light emitted from the second lens group 2a, 2b and 2c (i.e., positions of the image surface on the optical axis).

The distances Ca, Cb and Cc between the sub-lens group 12 and the second lens group 2a, 2b and 2c, the distances Da, Db and Dc between the second lens group 2a, 2b and 2c and the screen 5 (i.e., distances between the second lens group and the focal points of the on-axis light), and the convergent angles u3a, u3b and u3c of the on-axis light satisfy the following expressions (16) through (18).

$$Cb < Ca < Cc \tag{16}$$

$$Dc < Da < Db \tag{17}$$

$$u3b < u3a < u3c \tag{18}$$

If the image surface is concave to the projection optical system 200 side as shown in FIG. 5(b), the second lens group 2b moves in a direction toward the sub-lens group 12 as compared with FIG. 5(a) (Cb<Ca). In this state, since the on-axis light incident on the second lens group 2b is in a convergent state, a region where the on-axis light is incident on the second lens group 2b is larger than a region where the on-axis light is incident on the second lens group 2a. The second lens group 2 is so configured that the on-axis light is refracted with a stronger negative power as the region on which the on-axis light is incident becomes larger (i.e., refracted with a weaker negative power as the region on which the on-axis light is incident becomes smaller). Therefore, the on-axis light is refracted with a stronger negative power than in FIG. 5(a). As a result, the convergent angle of the on-axis light becomes smaller (u3b<u3a). The on-axis light is focused at the position Fb farther from the second lens group 2b than the position Fa is from the second lens group 2b (Da<Db). Therefore, as compared with FIG. 5(a), the position of the image surface on the optical axis moves in a direction away from the second lens group 2b.

In contrast, if the image surface is convex to the projection optical system 200 side as shown in FIG. 5(c), the second lens group 2c moves in a direction away from the sub-lens group 12 as compared with FIG. 5(a) (Ca<Cc). In this state, since the on-axis light incident on the second lens group is in a convergent state, a region where the on-axis light is incident on the second lens group 2c is smaller than a region where the on-axis light is incident on the second lens group 2a. The second lens group 2 is so configured that the on-axis light is refracted with a weaker negative power as the region on which the on-axis light is incident becomes smaller (i.e., refracted with a stronger negative power as the region on which the on-axis light is incident becomes larger). Therefore, the on-axis light is refracted with a weaker negative power than in FIG. 5(a). As a result, the convergent angle of the on-axis light becomes larger (u3a<u3c). The on-axis light is focused at the position Fc closer to the second lens group 2c than the position Fa is to the second lens group 2c (Dc<Da). Therefore, as compared with FIG. 5(a), the position of the image surface on the optical axis moves toward the second lens group 2c.

The lateral magnification of the second lens group 2 is an enlarging magnification from the reduction side toward the enlargement side. According to a paraxial theory, a longitudinal magnification is proportional to a square of the lateral magnification. That is, a moving amount of the image surface is larger than a moving amount of the second lens group 2. Therefore, positions Fc, Fa and Fb of the image surfaces on the optical axis are arranged in the order from the reduction side toward the enlargement side (Dc<Da<Db).

Figure 7:
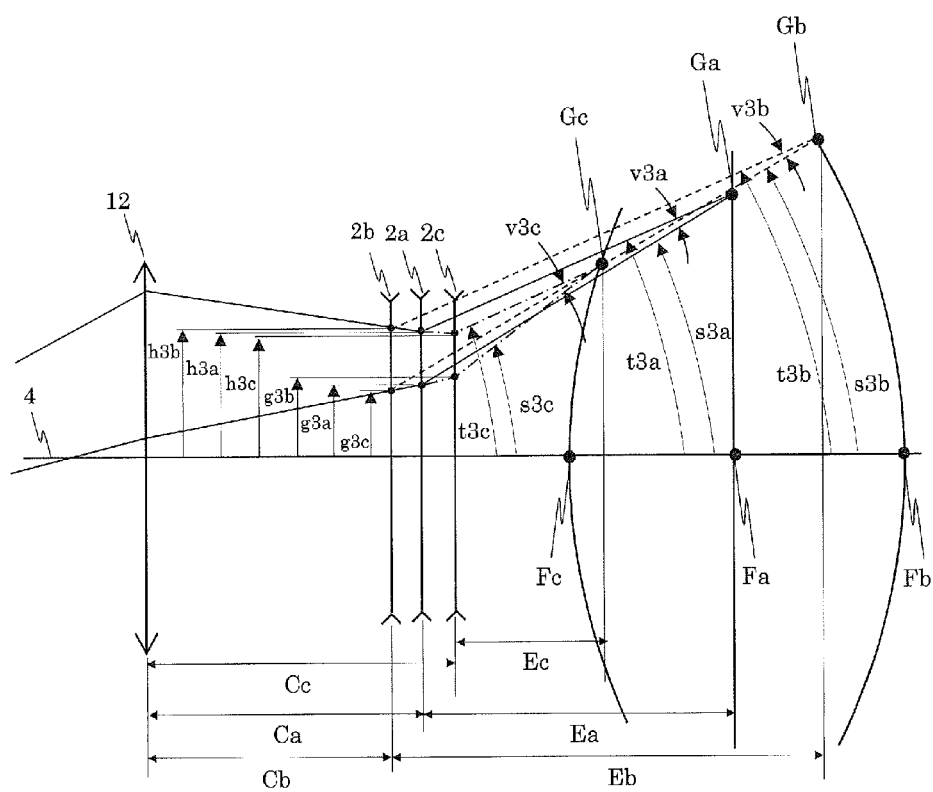
FIG. 7 is a diagram showing a convergent state of peripheral light in Embodiment 2.

FIG. 7 is a diagram for illustrating a change in position of the image surface at a peripheral portion of the screen. Components that are the same as those shown in FIG. 6 are assigned with the same numerals. v3a, v3b and v3c indicate respective convergent angles of the peripheral light when emitted from the second lens group 2a, 2b and 2c. Ga, Gb and Gc indicate respective focal points of the peripheral light emitted from second lens group 2a, 2b and 2c (i.e., positions of the image surface at the peripheral portion of the screen).

Distances Ea, Eb and Ec between the second lens group and the focal points of the peripheral light, convergent angles v3a, v3b and v3c of the peripheral light satisfy the following expressions (19) and (20).

$$Ec<Ea<Eb \quad (19)$$

$$v3b<v3a<v3c \quad (20)$$

If the image surface is concave to the projection optical system 200 side as shown in FIG. 5(b), the second lens group 2b moves in a direction toward the sub-lens group 12 as compared with FIG. 5(a) (Cb<Ca). In this state, since the peripheral light incident on the second lens group 2b is in the convergent state, a region where the peripheral light is incident on the second lens group 2b is larger than a region where the peripheral light is incident on the second lens group 2a. The second lens group 2 is so configured that the peripheral light is refracted with a stronger negative power as the region on which the peripheral light is incident becomes larger (i.e., refracted with a weaker negative power as the area on which the peripheral light is incident becomes smaller). Therefore, the peripheral light is refracted with a stronger negative power than in FIG. 5(a). As a result, the convergent angle of the peripheral light becomes smaller (v3b<v3a). The peripheral light is focused at the position Gb farther from the second lens group 2b than a position Ga is from the second lens group 2b (Ea<Eb). Therefore, as compared with FIG. 5(a), the position of the image surface at the peripheral portion of the screen moves in a direction away from the second lens group 2b.

In contrast, if the image surface is convex to the projection optical system 200 side as shown in FIG. 5(c), the second lens group 2c moves in a direction away from the sub-lens group 12 as compared with FIG. 5(a) (Ca<Cc). In this state, since the peripheral light incident on the second lens group 2c is in a convergent state, a region where the peripheral light is incident on the second lens group 2c is smaller than a region where the peripheral light is incident on the second lens group 2a. The second lens group 2 is so configured that the peripheral light is refracted with a weaker negative power as the region on which the peripheral light is incident becomes smaller (i.e., refracted with a stronger negative power as the region on which the peripheral light is incident becomes larger). Therefore, the peripheral light is refracted with a weaker negative power than in FIG. 5(a). As a result, the convergent angle of the peripheral light becomes larger (v3a<v3c). The peripheral light is focused at the position Gc closer to the second lens group 2c than the position Ga is to the second lens group 2c (Ec<Ea). Therefore, as compared with FIG. 5(a), the position of the image surface at the peripheral portion of the screen moves toward the second lens group 2c.

For the same reason as the image surface on the optical axis, positions Gc, Ga and Gb of the image surfaces at the peripheral portion of the screen are arranged in the order from the reduction side toward the enlargement side (Ec<Ea<Eb).

The above will be described in detail. In FIG. 7, angles between the optical axis of the light emitted from the second lens group 2 and an upper ray of the peripheral light (i.e., emission angles of the upper ray) are respectively expressed as t3a, t3b and t3c. Further, angles between the optical axis of the light emitted from the second lens group 2 and a lower ray of the peripheral light (i.e., emission angles of the lower ray) are respectively expressed as s3a, s1b and s3c (v3a=t3a−s3a, v3b=t3b−s3b, and v3c=t3c−s3c). Incident heights of the upper ray and the lower ray of the peripheral light incident on the second lens group 2a (distances from the optical axis to incident points) are expressed as h3a and g3a. Incident heights of the upper ray and the lower ray of the peripheral light incident on the second lens group 2b are expressed as h3b and g3b. Incident heights of the upper ray and the lower ray of the peripheral light incident on the second lens group 2c are expressed as h3c and g3c. In this regard, relationships g3c<g3a<g3b and h3c<h3a<h3b are satisfied.

The second lens group 2 is so configured that each of the upper ray and the lower ray of the peripheral light is refracted with a stronger negative power as the incident height becomes larger with reference to FIG. 5(a). In other words, the upper ray is refracted with a stronger negative power by the second lens group 2a than by the second lens group 2c, and is refracted with a stronger negative power by the second lens group 2b than by the second lens group 2a. The lower ray is refracted with a stronger negative power by the second lens group 2a than by the second lens group 2b, and is refracted with a stronger negative power by the second lens group 2c than by the second lens group 2a. Therefore, t3c<t3a<t3b is satisfied for the emission angle of the upper ray of the peripheral light. s3b<s3a<s3c is satisfied for the emission angle of the lower ray of the peripheral light. Therefore, as compared with the second lens group 2a, the second lens group 2b focuses the peripheral light at a position farther from the second lens group (Ea<Eb), and the second lens group 2c focuses the peripheral light at a position closer to the second lens group (Ec<Ea).

The distances Da, Db and Dc between the second lens group 2a, 2b and 2c and the focal points of the on-axis light, the distances Ea, Eb and Ec between the second lens group 2a, 2b and 2c and the focal points of the peripheral light, the convergent angles u3a, u3b and u3c of the on-axis light, and the convergent angles v3a, v3b and v3c of the peripheral light satisfy the following expressions (21) through (24).

$$Db-Da>Eb-Ea \qquad (21)$$

$$Da-Dc>Ea-Ec \qquad (22)$$

$$|u3b-u3a|>|v3b-v3a| \qquad (23)$$

$$|u3c-u3a|>|v3c-v3a| \qquad (24)$$

As described above, the second lens group 2 is so configured that the on-axis light is refracted with a stronger negative power as the region on which the on-axis light is incident becomes larger (i.e., refracted with a weaker negative power as the region on which the on-axis light is incident becomes smaller). The second lens group 2 is so configured that the peripheral light is refracted with a stronger negative power as the region on which the peripheral light is incident becomes larger (i.e., refracted with a weaker negative power as the region on which the peripheral light is incident becomes smaller).

Therefore, when the image surface is concave to the projection optical system 200 side as shown in FIG. 5(b), the convergent angles of both of the on-axis light and the peripheral light become smaller as compared with FIG. 5(a). However, the second lens group 2 is so configured that a changing amount of the convergent angle of the on-axis light is larger than that of the peripheral light (|u3b−u3a|>|v3b−v3a|). Therefore, a changing amount of the distance between the second lens group 2 and the focal point of the on-axis light is larger than that of the peripheral light (Db−Da>Eb−Ea).

Further, when the image surface is convex to the projection optical system 200 side as shown in FIG. 5(c), the convergent angles of both of the on-axis light and the peripheral light become larger as compared with FIG. 5(a). However, the second lens group 2 is so configured that the changing amount of the convergent angle of the on-axis light is larger than that of the peripheral light (|u3c−u3a|>|v3c−v3a|). Therefore, the changing amount of the distance between the second lens group 2 and the focal point of the on-axis light is larger than that of the peripheral light (Da−Dc>Ea−Ec).

Figure 8:
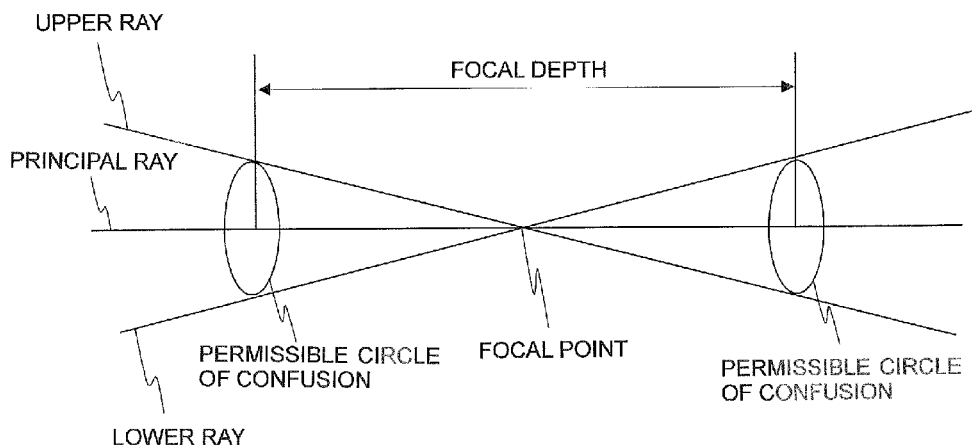
FIG. 8(a) is a diagram schematically showing a relationship among a focal point, a permissible circle of confusion, and a focal depth of the on-axis light.
FIG. 8(b) is a diagram schematically showing a relationship among a focal point, a permissible circle of confusion, and a focal depth of the peripheral light.
Figure 8:
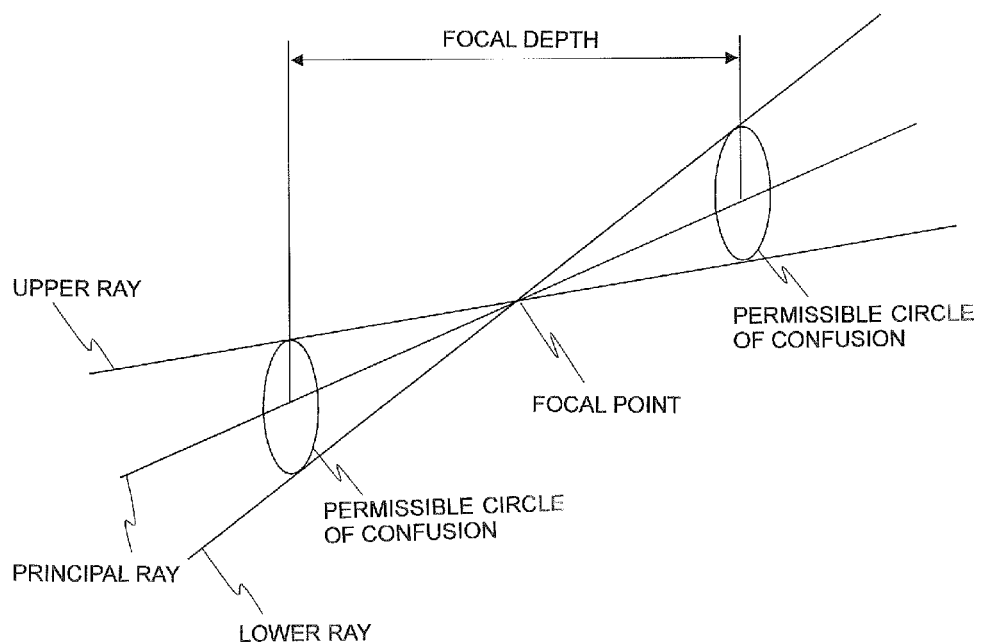

Next, a focal position and a screen shape will be described. FIG. 8(a) is a diagram schematically showing a relationship among a focal point, a permissible circle of confusion and a focal depth of the on-axis light. The focal depth is a range centered at the focal point within which a clear image is formed. The focal depth is a distance from one to the other permissible circles of confusion on both sides of the focal point on the optical axis. When an image of a point on an object is defocused, the image of the point is blurred, and becomes an image of a circle. The circle is referred to a circle of confusion. A maximum circle of confusion whose blurring is permissible is referred to as a permissible circle of confusion. Generally, a sharpest image can be obtained by setting the screen surface on the focal point. However, even if the screen surface does not coincide with the focal point, satisfactory imaging performance is obtained when the screen surface is set within the focal depth. The permissible circle of confusion is determined based on a pixel size on the screen and a permissible level of blurring.

FIG. 8(b) is a diagram schematically showing a relationship among a focal point, a permissible circle of confusion and a focal depth of the peripheral light. The screen is assumed to be a plane (i.e., a plane perpendicular to the optical axis), and the focal depth is assumed to be a distance between the permissible circles measured in a direction parallel to the optical axis. Therefore, in FIG. 8(a), the screen intersects with light flux at a right angle. In FIG. 8(b), the screen obliquely intersects with the light flux, and image is more blurred even when the distance from the focal point is the same. Therefore, the focal depth is shallower in FIG. 8(b) than in FIG. 8(a). As an angle between a principal ray (i.e., a ray passing through a center of an aperture of the lens) and the optical axis becomes larger, image blurring becomes larger, and the focal depth becomes shallower. In other words, the focal depth becomes shallower as the view angle of the projection optical system increases.

Figure 9:
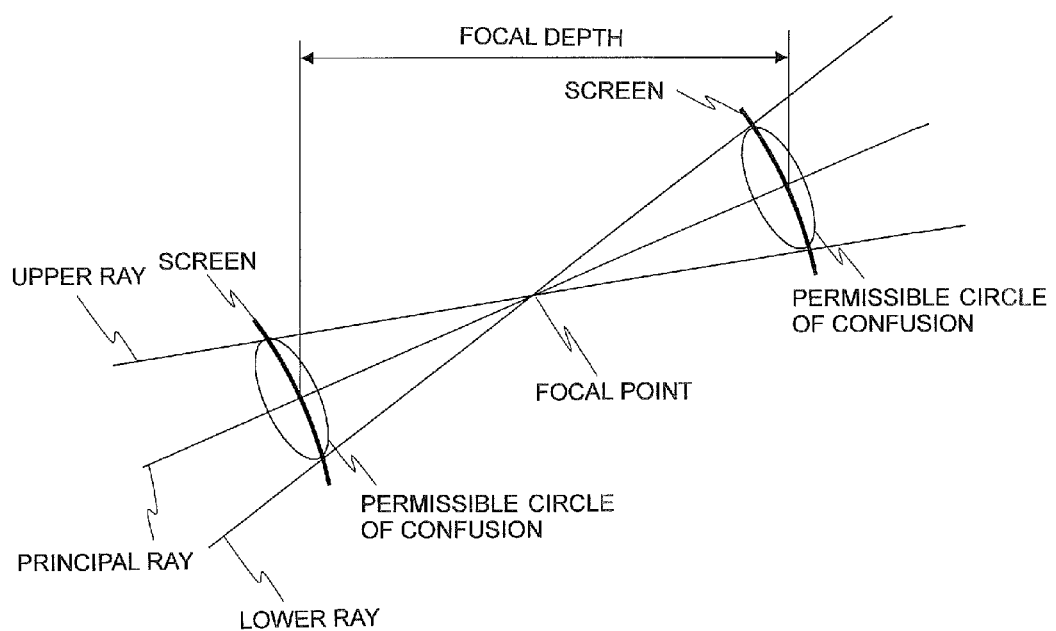
FIG. 9 is a diagram for illustrating the focal depth.

FIG. 9 is a diagram schematically showing a relationship among the focal point, the permissible circle of confusion and the focal depth of the peripheral light as in FIG. 8(b). In this regard, in FIG. 9, the screen is curved, and the principal ray intersects with the screen surface at a right angle. Considering a distance from the focal point along the principal ray, image blurring with respect to the distance from the focal point is at the same level as FIG. 8(a). However, the principal ray is inclined with respect to the optical axis. Therefore, considering the distance along the optical axis, image blurring is larger than FIG. 8(a) even if the distance from the focal point is the same. Thus, the focal depth is shallower in FIG. 9 than in FIG. 8(a).

As described above, as an angle at which the screen intersects with light flux is deviated from the right angle increases, i.e., as the screen intersects with the light flux more obliquely, the focal depth becomes shallower. Therefore, it is necessary to control a position of the focal point at the peripheral portion so as to match the shape of the screen surface.

In the above description, the screen has a spherical surface (i.e., a part of the spherical surface) having an optical axis coinciding with the optical axis of the projection optical system. However, the shape of the screen is not limited to the spherical surface. For the above described reasons, the screen surface may be, for example, an aspherical surface or a free curved surface as long as the screen surface intersects with light flux within the focal depth of each image point.

Figure 10:
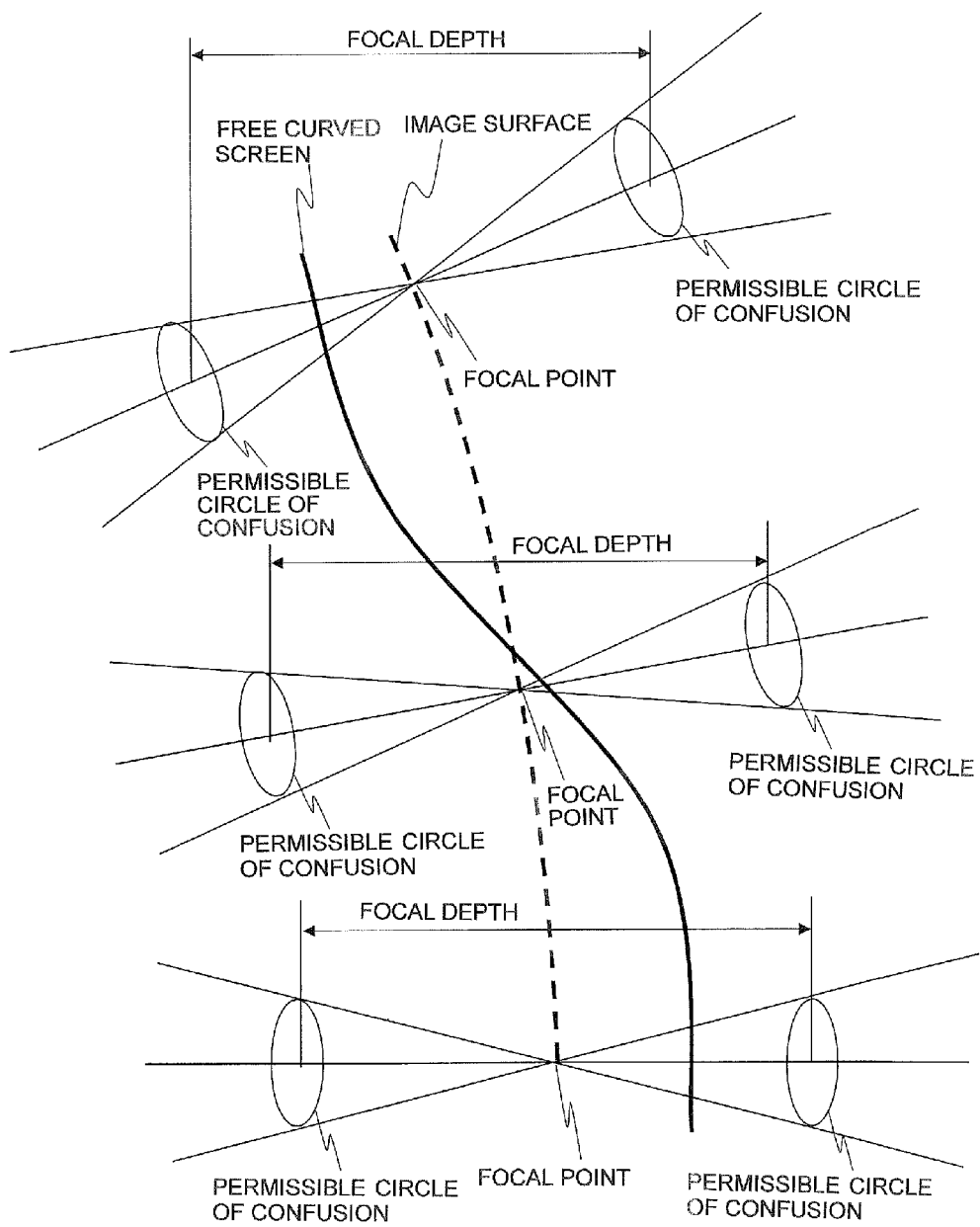
FIG. 10 is a diagram for illustrating the focal depth and a screen shape.

FIG. 10 shows an example in which the screen has a free curved surface. FIG. 10 shows a convergent state of intermediate light (i.e., light emitted from a position on the display device 3 between an emitting position of the on-axis light and an emitting position of the peripheral light) in addition to the on-axis light and the peripheral light. An image surface (i.e., a surface on which focal points are arranged) is shown by a dashed line in FIG. 10. The image surface itself is concave to the projection optical system side as shown in FIG. 5(b). The screen shape is a free curved surface that intersects with light flux within the focal depth of respective image points. Even if the image surface is planar, the screen surface can be a curved surface within the range of the focal depth. In this regard, since the focal depth becomes shallower at the peripheral portion of the screen, a freedom in the screen shape is small at the peripheral portion of the screen, and therefore the screen shape cannot be a curved surface largely different from a planar surface. In contrast, in this embodiment, the image surface itself is a curved surface matching the screen surface, and therefore the screen may have a more free shape.

Numerical Examples

Numerical examples of the projection optical system 200 of this embodiment shown in FIGS. 4 and 5 will be described. Table 5 shows optical data of the projection optical system 200. Definitions in Table 5 are equivalent to those in Table 1. The surface number S16 represents the pupil P. A size of the display device 3 is 14.515 mm×8.165 mm. An F-number on the reduction side is 2.5. A size of a projected image is 15 inches diagonal, when the image surface is the planar surface. A projection magnification is 22.88 times. When a size of a pixel of the display device is 7.56 μm, a size of a pixel projected on the screen 5 is about 0.17 mm.

TABLE 5

| Si (SURFACE NUMBER) | LENS | Ri (RADIUS OF CURVATURE) | Di (SURFACE INTERVAL) | Nd (REFRACTIVE INDEX) | vd (ABBE NUMBER) |
|---|---|---|---|---|---|
| OBJ | | Infinity | 0.483 | | |
| S1 | CG | Infinity | 2.997 | 1.5069 | 63.1 |
| S2 | | Infinity | 3.000 | | |
| S3 | PS | Infinity | 20.000 | 1.6204 | 60.3 |
| S4 | | Infinity | 5.000 | | |
| S5 | 201 | 68.700 | 7.972 | 1.8467 | 23.8 |
| S6 | | −59.840 | 1.000 | | |
| S7 | 202 | 44.817 | 10.000 | 1.4977 | 80.9 |
| S8 | 203 | −24.591 | 2.000 | 1.6945 | 53.7 |
| S9 | | 27.465 | 0.500 | | |
| S10 | 204 | 23.141 | 9.383 | 1.4970 | 81.6 |
| S11 | | −38.571 | 0.200 | | |
| S12 | 205 | 68.152 | 2.000 | 1.6347 | 35.8 |
| S13 | 206 | 12.655 | 9.443 | 1.5043 | 79.8 |
| S14 | 207 | −16.018 | 5.887 | 1.6731 | 32.1 |
| S15 | | 310.095 | 3.492 | | |
| S16 | | Infinity | 38.780 | | |
| S17 | 208 | −161.635 | 8.610 | 1.7920 | 47.6 |
| S18 | | −48.807 | 1.000 | | |
| S19 | 209 | 85.864 | 4.845 | 1.8100 | 44.3 |
| S20 | | −26010.670 | (a)50.000 (b)50.176 (c)49.900 | | |
| S21 | 210 | −33.142 | 2.000 | 1.4970 | 81.6 |
| S22 | | 225.161 | 6.265 | | |
| S23 | 211 | −29.874 | 3.000 | 1.6003 | 40.5 |
| S24 | | 82.592 | 25.669 | | |
| S25* | 212 | −36.259 | 5.000 | 1.5311 | 56.0 |
| S26* | | −65.677 | (a)200.000 (b)161.354 (c)229.697 | | |
| IMA | | (a)Infinity (b)1000.000 (c)−1000.000 | | | |

Table 6 shows aspherical data. Definitions in Table 6 are equivalent to those in Table 2.

TABLE 6

| SURFACE NUMBER | k | A4 | A6 | A8 | A10 | A12 |
|---|---|---|---|---|---|---|
| S25 | −9.973921E−02 | −2.523181E−06 | 4.155812E−09 | 4.326819E−15 | 1.389659E−15 | −1.818827E−18 |
| S26 | 2.560478E+00 | −3.692462E−06 | 3.769183E−09 | −2.823312E−12 | 1.784913E−15 | −6.096526E−19 |

Table 7 shows respective parameters of this embodiment. From Table 7, it will be appreciated that the above described expressions (16) through (24) are satisfied.

TABLE 7

| PARAMETER | VALUE |
|---|---|
| Ca | 50.000 |
| Cb | 49.900 |
| Cc | 50.176 |
| Da | 200.000 |
| Db | 229.697 |
| Dc | 161.354 |
| Ea | 200.000 |
| Eb | 209.900 |
| Ec | 176.400 |
| Db − Da | 29.697 |
| Da − Dc | 38.646 |
| Eb − Ea | 9.900 |
| Ea − Ec | 23.600 |
| U3a | 1.016 |
| U3b | 0.913 |
| U3c | 1.197 |
| V3a | 1.294 |
| V3b | 1.234 |
| V3c | 1.400 |
| |u3b − u3a| | 0.103 |
| |v3b − v3a| | 0.060 |
| |u3c − u3a| | 0.181 |
| |v3c − v3a| | 0.106 |

Figure 11C:
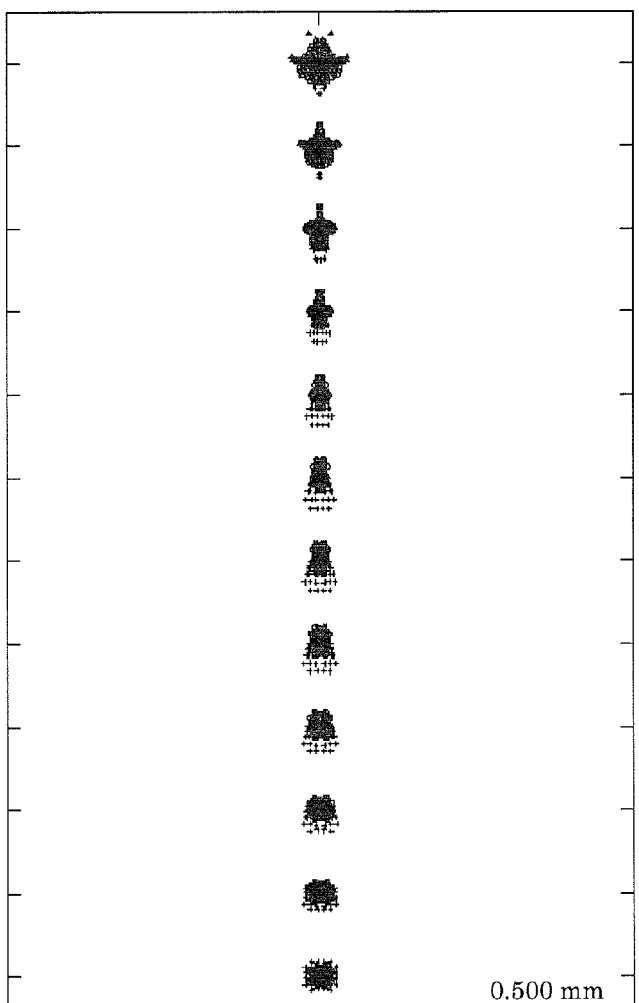
FIG. 11C is a diagram showing a spot diagram when the screen has a convex shape in Embodiment 2.

FIGS. 11A, 11B and 11C show spot diagrams on the screen respectively when the screen 5 is planar, concave to the projection optical system 200 side, and convex to the projection optical system 200 side. Here, red light having a wavelength of 630 nm, green light having a wavelength of 530 nm, blue light having a wavelength of 460 nm are used. A ratio of amounts of the red light, the green light and the blue light incident on the screen is set to 3:6:1.

In each of FIGS. 11A, 11B and 11C, a vertical axis indicates coordinates of object points on a display surface of the display device 3. Here, 12 object points are arranged at substantially equal intervals in Y direction from the optical axis (X=0, Y=0) to a maximum height (X=0, Y=−8.33 mm) on the display surface of the display device 3. Along the vertical axis, four values (coordinates) are given to express a position of each object point. Among the four values, lower two values indicate absolute coordinates. For example, "0.000, −8.33 MM" indicates that X=0 and Y=−8.33 MM (i.e., the maximum height). Upper two values indicate relative coordinates. The relative coordinates are normalized by setting the maximum height (−8.33 MM) to 1. Respective object points on the display surface of the display device 3 correspond to respective object points on the screen.

A scales shown at a lower right portion of each of FIGS. 11A, 11B and 11C represents length of 0.500 mm. Although FIGS. 11A, 11B and 11C are illustrated using black and white, each spot is formed by a combination of red light, green light and blue light.

From FIGS. 11A, 11B and 11C, a divergence of the spot is approximately less than or equal to a size of a pixel (0.17 mm). It is appreciated that satisfactory performance is obtained in all cases where the screen 5 is planar, concave and convex.

FIG. 12 is a diagram showing a reference example in contrast to this embodiment. FIG. 12 shows a spot diagram when the screen 53 which is convex to the projection optical system side as shown in FIG. 5(c) is provided replacing the projection optical system (whose image surface is planar) shown in FIG. 5(a). Definitions of FIG. 12 are equivalent to FIG. 11. From FIG. 12, it is appreciated that the spot becomes extremely large as a distance from the vicinity of the optical axis increases, and desired performance cannot be obtained. That is, in this embodiment, the curvature of the image surface is changed by adjusting the position of the lens. Therefore, an image having satisfactory property can be displayed on either of the planar screen 5 and the curved screen 5 using the same projection optical system.

In this embodiment, a radius of curvature of the image surface is set to 1000 mm for either of the concave surface and the convex surface. However, as described above, the radius of curvature of the screen 5 may be arbitrarily set within the focal depth. Here, description has been made of the case where the screen 5 is made planar, concave and convex by adjusting the position of the lens. In this regard, satisfactory performance is obtained by adjusting the position of the lens so that an absolute value of the radius of curvature of the image surface is in a range from 1000 mm to infinity.

As described above, the projection optical system 200 of Embodiment 2 of the present invention is able to change the curvature of the image surface (i.e., change the image surface to the planar, concave or convex surface) by moving the second lens group 2. Therefore, it becomes possible to obtain the image surface that matches the desired screen shape. Further, since the image surface that matches the desired screen shape can be obtained, it becomes possible to suppress performance deterioration caused by defocusing of the image light.

In this embodiment, the second lens group 2 is entirely moved. However, this embodiment is not limited thereto. It is also possible to move a part of lenses or lens groups constituting the second lens group 2. Further, as schematically described with reference to FIGS. 6 and 7, it is only necessary to move the second lens group 2 having a negative power as a whole. This does not exclude a case where the second lens group 2 includes a non-movable lens or lens group.

Embodiment 3

Figure 13:
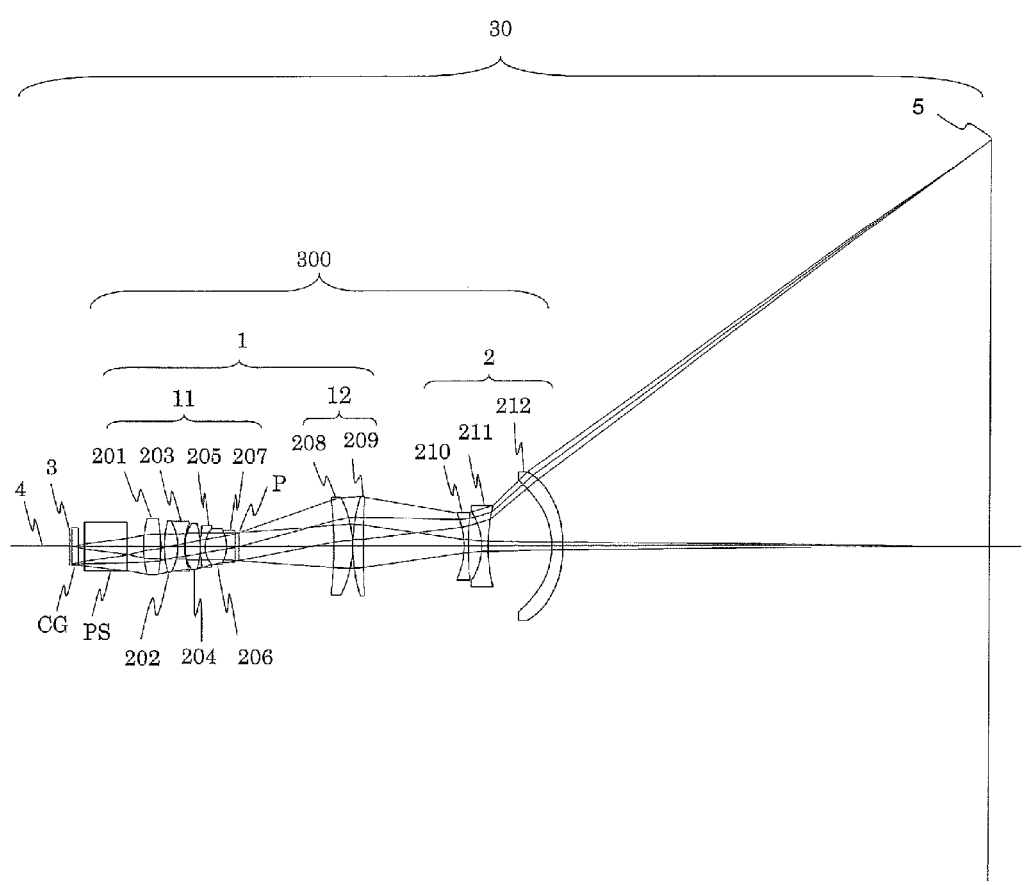
FIG. 13 is a diagram showing a projection-type image display apparatus according to Embodiment 3.

FIG. 13 is a diagram showing a configuration of a projection-type image display apparatus 30 according to Embodiment 3 of the present invention. The illumination optical system (including the light source) and the like are the same as those of Embodiment 1 (FIG. 1), and are omitted in the figure. Components that are the same as those shown in FIG. 1 are assigned with the same reference numerals. As for light paths, a light path of the on-axis light and a light path of the peripheral light (i.e., a light path passing through a point on the display device 3 farthest from the optical axis, and reaching an outermost peripheral portion of a projected image) are shown.

The projection-type image display apparatus 30 includes a projection optical system 300. The projection optical system 300 includes a first lens group 1 having a positive power, and a second lens group 2 having a negative power, in the order from the reduction side toward the enlargement side. The first lens group 1 includes a sub-lens group 11 having a positive power and a sub-lens group 12 having a positive power in the order from the reduction side. The sub-lens group 11 includes a biconvex lens 201, a biconvex lens 202, a biconcave lens 203, a biconvex lens 204, a negative meniscus lens 205 whose concave surface faces the enlargement side, a biconvex lens 206 and a negative meniscus lens 207 whose concave surface faces the reduction side, in the order from the reduction side. The sub-lens group 12 includes a positive meniscus lens 208 whose convex surface faces the enlargement side, and a positive meniscus lens 209 whose convex surface faces the reduction side, in the order from the reduction side. The second lens group 2 includes biconcave lenses 210 and 211 and an aspherical lens 212.

Figure 14:
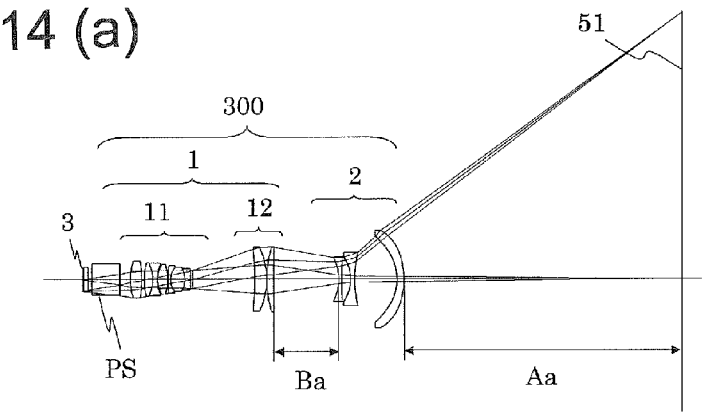
FIGS. 14(a), 14(b) and 14(c) are diagrams showing operations in which a projection optical system according to Embodiment 3 projects images on screens having a planar surface shape, a concave shape and a convex shape.
Figure 14:
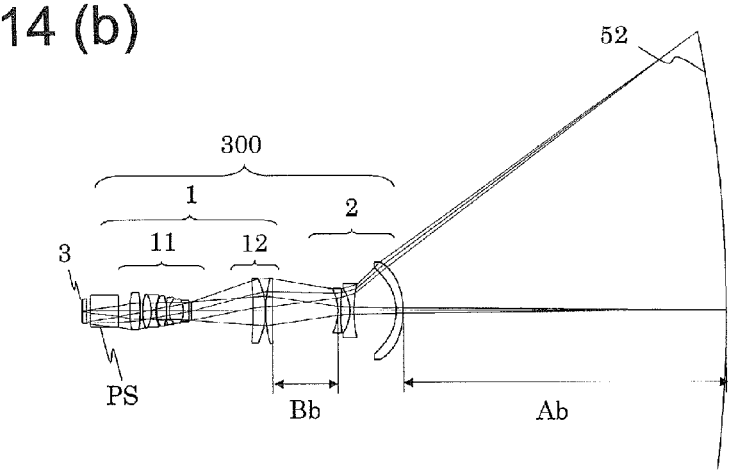
Figure 14:
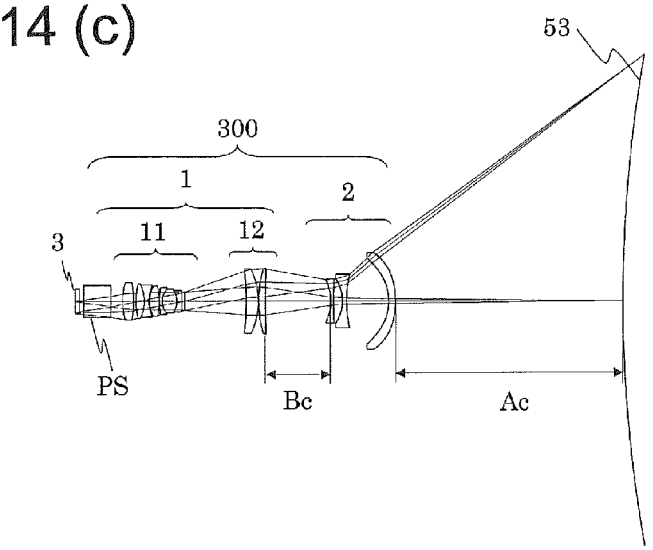

FIG. 14 is a diagram for illustrating functions of the projection optical element 300. FIG. 14(a) shows a case where image light from the display device 3 is projected on the screen 51 having the planar shape. FIG. 14(b) shows a case where the image light from the display device 3 is projected on the screen 52 having the concave shape to the projection optical system 300 side. FIG. 14(c) shows a case where the image light from the display device 3 is projected on the screen 53 having the convex shape to the projection optical system 300 side.

In this embodiment, a position of the first lens group is adjusted in the direction of the optical axis in accordance with the shape (i.e., planar, concave or convex shape) of the screen 5. Therefore, a distance between the prism PS and the first lens group 1, a distance (Ba, Bb, Bc) between the first lens group 1 and the second lens group 2, and a distance (Aa, Ab, Ac) between the second lens group 2 and the screen 51, 52 and 53 change, while the shape of each lens is the same throughout FIGS. 14(a), 14(b) and 14(c).

Figure 15:
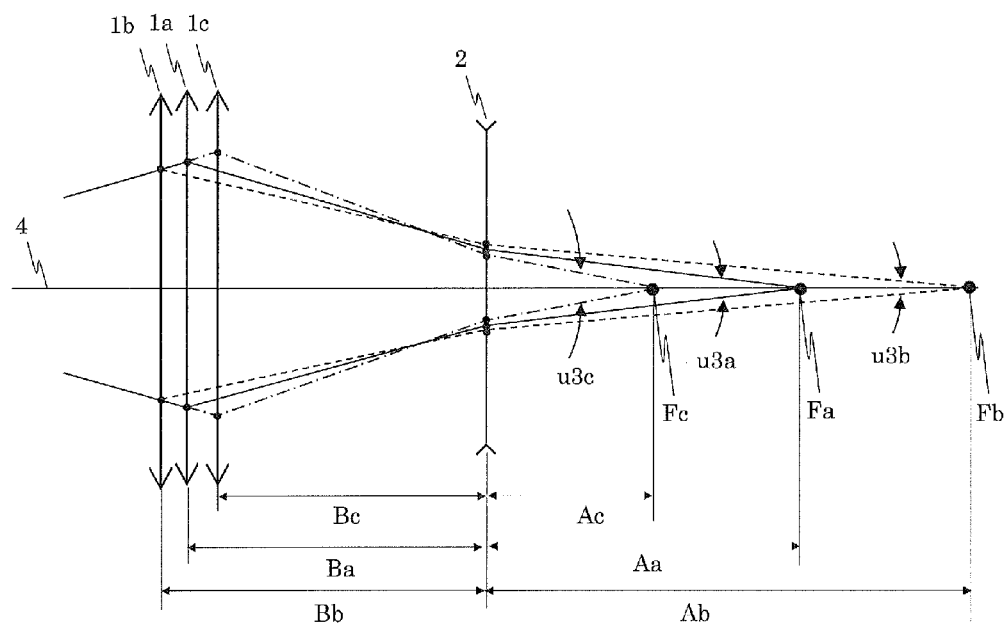
FIG. 15 is a diagram showing a convergent state of on-axis light in Embodiment 3.

FIG. 15 is a diagram for illustrating a change in position of the image surface on the optical axis. In FIG. 15, 1a, 1b and 1c indicate the first lens group 1 located at positions shown in FIGS. 14(a), 14(b) and 14(c), which are schematically illustrated as thin lenses. The second lens group 2 is also schematically illustrated as a thin lens. u3a, u3b and u3c indicate respective convergent angles of the on-axis light when emitted from the second lens group 2. Fa, Fb and Fc indicate respective focal points of the on-axis light emitted from the second lens group 2 (i.e., positions of the image surface on the optical axis).

The distances Ba, Bb and Bc between the first lens group 1 (1a, 1b and 1c) and the second lens group 2, the distances Aa, Ab and Ac between the second lens group 2 and the screen 5 (i.e., distances between the second lens group and the focal points of the on-axis light) satisfy the following expressions (25) and (26).

$$Bc<Ba<Bb \quad (25)$$

$$Ac<Aa<Ab \quad (26)$$

The convergent angles u3a, u3b and u3c of the on-axis light satisfy the above described expression (18).

If the image surface is concave to the projection optical system 300 side as shown in FIG. 14(b), the first lens group 1b moves in a direction away from the second lens group 2 as compared with FIG. 14(a) (Ba<Bb). Since the on-axis light incident on the first lens group 1b is in a divergent state, a region where the on-axis light is incident on the first lens group 1b is smaller than a region where the on-axis light is incident on the first lens group 1a. The first lens group 1 is so configured that the on-axis light is refracted with a weaker positive power as the region on which the on-axis light is incident becomes smaller (i.e., refracted with a stronger positive power as the region on which the on-axis light is incident becomes larger). Therefore, the on-axis light is refracted by the first lens group 1b with a weaker positive power than in FIG. 14(a). Therefore, a region on which the on-axis light is incident on the second lens group 2 becomes larger than in FIG. 14(a).

The second lens group 2 is so configured that the on-axis light is refracted with a stronger negative power as the region on which the on-axis light is incident becomes larger (i.e., refracted with a weaker negative power as the region on which the on-axis light is incident becomes smaller). Therefore, the on-axis light is refracted with a stronger negative power by the second lens group 2 than in FIG. 14(a). As a result, the convergent angle of the on-axis light becomes smaller (u3b<u3a). The on-axis light is focused at the position Fb farther from the second lens group 2 than the position Fa is from the second lens group 2 (Da<Db). Therefore, as compared with FIG. 14(a), the position of the image surface on the optical axis moves away from the second lens group 2.

In contrast, if the image surface is convex to the projection optical system 300 side as shown in FIG. 14(c), the first lens group 1c moves in a direction toward the second lens group 2 as compared with FIG. 14(a) (Bc<Ba). Since the on-axis light incident on the first lens group 1c is in a divergent state, a region where the on-axis light is incident on the first lens group 1c is larger than a region where the on-axis light is incident on the first lens group 1a. The first lens group 1 is so configured that the on-axis light is refracted with a stronger positive power as the region on which the on-axis light is incident becomes larger (i.e., refracted with a weaker positive power as the region on which the on-axis light is incident becomes smaller). Therefore, the on-axis light is refracted by the first lens group 1c with a stronger positive power than in FIG. 14(a). Therefore, a region on which the on-axis light is incident on the second lens group 2 becomes smaller than in FIG. 14(a).

The second lens group 2 is so configured that the on-axis light is refracted with a weaker negative power as the region on which the on-axis light is incident becomes smaller (i.e., refracted with a stronger negative power as the region on which the on-axis light is incident becomes larger). Therefore, the on-axis light is refracted with a weaker negative power by the second lens group 2 than in FIG. 14(a). As a result, the convergent angle of the on-axis light becomes larger (u3a<u3c). The on-axis light is focused at the position Fc closer to the second lens group 2 than the position Fa is to the second lens group 2 (Dc<Da). Therefore, as compared with FIG. 14(a), the position of the image surface on the optical axis moves toward the second lens group 2. Therefore, positions Fc, Fa and Fb of the image surfaces on the optical axis are arranged in the order from the reduction side toward the enlargement side (Dc<Da<Db).

Figure 16:
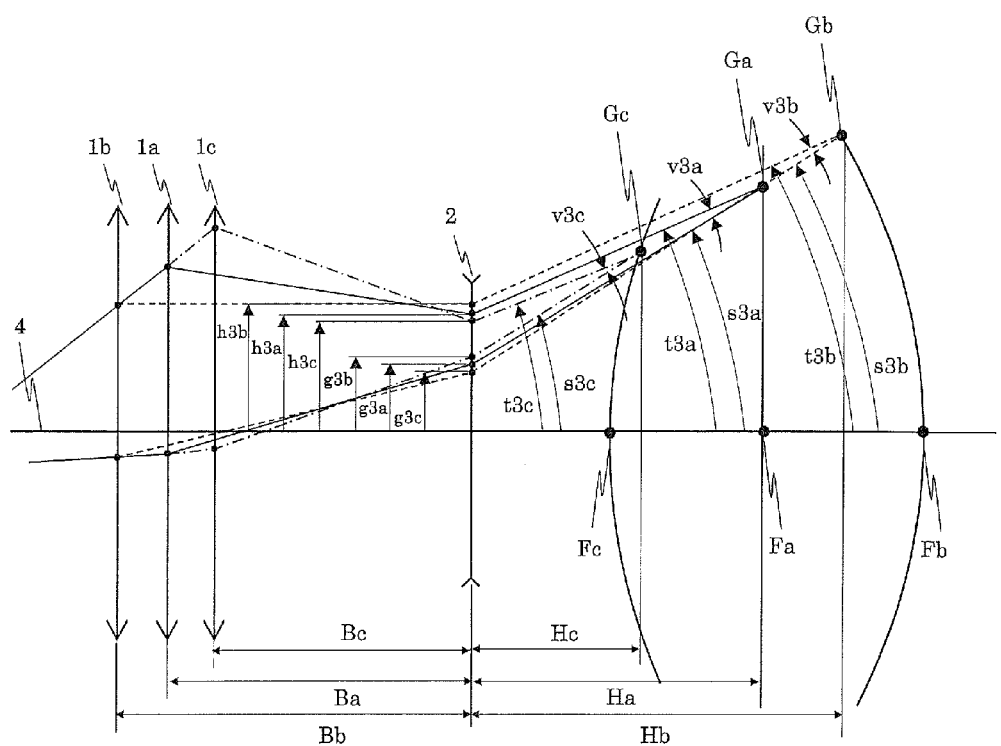
FIG. 16 is a diagram showing a convergent state of peripheral light in Embodiment 3.

FIG. 16 is a diagram for illustrating a change in position of the image surface at a peripheral portion of the screen. Components that are the same as those shown in FIG. 15 are assigned with the same numerals. v3a, v3b and v3c indicate respective convergent angles of the peripheral light emitted from the second lens group 2. Ga, Gb and Gc indicate respective focal points of the peripheral light emitted from second lens group 2 (i.e., positions of the image surface at the peripheral portion of the screen).

Distances Ha, Hb and Hc between the second lens group 2 and the focal points of the peripheral light satisfy the following expression (27).

$$Hc<Ha<Hb \quad (27)$$

The convergent angles v3a, v3b and v3c of the peripheral light satisfy the above described expression (20).

If the image surface is concave to the projection optical system 300 side as shown in FIG. 14(b), the first lens group 1b moves in a direction away from the second lens group 2 as compared with FIG. 14(a) (Ba<Bb). In this state, since the peripheral light incident on the first lens group 1b is in a divergent state, a region where the peripheral light is incident on the first lens group 1b is smaller than a region where the peripheral light is incident on the first lens group 1a. The first lens group 1 is so configured that the peripheral light is refracted with a weaker positive power as the region on which the peripheral light is incident becomes smaller (i.e., refracted with a stronger positive power as the region on which the peripheral light is incident becomes larger). Therefore, the peripheral light is refracted by the first lens group 1b with a weaker positive power than in FIG. 14(a). Therefore, a region on which the peripheral light is incident on the second lens group 2 becomes larger than in FIG. 14(a). The second lens group 2 is so configured that the peripheral light is refracted with a stronger negative power as the region on which the peripheral light is incident becomes larger (i.e., refracted with a weaker negative power as the region on which the on-axis light is incident becomes smaller). Therefore, the peripheral light is refracted with a stronger negative power by the second lens group 2 than in FIG. 14(a). As a result, the convergent angle of the peripheral light becomes smaller (v3b<v3a). The peripheral light is focused at the position Gb farther from the second lens group 2 than the position Ga is from the second lens group 2 (Ha<Hb). Therefore, as compared with FIG. 14(a), the position of the image surface at the peripheral portion of the screen moves away from the second lens group 2.

If the image surface is convex to the projection optical system 300 side as shown in FIG. 14(c), the first lens group 1c moves in a direction toward the second lens group 2 as compared with FIG. 14(a) (Bc<Ba). In this state, since the peripheral light incident on the first lens group 1c is in a divergent state, a region where the peripheral light is incident on the first lens group 1c is larger than a region where the peripheral light is incident on the first lens group 1a. The first lens group 1 is so configured that the peripheral light is refracted with a stronger positive power as the region on which the peripheral light is incident becomes larger (i.e., refracted with a weaker positive power as the region on which the peripheral light is incident becomes smaller). Therefore, the peripheral light is refracted by the first lens group 1c with a stronger positive power than in FIG. 14(a). Therefore, a region on which the peripheral light is incident on the second lens group 2 becomes smaller than in FIG. 14(a). The second lens group 2 is so configured that the peripheral light is refracted with a weaker negative power as the region on which the peripheral light is incident becomes smaller (i.e., refracted with a stronger negative power as the region on which the on-axis light is incident becomes larger). Therefore, the peripheral light is refracted with a weaker negative power by the second lens group 2 than in FIG. 14(a). As a result, the convergent angle of the peripheral light becomes larger (v3a<v3c). The peripheral light is focused at the position Gc closer to the second lens group 2 than the position Ga is to the second lens group 2 (Hc<Ha). Therefore, as compared with FIG. 14(a), the position of the image surface at the peripheral portion of the screen moves toward the second lens group 2. Therefore, positions Gc, Ga and Gb of the image surfaces on the optical axis are arranged in the order from the reduction side toward the enlargement side (Hc<Ha<Hb).

The above will be described in detail. In FIG. 16, angles between the optical axis of the light emitted from the second lens group 2 and an upper ray of the peripheral light (i.e., emission angles of the upper ray) are respectively expressed as t3a, t3b and t3c. Further, angles between the optical axis of the light emitted from the second lens group 2 and a lower ray of the peripheral light (i.e., emission angles of the lower ray) are respectively expressed as s3a, s3b and s3c (v3a=t3a−s3a, v3b=t3b−s3b, and v3c=t3c−s3c). In FIG. 14(a), incident heights of the upper ray and the lower ray of the peripheral light incident on the second lens group 2 (distances from the optical axis to incident points) are expressed as h3a and g3a. In FIG. 14(b), incident heights of the upper ray and the lower ray of the peripheral light incident on the second lens group 2 are expressed as h3b and g3b. In FIG. 14(c), incident heights of the upper ray and the lower ray of the peripheral light incident on the second lens group 2 are expressed as h3c and g3c. In this regard, relationships g3c<g3a<g3b and h3c<h3a<h3b are satisfied.

The second lens group 2 is so configured that each of the upper ray and the lower ray of the peripheral light is refracted with a stronger negative power as the incident height becomes larger, and is refracted with a weaker negative power as the incident height becomes smaller, with reference to FIG. 14(a). In other words, the upper ray is refracted with a stronger negative power in FIG. 14(a) than in FIG. 14(c), and is refracted with a stronger negative power in FIG. 14(b) than in FIG. 14(a). The lower ray is refracted with a stronger negative power in FIG. 14(a) than in FIG. 14(b), and is refracted with a stronger negative power in FIG. 14(c) than in FIG. 14(a).

Therefore, t3c<t3a<t3b is satisfied for the emission angle of the upper ray of the peripheral light. s3b<s3a<s3c is satisfied for the emission angle of the lower ray of the peripheral light. Therefore, as compared with FIG. 14(a), the peripheral light is focused at a position farther from the second lens group (Ha<Hb) in FIG. 14(b), and the peripheral light is focused at a position closer to the second lens group (Hc<Ha) in FIG. 14(c).

Further, the distances Aa, Ab and Ac between the second lens group 2 and the focal points of the on-axis light, and the distances Ha, Hb and Hc between the second lens group 2 and the focal points of the peripheral light satisfy the following expressions (28) and (29).

$$Ab-Aa>Hb-Ha \tag{28}$$

$$Aa-Ac>Ha-Hc \tag{29}$$

Figure 17:
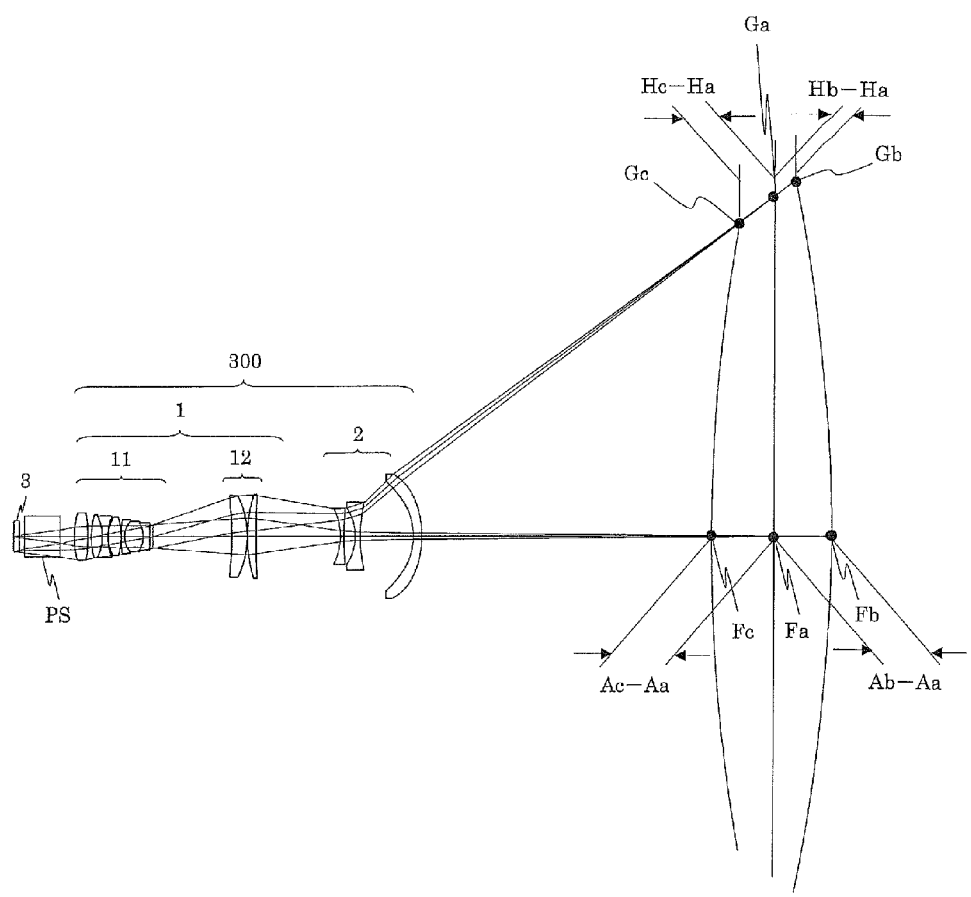
FIG. 17 is a diagram showing operations in which the projection optical system according to Embodiment 3 projects images on the screens having the planar shape, the concave shape and the convex shape, in an overlapping manner.

FIG. 17 shows results of FIGS. 14(a), 14(b) and 14(c) in an overlapping manner. As described above, the second lens group 2 is so configured that the on-axis light is refracted with a stronger negative power as the region in which the on-axis light is incident is larger (i.e., refracted with a weaker negative power as the region in which the on-axis light is incident is smaller). The second lens group 2 is so configured that the peripheral light is refracted with a stronger negative power as the region in which the peripheral light is incident is larger (i.e., refracted with a weaker negative power as the region in which the peripheral light is incident is smaller).

Therefore, when the image surface is concave to the projection optical system 300 side as shown in FIG. 14(b), the convergent angles of both of the on-axis light and the peripheral light become smaller as compared with FIG. 14(a). However, the second lens group 2 is so configured that a changing amount of the convergent angle of the on-axis light is larger than that of the peripheral light (|u3b−u3a|>|v3b−v3a|). Therefore, a changing amount of the distance between the second lens group 2 and the focal point of the on-axis light is larger than that of the peripheral light (Ab−Aa>Hb−Ha).

Further, when the image surface is convex to the projection optical system 300 side as shown in FIG. 14(c), the convergent angles of both of the on-axis light and the peripheral light become larger as compared with FIG. 14(a). However, the second lens group 2 is so configured that the changing amount of the convergent angle of the on-axis light is larger than that of the peripheral light (|u3c−u3a|>|v3c−v3a|). Therefore, the changing amount of the distance between the second lens group 2 and the focal point of the on-axis light is larger than that of the peripheral light (Aa−Ac>Ha−Hc).

Numerical Examples

Numerical examples of the projection optical system 300 of this embodiment shown in FIGS. 13 and 14 will be described. Table 8 shows optical data of the projection optical system 300. Definitions in Table 6 are equivalent to those in Table 8. The surface number S16 represents the pupil P. The size of the display device 3 is 14.515 mm×8.165 mm. The F-number on the reduction side is 2.5. The size of the projected image is 15 inches diagonal, when the image surface is the planar surface. The projection magnification is 22.88 times. When the size of the pixel of the display device is 7.56 μm, the size of the pixel projected on the screen 5 is about 0.17 mm.

TABLE 8

| Si (SURFACE NUMBER) | LENS | Ri (RADIUS OF CURVATURE) | Di (SURFACE INTERVAL) | Nd (REFRACTIVE INDEX) | vd (ABBE NUMBER) |
|---|---|---|---|---|---|
| OBJ | | Infinity | 0.483 | | |
| S1 | CG | Infinity | 2.997 | 1.5069 | 63.1 |
| S2 | | Infinity | 3.000 | | |
| S3 | PS | Infinity | 20.000 | 1.6204 | 60.3 |
| S4 | | Infinity | (a)7.994 (b)7.894 (c)8.132 | | |
| S5 | 201 | 49.860 | 7.585 | 1.8467 | 23.8 |
| S6 | | −91.774 | 2.000 | | |
| S7 | 202 | 44.731 | 6.179 | 1.4976 | 81.0 |
| S8 | 203 | −26.852 | 3.000 | 1.7057 | 56.0 |
| S9 | | 25.012 | 0.500 | | |
| S10 | 204 | 21.561 | 7.068 | 1.4978 | 81.1 |
| S11 | | −40.069 | 0.200 | | |
| S12 | 205 | 72.465 | 2.000 | 1.6376 | 35.6 |
| S13 | 206 | 12.735 | 10.087 | 1.5036 | 80.0 |
| S14 | 207 | −15.097 | 3.919 | 1.6758 | 31.9 |
| S15 | | −993.293 | 1.862 | | |
| S16 | | Infinity | 44.846 | | |
| S17 | 208 | −202.254 | 8.743 | 1.7861 | 48.1 |
| S18 | | −51.955 | 0.200 | | |
| S19 | 209 | 80.606 | 5.009 | 1.8193 | 39.1 |
| S20 | | 762.500 | (a)50.000 (b)46.868 (c)47.106 | | |
| S21 | 210 | −35.637 | 2.000 | 1.4970 | 81.6 |
| S22 | | 220.573 | 6.298 | | |
| S23 | 211 | −29.039 | 3.000 | 1.6325 | 36.1 |
| S24 | | 81.341 | 30.073 | | |
| S25* | 212 | −37.094 | 5.000 | 1.5311 | 56.0 |
| S26* | | −64.996 | (a)200.000 (b)232.318 (c)164.462 | | |
| IMA | | (a)Infinity (b)−1000.000 (c)1000.000 | | | |

Table 9 shows aspherical data. Definitions in Table 9 are equivalent to those in Table 2.

TABLE 9

| SURFACE NUMBER | k | A4 | A6 | A8 | A10 | A12 |
|---|---|---|---|---|---|---|
| S25 | −2.178862E−01 | −3.285628E−06 | 3.820248E−09 | −9.043610E−13 | 1.501556E−15 | −1.265899E−18 |
| S26 | 2.149397E+00 | −3.757365E−06 | 3.773365E−09 | −2.855695E−12 | 1.666896E−15 | −4.924067E−19 |

Table 10 shows respective parameters of this embodiment. From Table 10, it will be appreciated that the above described expressions (25) through (29) are satisfied.

TABLE 10

| PARAMETER | VALUE |
|---|---|
| Aa | 200.000 |
| Ab | 232.318 |
| Ac | 164.462 |
| Ba | 50.000 |
| Bb | 46.868 |
| Bc | 47.106 |
| Ha | 200.000 |
| Hb | 212.100 |
| Hc | 180.100 |
| Ab − Aa | 32.318 |
| Aa − Ac | 35.538 |
| Hb − Ha | 12.100 |
| Ha − Hc | 19.900 |
| U3a | 1.025 |
| U3b | 0.913 |
| U3c | 1.180 |

TABLE 10-continued

| PARAMETER | VALUE |
|---|---|
| V3a | 1.291 |
| V3b | 1.232 |
| V3c | 1.373 |
| |u3b − u3a| | 0.112 |
| |v3b − v3a| | 0.059 |
| |u3c − u3a| | 0.155 |
| |v3c − v3a| | 0.082 |

Figure 18B:
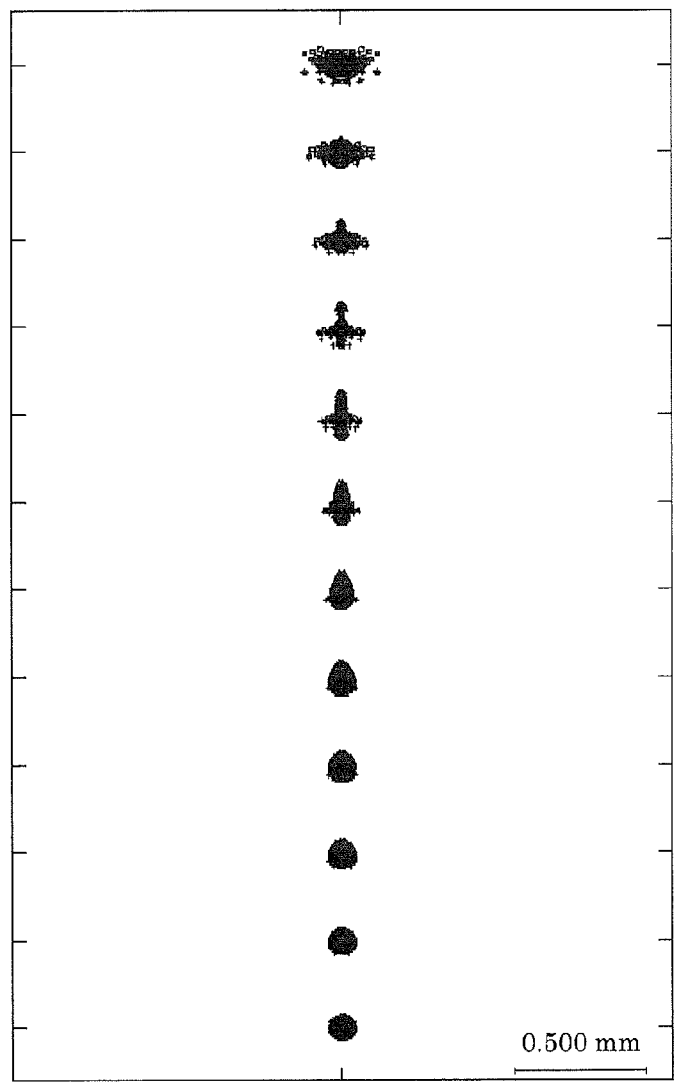
FIG. 18B is a diagram showing a spot diagram when the screen has the concave shape in Embodiment 3.

FIGS. 18A, 18B and 18C show spot diagrams on the screen respectively when the screen 5 is the planar shape, the concave shape to the projection optical system 300 side, and the convex shape to the projection optical system 300 side. Here, red light having a wavelength of 630 nm, green light having a wavelength of 530 nm, blue light having a wavelength of 460 nm are used. The ratio of the amounts of the red light, the green light and the blue light incident on the screen is set to 3:6:1.

From FIGS. 18A, 18B and 18C, a divergence of the spot is approximately less than or equal to a size of a pixel (0.17 mm). It is appreciated that satisfactory performance is obtained in all cases where the screen 5 is planar, concave and convex.

In this embodiment, a radius of curvature of the image surface is set to 1000 mm for either of the concave surface and the convex surface. However, as described above, the radius of curvature of the screen 5 may be arbitrarily set within the focal depth. Here, description has been made of the case where the screen 5 is made planar, concave and convex by adjusting the position of the lens. In this regard, satisfactory performance is obtained by adjusting the position of the lens so that an absolute value of the radius of curvature of the image surface is in a range from 1000 mm to infinity.

As described above, the projection optical system 300 of Embodiment 3 of the present invention is able to change the curvature of the image surface (i.e., change the image surface to the planar, concave or convex surface) by moving the first lens group 1. Therefore, it becomes possible to obtain the image surface that matches the desired screen shape. Further, since the image surface that matches the desired screen shape can be obtained, it becomes possible to suppress performance deterioration caused by defocusing of the image light.

In this embodiment, although the first lens group 1 is entirely moved. However, this embodiment is not limited thereto. It is also possible to move a part of lenses or lens groups constituting the first lens group 1. Further, as schematically described with reference to FIGS. 15 and 16, it is only necessary to move the first lens group 1 having a positive power as a whole. This does not exclude a case where the first lens group 1 includes a non-movable lens or lens group.

Embodiment 4

Figure 19:
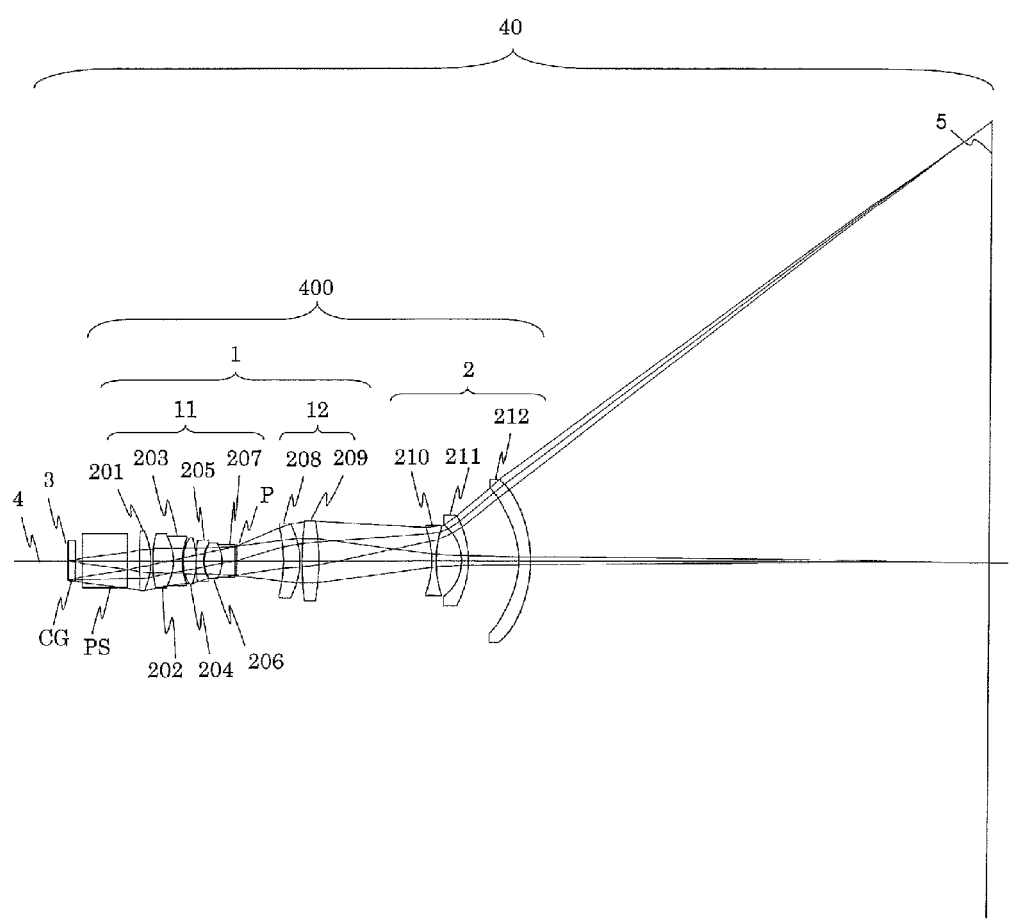
FIG. 19 is a diagram showing a configuration of a projection-type image display apparatus according to Embodiment 4 of the present invention.

FIG. 19 is a diagram showing a configuration of a projection-type image display apparatus 40 according to Embodiment 4 of the present invention. The illumination optical system (including the light source) and the like are the same as those of Embodiment 1 (FIG. 1), and are omitted in the figure. Components that are the same as those shown in FIG. 1 are assigned with the same reference numerals. As for light paths, a light path of the on-axis light and a light path of the peripheral light (i.e., a light path passing through a point on the display device 3 farthest from the optical axis, and reaching an outermost peripheral portion of a projected image) are shown.

The projection-type image display apparatus 40 includes a projection optical system 400. The projection optical system 400 includes a first lens group 1 having a positive power, and a second lens group 2 having a negative power, in the order from the reduction side toward the enlargement side. The first lens group 1 includes a sub-lens group 11 having a positive power and a sub-lens group 12 having a positive power, in the order from the reduction side. The sub-lens group 11 includes a biconvex lenses 201 and 202, a biconcave lens 203, a biconvex lens 204, a negative meniscus lens 205 whose concave surface faces the enlargement side, a biconvex lens 206 and a biconcave lens 207, in the order from the reduction side. The sub-lens group 12 includes a positive meniscus lens 208 whose convex surface faces the enlargement side and a biconvex lens 209, in the order from the reduction side. The second lens group 2 includes a biconcave lens 210, a negative meniscus lens 211 whose concave surface faces the reduction side, and an aspherical lens 212.

Figure 20:
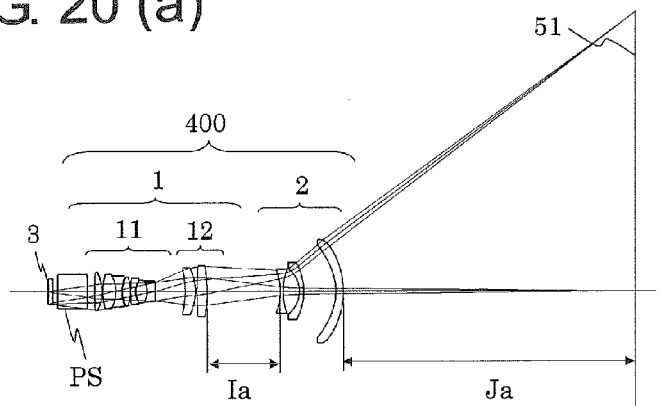
FIGS. 20(a), 20(b) and 20(c) are diagrams showing operations in which a projection optical system according to Embodiment 4 projects images on screens having a planar shape, a concave shape and a convex shape.
Figure 20:
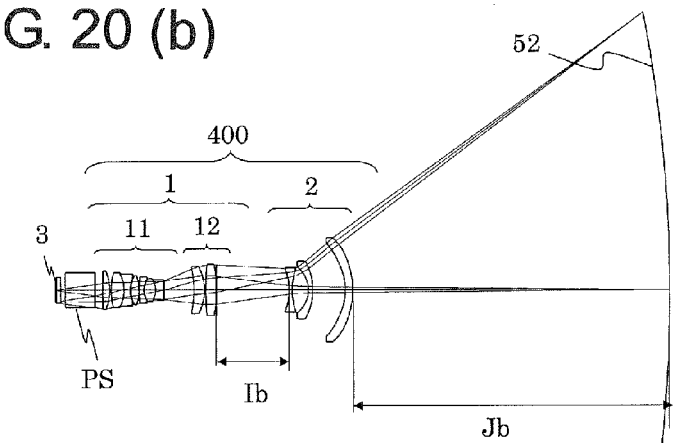
Figure 20:
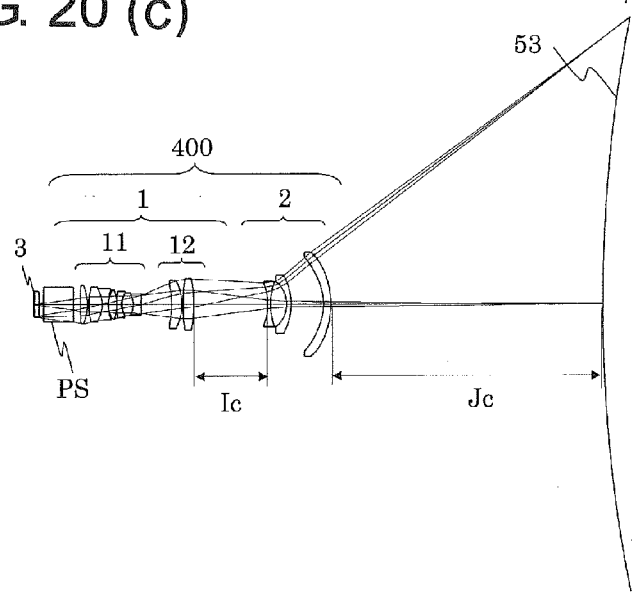

FIG. 20 is a diagram for illustrating functions of the projection optical element 400. FIG. 20(a) shows a case where image light from the display device 3 is projected on the screen 51 having the planar shape. FIG. 20(b) shows a case where the image light from the display device 3 is projected on the screen 52 having the concave shape to the projection optical system 400 side. FIG. 20(c) shows a case where the image light from the display device 3 is projected on the screen 53 having the convex shape to the projection optical system 400 side.

In this embodiment, positions of the first lens group 1 and the second lens group 2 are adjusted in the direction of the optical axis in accordance with the shape (i.e., planar, concave or convex shape) of the screen 5. When the position of only one of the first lens group 1 and the second lens group 2 is adjusted, the distance between the second lens group 2 and the screen 5 largely changes as shown in FIGS. 7 and 16, and therefore the size of the projected image also largely changes.

Figure 21:
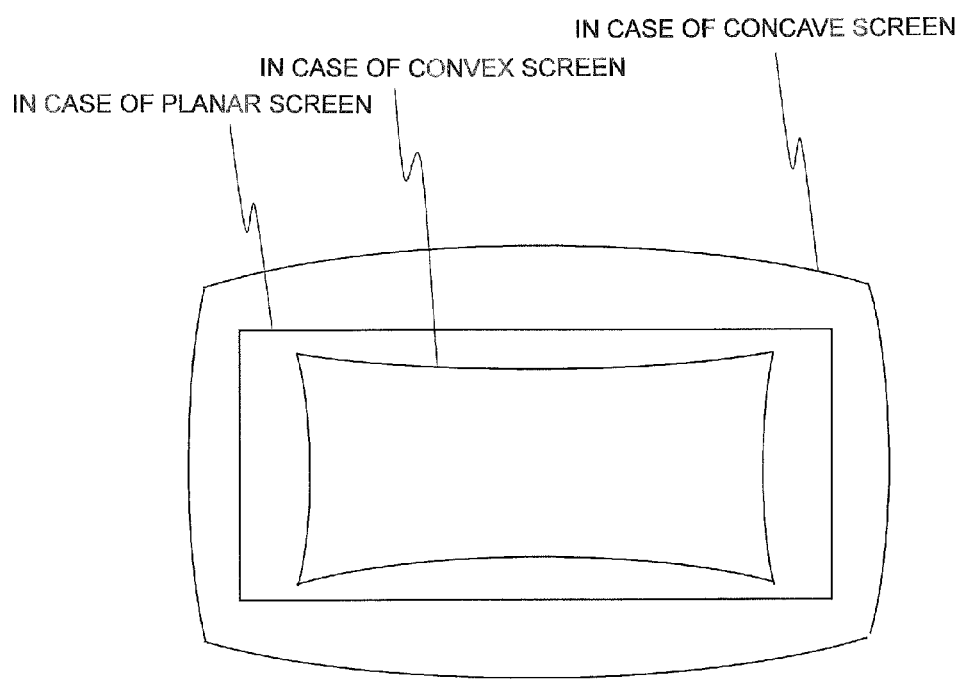
FIG. 21 is a reference diagram showing a distortion of a projected image on the screen.

FIG. 21 shows profiles of projected images on the screen 5 respectively when the screen 5 has the planar shape (i.e., a planar screen), the concave shape to the projection optical system 400 side (i.e., a concave screen), and the convex shape to the projection optical system 400 side (i.e., a convex screen). When the screen 5 has the planar shape, the projected image has a rectangular shape which is similar to the shape of the display device 3. However, when the screen 5 has the concave shape, the distance between the second lens group 2 and the screen 5 increases, so that a barrel-shaped distortion occurs due to the concave shape of the screen 5 and an image size becomes larger. When the screen 5 has the convex shape, the distance between the second lens group 2 and the screen 5 decreases, so that a pincushion-shaped distortion occurs due to the convex shape of the screen 5 and the image size becomes smaller.

In this way, when the position of only one of the first lens group 1 and the second lens group 2 is adjusted, the image size changes according to the movement of the lens group. Therefore, a constant image size cannot be obtained, and image brightness also changes. Further, when the screen 5 has the concave shape, the image is projected on a larger area, as compared with a rectangular area on which the image is projected when the screen 5 has the planar shape. Therefore, in order to display all image information, it is necessary to reduce display content by signal processing so as to fit within the rectangular area. As a result, effective pixels that can be used for image displaying decreases. Further, when the screen 5 has the convex shape, the image is projected on a smaller area. Therefore, the image cannot be displayed entirely in the rectangular area. Accordingly, in this embodiment, the above described phenomena (i.e., a change in image brightness, a decrease in effective pixels and a decrease in display area) are reduced by moving both of the first lens group 1 and the second lens group 2.

A distance between the prism PS and the first lens group 1, a distance (Ia, Ib, Ic) between the first lens group 1 and the second lens group 2, and a distance (Ja, Jb, Jc) between the second lens group 2 and the screen 51, 52 and 53 change, while the shape of each lens is the same throughout FIGS. 20(a), 20(b) and 20(c).

This embodiment is the same as Embodiment 2 in adjustment of the position of the second lens group 2. A change in size of the projected image caused by the adjustment is suppressed by moving the first lens group 1.

Figure 22:
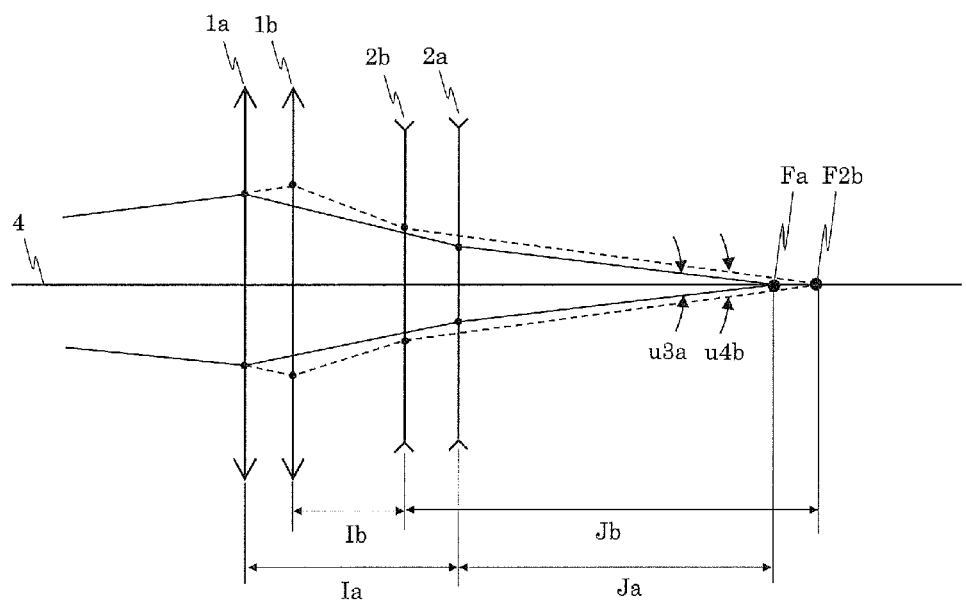
FIG. 22(a) is a diagram showing a convergent state of on-axis light in Embodiment 4, and FIG. 22 (b) is a reference diagram.
Figure 22:
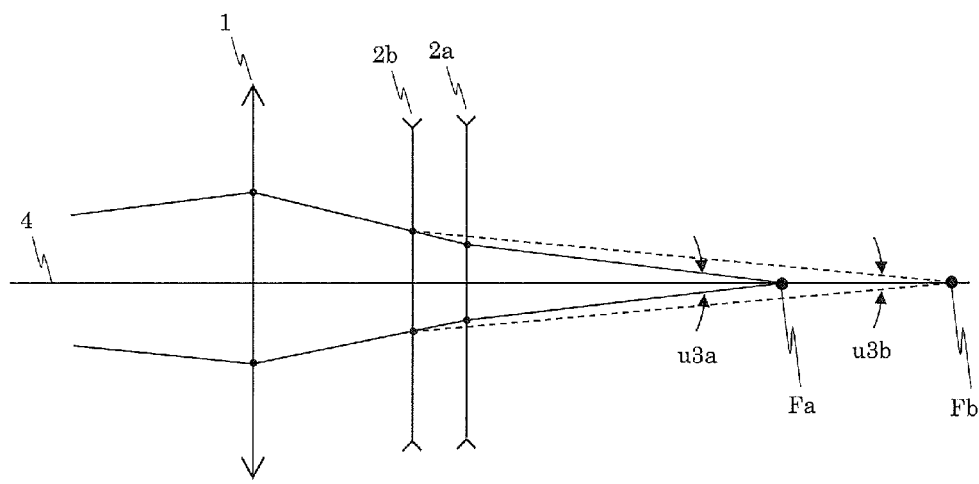

FIG. 22(a) is a diagram for illustrating a change in position of the image surface on the optical axis in FIG. 20(a) and FIG. 20(b). 1a and 1b indicate the first lens group 1 located at positions shown in FIG. 20(a) and FIG. 20(b), which are schematically illustrated as thin lenses. 2a and 2b indicate the second lens group 2 located at positions shown in FIG. 20(a) and FIG. 20(b), which are schematically illustrated as thin lenses. u3a and u4b indicate respective convergent angles of the on-axis light when emitted from the second lens group 2 respectively in FIG. 20(a) and FIG. 20(b). Fa and F2b indicate respective focal points of the on-axis light emitted from the second lens group 2 (i.e., positions of the image surface on the optical axis) respectively in FIG. 20(a) and FIG. 20(b). For comparison, FIG. 22(b) shows a change in position of the image surface on the optical axis in the case where the first lens group 1 is not moved but the second lens group 2 is moved as shown in FIGS. 5(a) and 5(b).

When the image surface is concave to the projection optical system 400 side as shown in FIG. 20(b), the second lens group 2b is moved from a position 2a in a direction toward the first lens group 1. In this state, as shown in FIG. 22(b), a position of the image surface on the optical axis moves from Fa to Fb, and is largely distanced from the second lens group 2b, with the result that the image size changes. Accordingly, as shown in FIG. 22(a), the first lens group 1b is moved from a position 1a in a direction toward the second lens group 2. In other words, the distance between the first lens group 1 and the second lens group 2 decreases (Ib<Ia). Since the on-axis light incident on the first lens group 1b is in a divergent state, a region where the on-axis light is incident on the first lens group 1b is larger than a region where the on-axis light is incident on the first lens group 1a. The first lens group 1 is so configured that the on-axis light is refracted with a stronger positive power as the region on which the on-axis light is incident becomes larger (i.e., refracted with a weaker positive power as the region on which the on-axis light is incident becomes smaller). Therefore, the on-axis light is refracted by the first lens group 1b with a stronger positive power than in FIG. 20(a) (i.e., than in FIG. 22(b)). As a result, the convergent angle of the on-axis light incident on the second lens group 2b becomes larger than in FIG. 20(a). Therefore, it is possible to prevent the convergent angle u4b from being excessively small relative to the convergent angle u3a.

That is, when only the second lens group 2 is moved as shown in FIG. 22(b), the convergent angle u3b consequently becomes significantly smaller than the convergent angle u3a. However, the convergent angle can be controlled by moving the first lens group 1 in addition to the second lens group 2, and the change in convergent angle can be reduced. Further, although the focal point on the optical axis (i.e., the position of the image surface on the optical axis) moves away from the second lens group 2 by the above described function (Ja<Jb), the change in position of the image surface on the optical axis can be reduced since the change in convergent angle is reduced.

Figure 23:
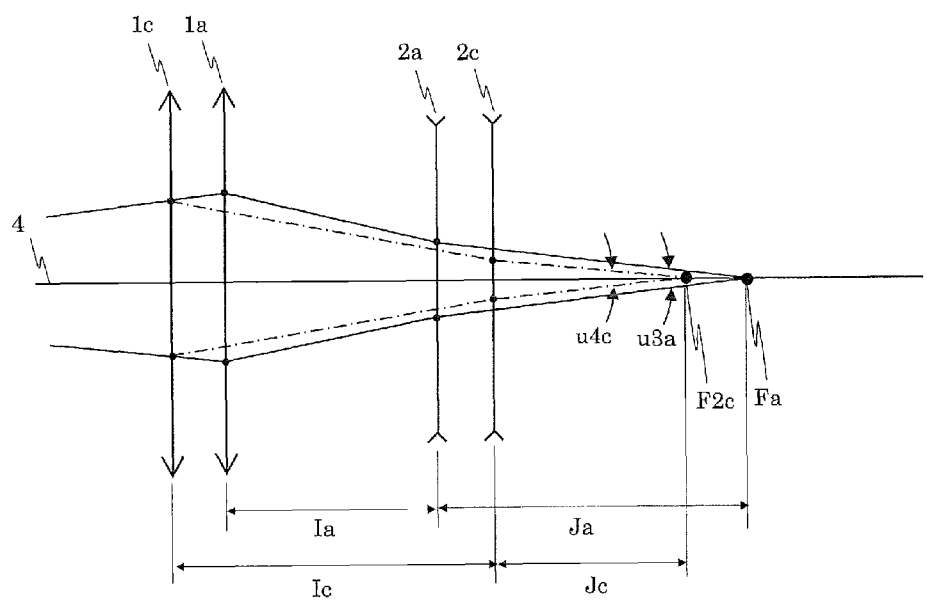
FIG. 23(a) is a diagram showing a convergent state of the on-axis light in Embodiment 4, and FIG. 23 (b) is a reference diagram.
Figure 23:
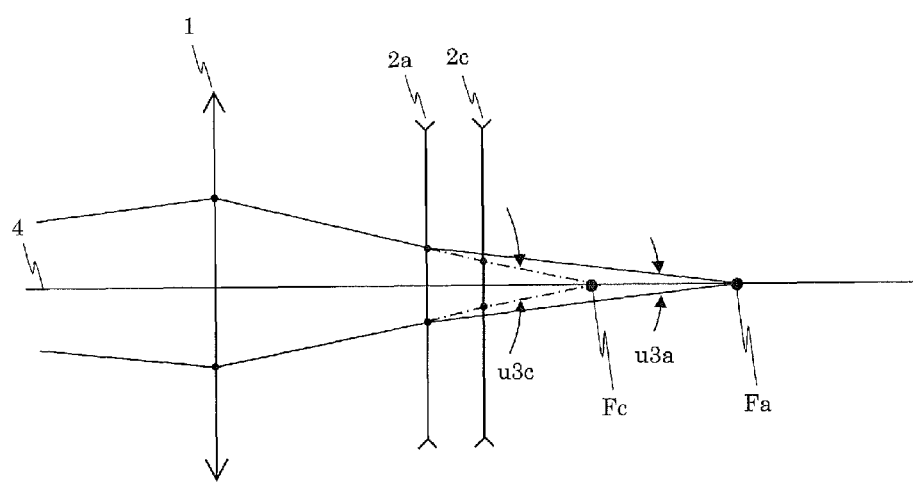

Similarly, FIG. 23(a) is a diagram for illustrating a change in position of the image surface on the optical axis in FIG. 20(a) and FIG. 20(c). 1a and 1c indicate the first lens group 1 located at positions shown in FIG. 20(a) and FIG. 20(c), which are schematically illustrated as thin lenses. 2a and 2c indicate the second lens group 2 located at positions shown in FIG. 20(a) and FIG. 20(c), which are schematically illustrated as thin lenses. u3a and u4c indicate respective convergent angles of the on-axis light when emitted from the second lens group 2 respectively in FIG. 20(a) and FIG. 20(c). Fa and F2c indicate respective focal points of the on-axis light emitted from the second lens group 2 (i.e., positions of the image surface on the optical axis) respectively in FIGS. 20(a) and 20(c). For comparison, FIG. 23(b) shows a change in position of the image surface on the optical axis in the case where the first lens group 1 is not moved but the second lens group 2 is moved as shown in FIGS. 5(a) and 5(b).

When the image surface is convex to the projection optical system 400 side as shown in FIG. 20(c), the second lens group 2c is moved from the position 2a in a direction away toward the first lens group 1. In this state, as shown in FIG. 23(b), a position of the image surface on the optical axis moves from Fa to Fc, and is largely approaches the second lens group 2c, with the result that the image size changes. Accordingly, as shown in FIG. 23(a), the first lens group 1c is moved in a direction away from the second lens group 2 with reference to the position 1a. In other words, the distance between the first lens group 1 and the second lens group 2 increases (Ia<Ic). Since the on-axis light incident on the first lens group 1c is in a divergent state, a region where the on-axis light is incident on the first lens group 1c is smaller than a region where the on-axis light is incident on the first lens group 1a. The first lens group 1 is so configured that the on-axis light is refracted with a weaker positive power as the region on which the on-axis light is incident becomes smaller (i.e., refracted with a stronger positive power as the region on which the on-axis light is incident becomes larger). Therefore, the on-axis light is refracted by the first lens group 1c with a weaker positive power than in FIG. 20(a) (i.e., than in FIG. 23(b)). As a result, the convergent angle of the on-axis light incident on the second lens group 2c becomes smaller than in FIG. 20(a). Therefore, it is possible to prevent the convergent angle u4c from being excessively large relative to the convergent angle u3a.

That is, when only the second lens group 2 is moved as shown in FIG. 23(b), the convergent angle u3c consequently becomes significantly larger than the convergent angle u3a. However, the convergent angle can be controlled by moving the first lens group 1 in addition to the second lens group 2, and the change in convergent angle can be reduced. Further, although the focal point on the optical axis (i.e., the position of the image surface on the optical axis) moves toward the second lens group 2 by the above described function (Jc<Ja), the change in position of the image surface on the optical axis can be reduced since the change in convergent angle is reduced.

From the above, the distances Ia, Ib and Ic between the first lens group 1 and the second lens group 2 and the distances Ja, Jb and Jc between the second lens group 2 and the screen 5 (i.e., the distances between the second lens group and the focal points of the on-axis light) satisfy the following expressions (30) and (31).

$$Ib < Ia < Ic \tag{30}$$

$$Jc < Ja < Jb \tag{31}$$

Figure 24:
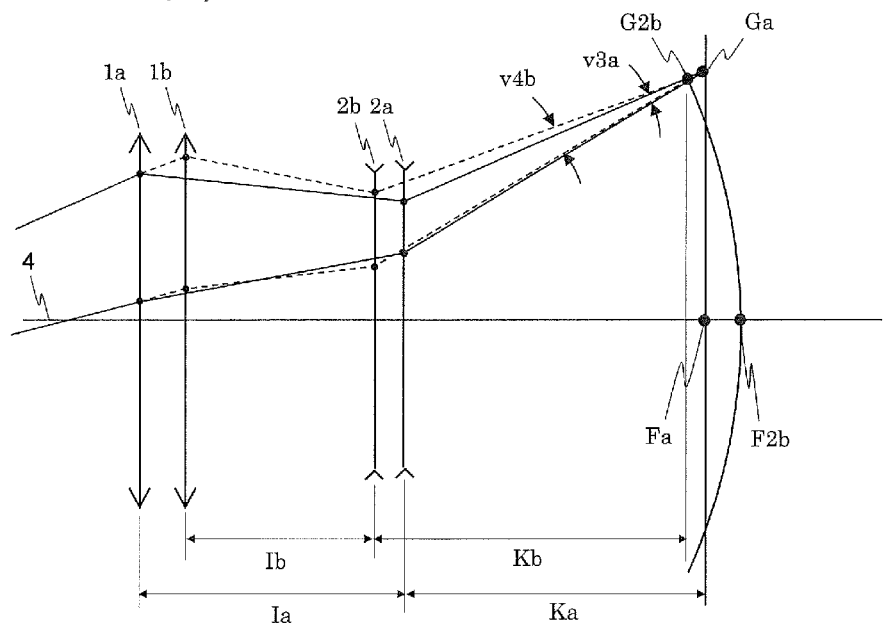
FIG. 24(a) is a diagram showing a convergent state of peripheral light in Embodiment 4, and FIG. 24 (b) is reference diagram.
Figure 24:
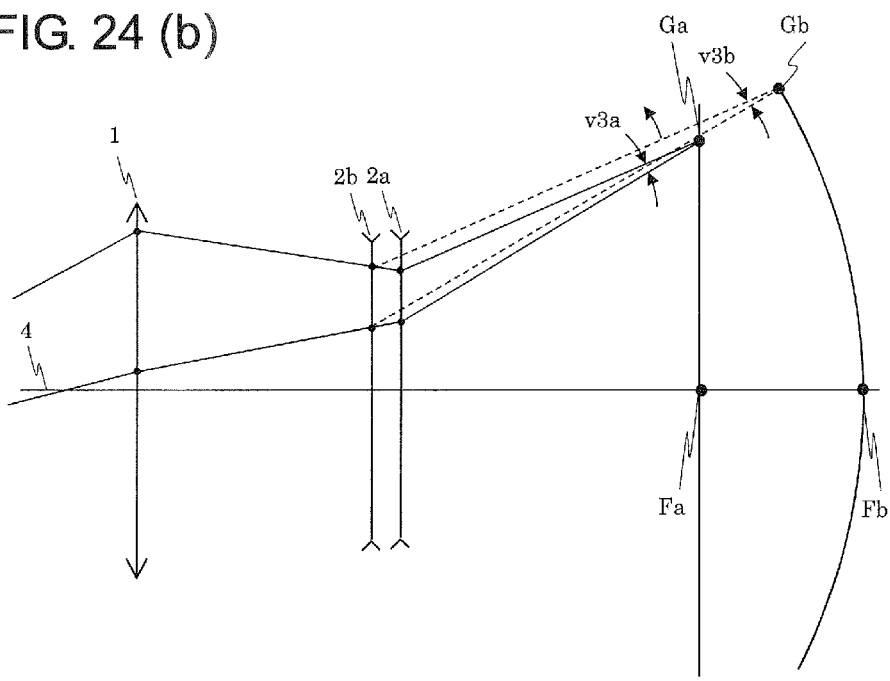

FIG. 24(a) is a diagram for illustrating a change in position of the image surface at the peripheral portion of the screen (i.e., the peripheral light) in FIG. 20(a) and FIG. 20(b). 1a and 1b indicate the first lens group 1 located at positions shown in FIG. 20(a) and FIG. 20(b), which are schematically illustrated as thin lenses. 2a and 2b indicate the second lens group 2 located at positions shown in FIG. 20(a) and FIG. 20(b), which are schematically illustrated as thin lenses. v3a and v4b indicate respective convergent angles of the peripheral light when emitted from the second lens group respectively in FIG. 20(a) and FIG. 20(b). Ga and G2b indicate respective focal points of the peripheral light emitted from the second lens group (i.e., positions of the image surface at the peripheral portion of the screen) respectively in FIG. 20(a) and FIG. 20(b). For comparison, FIG. 24(b) shows a change in position of the image surface at the peripheral portion of the screen in the case where the first lens group 1 is not moved but the second lens group 2 is moved as shown in FIGS. 5(a) and 5(b).

When the image surface is concave to the projection optical system 400 side as shown in FIG. 20(b), the second lens group 2b is moved from a position 2a in a direction toward the first lens group 1. In this state, as shown in FIG. 24(b), a position of the image surface on the optical axis moves from Ga to Gb, and is largely distanced from the second lens group 2b, with the result that the image size becomes larger. Accordingly, as shown in FIG. 24(a), the first lens group 1b is moved from a position 1a in a direction toward the second lens group 2. In other words, the distance between the first lens group 1 and the second lens group 2 decreases (Ib<Ia). Since the peripheral light incident on the first lens group 1b is in a divergent state, a region where the peripheral light is incident on the first lens group 1b is larger than a region where the peripheral light is incident on the first lens group 1a. The first lens group 1 is so configured that the peripheral light is refracted with a stronger positive power as the region on which the peripheral light is incident becomes larger (i.e., refracted with a weaker positive power as the region on which the peripheral light is incident becomes smaller). Therefore, the peripheral light is refracted by the first lens group 1b with a stronger positive power than in FIG. 20(a) (i.e., than in FIG. 24(b)). As a result, the convergent angle of the peripheral light incident on the second lens group 2b becomes larger than in FIG. 20(a). Therefore, it is possible to prevent the convergent angle v4b from being excessively small relative to the convergent angle v3a.

In this example, although the position F2b of the image surface on the optical axis moves to a side opposite to the second lens group 2 with reference to Fa, the position G2b of the image surface at the peripheral portion of the screen moves to the same side as the second group 2 with reference to Ga. Generally, the changing amount of the image surface at the peripheral portion of the screen is larger than the changing amount of the position of the second lens group 2 (Kb<Ka). Therefore, the convergent angle v4b can be made larger than the convergent angle v3a.

Figure 25:
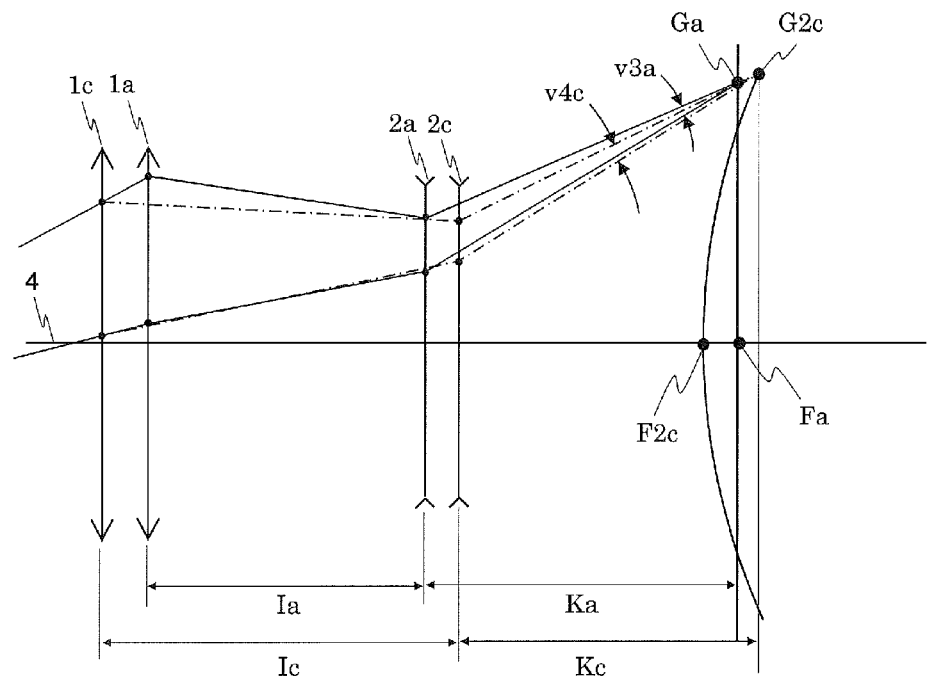
FIG. 25(a) is a diagram showing a convergent state of the peripheral light in Embodiment 4, and FIG. 25 (b) is a reference diagram.
Figure 25:
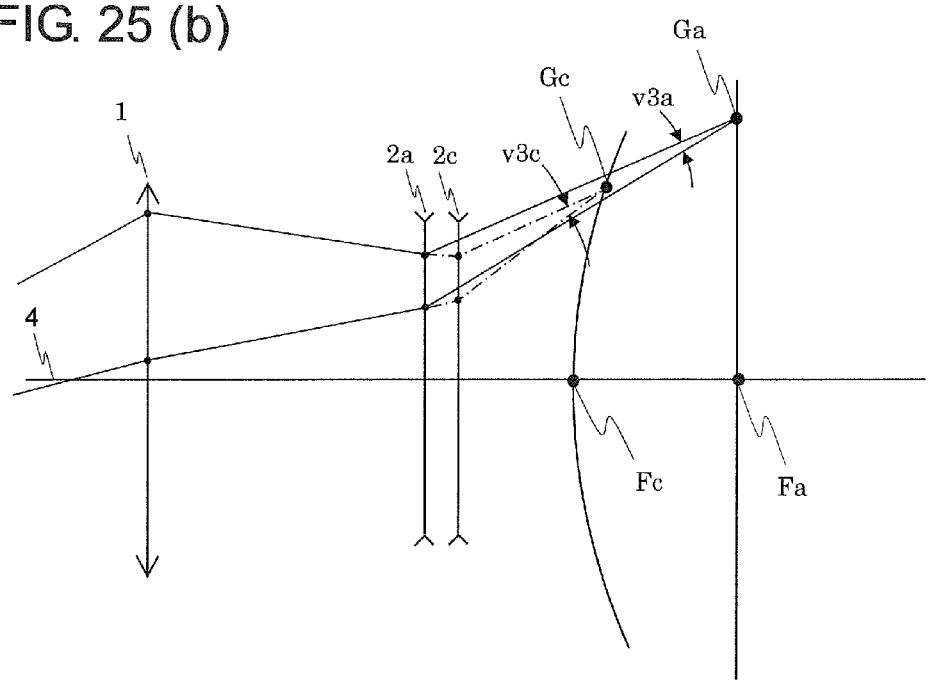

Similarly, FIG. 25(a) is a diagram for illustrating a change in position of the image surface at the peripheral portion of the screen (i.e., the peripheral light) in FIG. 20(a) and FIG. 20(c). 1a and 1c indicate the first lens group 1 located at positions shown in FIG. 20(a) and FIG. 20(c), which are schematically illustrated as thin lenses. 2a and 2c indicate the second lens group 2 located at positions shown in FIG. 20(a) and FIG. 20(c), which are schematically illustrated as thin lenses. v3a and v4c indicate respective convergent angles of the peripheral light when emitted from the second lens group 2 respectively in FIG. 20(a) and FIG. 20(c). Ga and G2c indicate respective focal points of the peripheral light emitted from the second lens group 2 (i.e., positions of the image surface at the peripheral portion of the screen) respectively in FIG. 20(a) and FIG. 20(c). For comparison, FIG. 25(b) shows a change in position of the image surface at the peripheral portion of the screen in the case where the first lens group 1 is not moved but the second lens group 2 is moved as shown in FIGS. 5(a) and 5(c).

When the image surface is convex to the projection optical system 400 side as shown in FIG. 20(c), the second lens group 2b is moved from the position 2a in a direction away from the first lens group 1. In this state, as shown in FIG. 25(b), a position of the image surface at the peripheral portion of the screen moves from Ga to Gc, and is largely approaches the second lens group 2c, with the result that the image size decreases. Accordingly, as shown in FIG. 25(a), the first lens group 1c is moved in a direction toward the second lens group 2 with reference to a position 1a. In other words, the distance between the first lens group 1 and the second lens group 2 increases (Ia<Ic). Since the peripheral light incident on the first lens group 1c is in a divergent state, a region where the peripheral light is incident on the first lens group 1c is smaller than a region where the peripheral light is incident on the first lens group 1a. The first lens group 1 is so configured that the peripheral light is refracted with a weaker positive power as the region on which the peripheral light is incident becomes smaller (i.e., refracted with a stronger positive power as the region on which the peripheral light is incident becomes larger). Therefore, the peripheral light is refracted by the first lens group 1c with a weaker positive power than in FIG. 20(a) (i.e., than in FIG. 25(b)). As a result, the convergent angle of the peripheral light incident on the second lens group 2c becomes smaller than in FIG. 20(a). Therefore, it is possible to prevent the convergent angle v4c from being excessively small relative to the convergent angle v3a.

In this example, although the position F2c of the image surface on the optical axis moves to the same side as the second lens group 2 with reference to Fa, the position G2c of the image surface at the peripheral portion of the screen moves to a side opposite to the second group 2 with reference to Ga. Generally, the changing amount of the image surface at the peripheral portion of the screen is larger than the changing amount of the position of the second lens group 2 (Ka<Kc). Therefore, the convergent angle v4c can be made smaller than the convergent angle v3a.

From the above, the distances Ka, Kb and Kc between the second lens group 2 and the focal points of the peripheral light satisfy the following expression (32).

$$Kb < Ka < Kc \quad (32)$$

Figure 26:
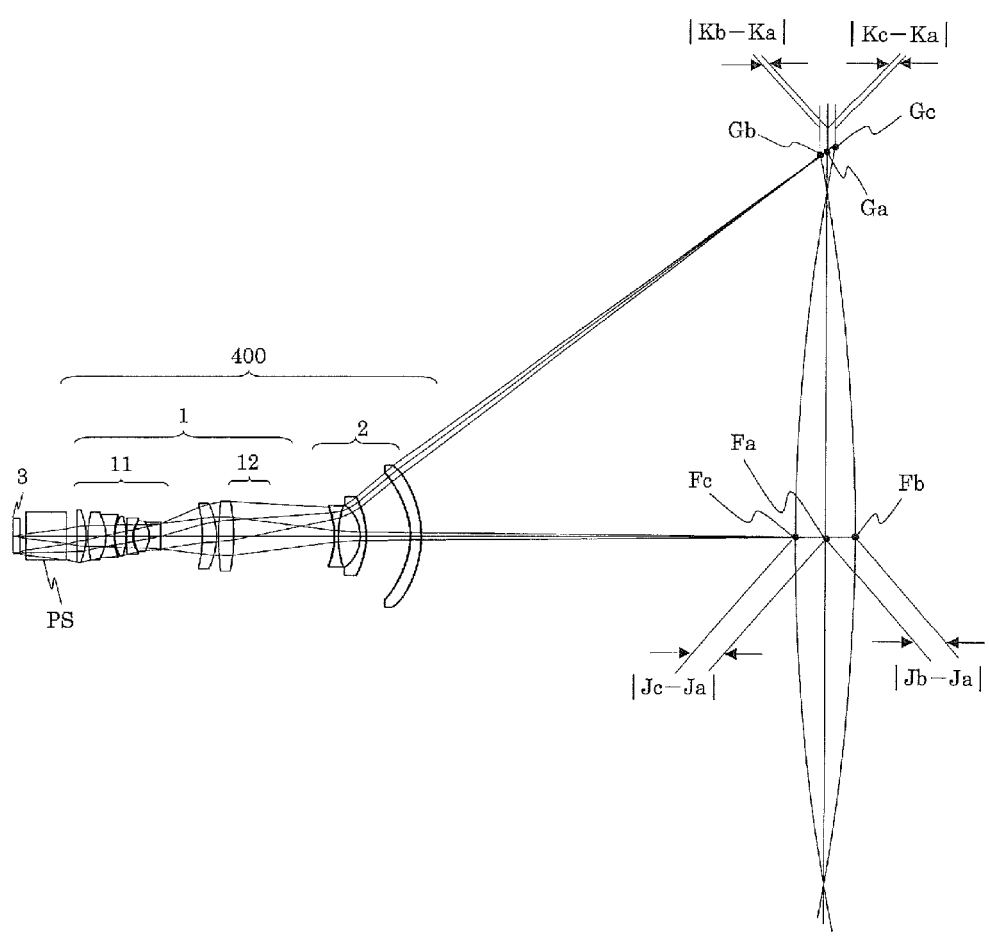
FIG. 26 is a diagram showing operations in which the projection optical system according to Embodiment 4 projects images on the screens having the planar shape, the concave shape and the convex shape, in an overlapping manner.

FIG. 26 shows results of FIGS. 20(a), 20(b) and 20(c) in an overlapping manner. As described in Embodiment 3, the changing amount of the focal position caused by the movement of the lens is larger for the on-axis light than for the peripheral light. Therefore, the distances Ja, Jb and Jc between the second lens group 2 and the focal points of the on-axis light, and the distances Ka, Kb and Kc between the second lens group 2 and the focal points of the peripheral light satisfy the following equations (33) and (34).

$$|Jb-Ja| > |Kb-Ka| \quad (33)$$

$$|Jc-Ja| > |Kc-Ka| \quad (34)$$

Figure 27:
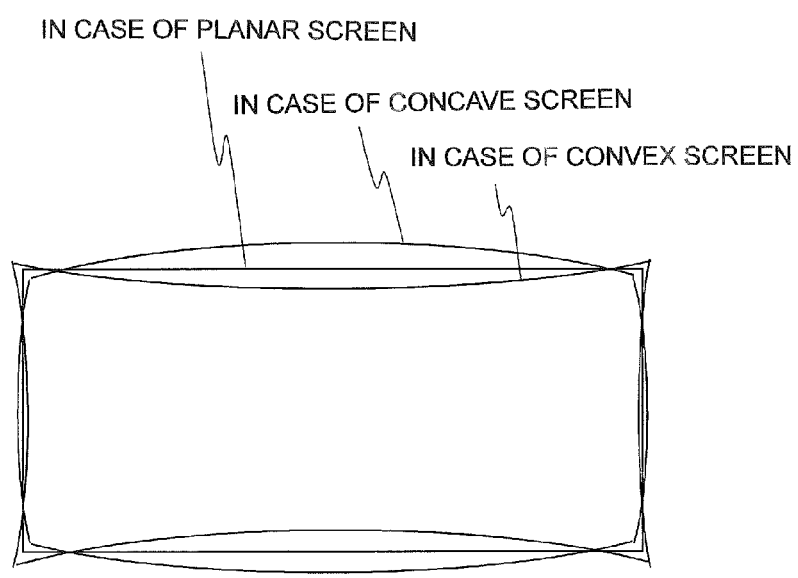
FIG. 27 is a diagram showing a distortion of a projected image on the screen in Embodiment 4.

FIG. 27 shows profiles of projected images on the screen 5 respectively when the screen 5 has the planar shape, the concave shape to the projection optical system 400 side, and the convex shape to the projection optical system 400 side in this embodiment. When the screen 5 has the planar shape, the projected image has a rectangular shape which is similar to the shape of the display device 3. When the screen 5 has the concave shape, a barrel-shaped distortion occurs. Further, when the screen 5 has the convex shape, a pincushion-shaped distortion occurs. However, the position of the image surface on the optical axis and the position of the image surface at the peripheral portion of the screen can be suitably controlled by moving the first lens group 1 and the second lens group 2 as described above, and therefore the size of the projected image does not largely change. Thus, in this embodiment, the change in image brightness, the decrease in effective pixels and the decrease in display area can be reduced.

Numerical Examples

Numerical examples of the projection optical system 400 of this embodiment shown in FIGS. 19 and 20 will be described. Table 11 shows optical data of the projection optical system 400. Definitions in Table 11 are equivalent to those in Table 1. The surface number S17 represents the pupil P. The size of the display device 3 is 14.515 mm×8.165 mm. The F-number on the reduction side is 2.5. The size of the projected image is 15 inches diagonal, when the image surface is the planar surface. The projection magnification is 22.88 times. When the size of the pixel of the display device is 7.56 µm, the size of the pixel projected on the screen 5 is about 0.17 mm.

TABLE 11

| Si (SURFACE NUMBER) | LENS | Ri (RADIUS OF CURVATURE) | Di (SURFACE INTERVAL) | Nd (REFRACTIVE INDEX) | vd (ABBE NUMBER) |
| --- | --- | --- | --- | --- | --- |
| OBJ | | Infinity | 0.483 | | |
| S1 | CG | Infinity | 2.997 | 1.5069 | 63.1 |
| S2 | | Infinity | 3.000 | | |
| S3 | PS | Infinity | 20.000 | 1.6204 | 60.3 |
| S4 | | Infinity | (a)5.151 | | |
| | | | (b)5.000 | | |
| | | | (c)5.331 | | |
| S5 | 201 | 264.394 | 4.669 | 1.8467 | 23.8 |
| S6 | | −33.353 | 1.000 | | |
| S7 | 202 | 50.103 | 8.818 | 1.4970 | 81.6 |
| S8 | 203 | −21.658 | 4.000 | 1.7213 | 34.8 |
| S9 | | 25.980 | 0.500 | | |
| S10 | 204 | 20.599 | 5.452 | 1.4970 | 81.6 |
| S11 | | −33.055 | 0.200 | | |
| S12 | 205 | 99.062 | 3.009 | 1.6483 | 35.2 |
| S13 | | 13.468 | 0.500 | | |
| S14 | 206 | 14.323 | 7.607 | 1.5029 | 80.2 |
| S15 | 207 | −13.570 | 5.572 | 1.6548 | 33.7 |
| S16 | | 149.690 | 0.128 | | |
| S17 | | Infinity | 20.728 | | |
| S18 | 208 | −65.866 | 7.070 | 1.8417 | 27.7 |
| S19 | | −35.020 | 1.000 | | |
| S20 | 209 | 163.183 | 7.275 | 1.8042 | 46.5 |
| S21 | | −94.024 | (a)50.000 | | |
| | | | (b)50.425 | | |
| | | | (c)49.520 | | |
| S22 | 210 | −39.368 | 2.000 | 1.4970 | 81.6 |
| S23 | | 48.412 | 10.967 | | |
| S24 | 211 | −19.239 | 3.000 | 1.8467 | 23.8 |
| S25 | | −39.566 | 21.815 | | |
| S26* | 212 | −36.561 | 5.000 | 1.5311 | 56.0 |
| S27* | | −55.791 | (a)200.000 | | |
| | | | (b)215.000 | | |
| | | | (c)185.000 | | |
| IMA | IMA | (a)Infinity | | | |
| | | (b)−1000.000 | | | |
| | | (c)1000.000 | | | |

Table 12 shows aspherical data. Definitions in Table 12 are equivalent to those in Table 2.

TABLE 12

| SURFACE NUMBER | k | A4 | A6 | A8 | A10 | A12 |
| --- | --- | --- | --- | --- | --- | --- |
| S25 | −1.144600E+00 | 8.524152E−07 | 4.158249E−09 | −9.273413E−12 | 9.379142E−15 | −4.726130E−18 |
| S26 | 1.121222E+00 | 7.606562E−07 | 2.299899E−09 | −3.959267E−12 | 3.575719E−15 | −1.280624E−18 |

Table 13 shows respective parameters of this embodiment. From Table 13, it will be appreciated that the above described expressions (30) through (34) are satisfied.

TABLE 13

| PARAMETER | VALUE |
|---|---|
| Ja | 200.000 |
| Jb | 215.000 |
| Jc | 185.000 |
| Ia | 50.000 |
| Ib | 50.425 |
| Ic | 49.520 |
| Ka | 200.000 |
| Kb | 197.200 |
| Kc | 204.000 |
| |Jb − Ja| | 15.000 |
| |Jc − Ja| | 15.000 |
| |Kb − Ka| | 2.800 |
| |Kc − Ka| | 4.000 |
| u3a | 1.020 |
| U3b | 0.979 |
| u3c | 1.072 |
| V3a | 1.380 |
| V3b | 1.401 |
| V3c | 1.371 |
| |u3b − u3a| | 0.041 |
| |V3b − v3a| | 0.021 |
| |u3c − u3a| | 0.052 |
| |v3c − v3a| | 0.008 |

FIGS. 28A, 28B and 28C show spot diagrams on the screen respectively when the screen 5 has the planar shape, the concave shape to the projection optical system 400 side, and the convex shape to the projection optical system 400 side. Here, red light having a wavelength of 630 nm, green light having a wavelength of 530 nm, blue light having a wavelength of 460 nm are used. The ratio of the amounts of the red light, the green light and the blue light incident on the screen is set to 3:6:1.

From FIGS. 28A, 28B and 28C, a divergence of the spot is approximately less than or equal to a size of a pixel (0.17 mm). It is appreciated that satisfactory performance is obtained in all cases where the screen 5 is planar, concave and convex.

In this embodiment, a radius of curvature of the image surface is set to 1000 mm for either of the concave surface and the convex surface. However, as described above, the radius of curvature of the screen 5 may be arbitrarily set within the focal depth. Here, description has been made of the case where the screen 5 is made planar, concave and convex by adjusting the position of the lens. In this regard, satisfactory performance is obtained by adjusting the position of the lens so that an absolute value of the radius of curvature of the image surface is in a range from 1000 mm to infinity.

As described above, the projection optical system 400 of Embodiment 4 of the present invention is able to change the curvature of the image surface (i.e., change the image surface to the planar, concave or convex surface) and to reduce the change in image size by moving the second lens group 2 and the first lens group 1. Therefore, it becomes possible to obtain the image surface that matches the desired screen shape and size. Further, since the image surface that matches the desired screen shape and size can be obtained, it becomes possible to suppress performance deterioration caused by defocusing of the image light.

In this embodiment, the first lens group 1 and the second lens group 2 are respectively entirely moved. However, this embodiment is not limited thereto. It is also possible to move part of lenses or lens groups constituting the first lens group 1 and the second lens group 2. Further, as schematically described with reference to FIGS. 22 through 25, it is only necessary to move the first lens group 1 having a positive power as a whole and the second lens group 2 having a negative power as a whole. This does not exclude a case where the first lens group 1 and the second lens group 2 include a non-movable lens or lens group.

Embodiment 5

Figure 29:
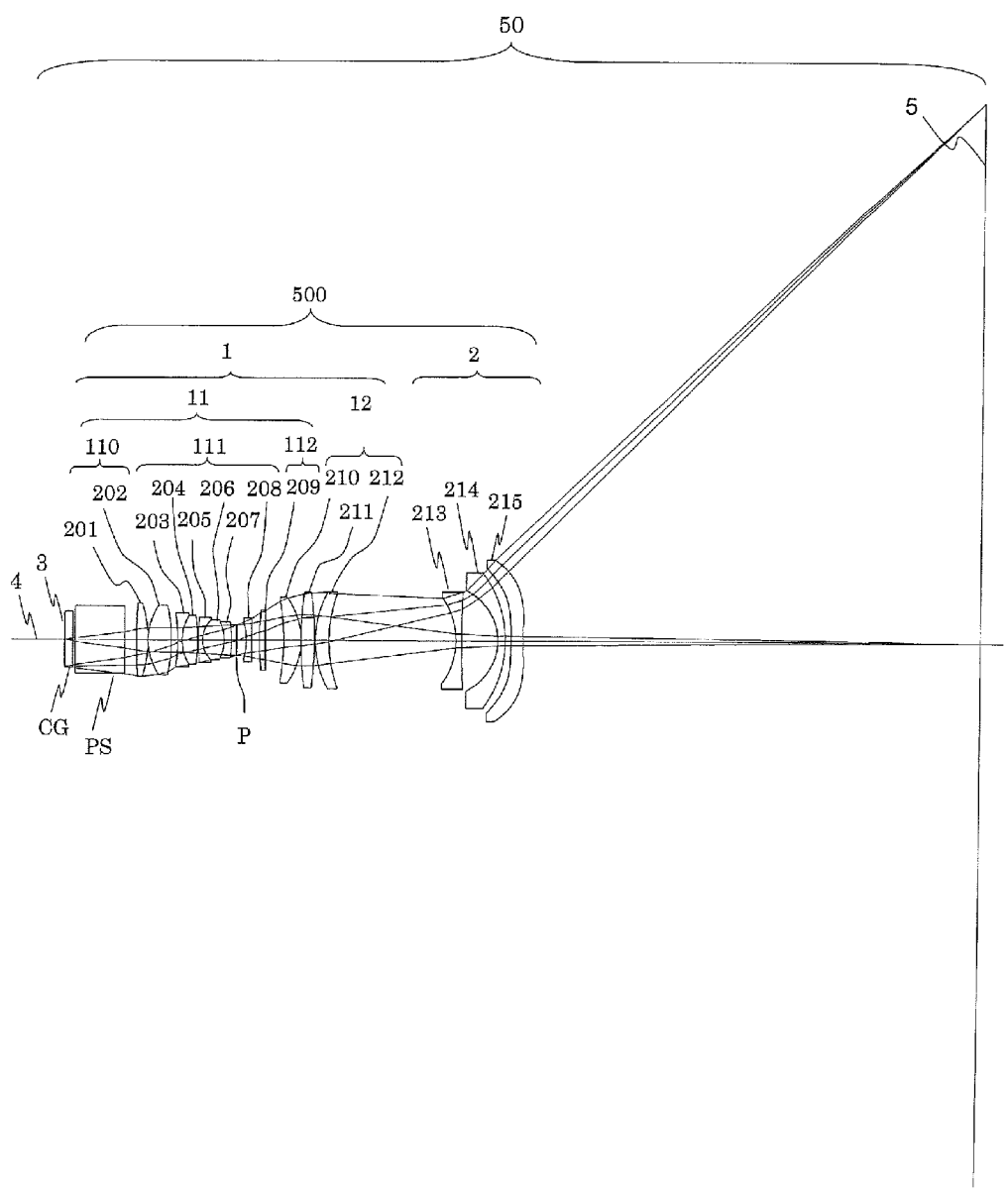
FIG. 29 is a diagram showing a configuration of a projection-type image display apparatus according to Embodiment 5 of the present invention.

FIG. 29 is a diagram showing a configuration of a projection-type image display apparatus 50 according to Embodiment 5 of the present invention. The illumination optical system (including the light source) and the like are the same as those of Embodiment 1 (FIG. 1), and are omitted in the figure. Components that are the same as those shown in FIG. 1 are assigned with the same reference numerals. As for light paths, a light path of the on-axis light and a light path of the peripheral light (i.e., a light path passing through a point on the display device 3 farthest from the optical axis, and reaching an outermost peripheral portion of a projected image) are shown.

The projection-type image display apparatus 50 includes a projection optical system 500. The projection optical system 500 includes a first lens group 1 having a positive power, and a second lens group 2 having a negative power, in the order from the reduction side toward the enlargement side. The first lens group 1 includes a sub-lens group 11 having a positive power, and a sub-lens group 12 having a positive power, in the order from the reduction side. The sub-lens group 11 includes a sub-lens group 110 having a positive power, a sub-lens group 111 having a negative power, and a sub-lens group 112 having a positive power, in the order from the reduction side.

The sub-lens group 110 includes a biconvex lenses 201 and 202 in the order from the reduction side. The sub-lens group 111 includes a biconcave lens 203, a biconvex lens 204, a negative meniscus lens 205 whose concave surface faces the enlargement side, a biconvex lens 206, a negative meniscus lens 207 whose concave surface faces the reduction side, and a biconcave lens 208, in the order from the reduction side. The sub-lens group 112 includes a positive meniscus lens 209 whose convex surface faces the reduction side. The sub-lens group 12 includes a positive meniscus lens 210 whose convex surface faces the enlargement side, and a biconvex lens 211, and a positive meniscus lens 212 whose convex surface faces the reduction side in the order from the reduction side. The second lens group 2 includes a biconcave lens 213, a negative meniscus lens 214 whose concave surface faces the reduction side, and an aspherical lens 215.

Figure 30:
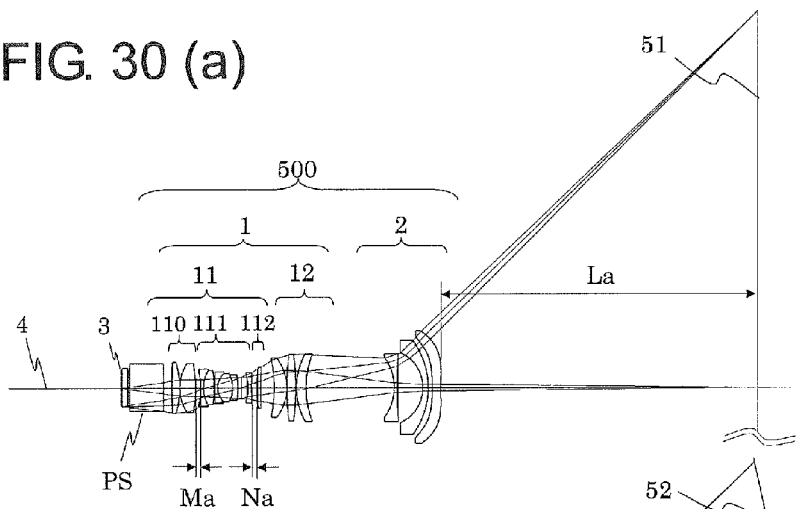
FIGS. 30(a), 30(b) and 30(c) are diagrams showing operations in which a projection optical system according to Embodiment 5 projects images on screens having a planar shape, a concave shape and a convex shape.
Figure 30:
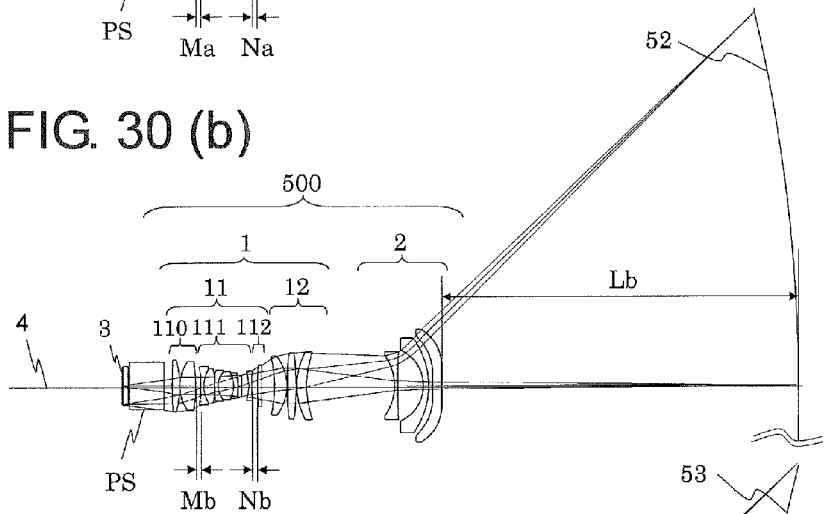
Figure 30:
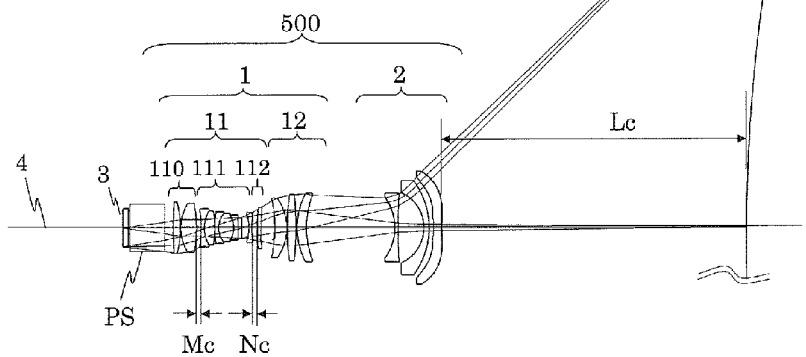

FIG. 30 is a diagram for illustrating functions of the projection optical element 500. FIG. 30(a) shows a case where image light from the display device 3 is projected on the screen 51 having the planar shape. FIG. 30(b) shows a case where the image light from the display device 3 is projected on the screen 52 having the concave shape to the projection optical system 500 side. FIG. 30(c) shows a case where the image light from the display device 3 is projected on the screen 53 having the convex shape to the projection optical system 500 side.

In this embodiment, positions of the sub-lens group 111 and the sub-lens group 112 are adjusted in the direction of the optical axis in accordance with the shape (i.e., planar, concave or convex shape) of the screen 5. As described above, when the position of only one lens group is adjusted, the distance between the second lens group 2 and the screen 5 largely changes as shown in FIGS. 7 and 16, and therefore the size of the projected image also largely changes. Accordingly, as was described in Embodiment 4, two sub-lens groups 111 and 112 are moved in this embodiment so as to reduce the change in image brightness, the decrease in effective pixels and the decrease in display area caused by the change in size of the projected image.

A distance (Ma, Mb, Mc) between the sub-lens group 110 and the sub-lens group 111, a distance (Na, Nb, Nc) between the sub-lens group 111 and the sub-lens group 112, and a distance (La, Lb, Lc) between the second lens group 2 and the screen 51, 52 and 53 change, while the shape of each lens is the same throughout FIGS. 30(a), 30(b) and 30(c).

Figure 31:
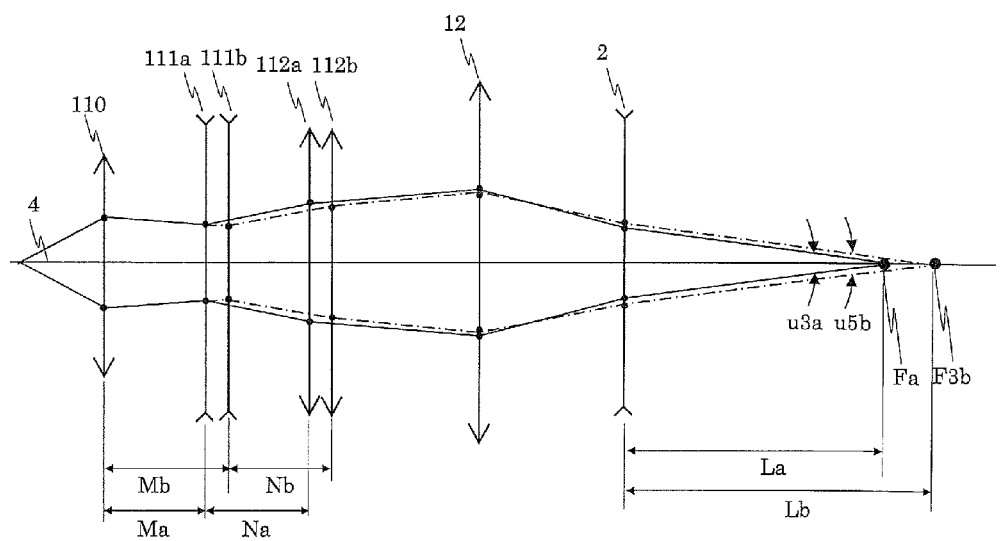
FIGS. 31(a) and 31(b) are diagrams showing a convergent state of on-axis light in Embodiment 5.
Figure 31:
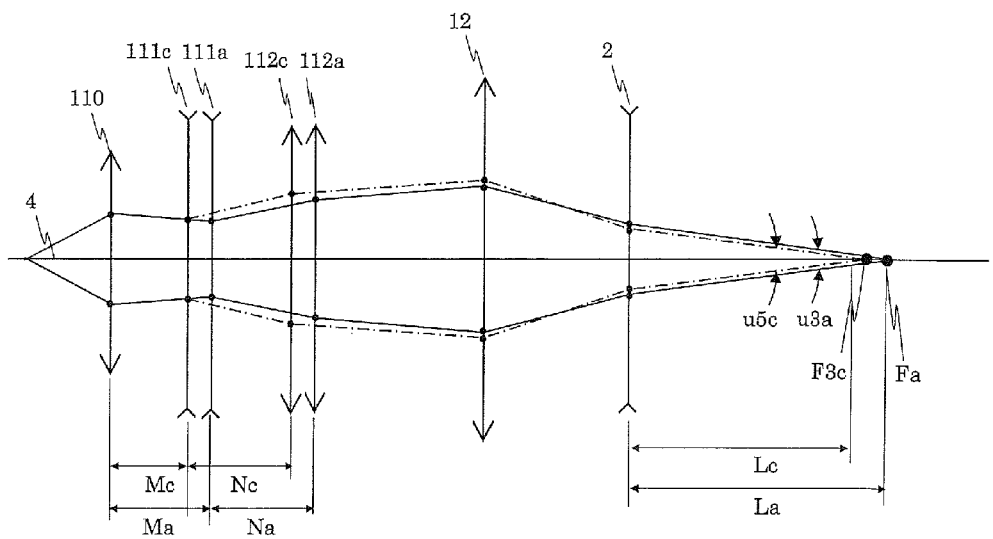

FIG. 31(a) is a diagram for illustrating a change in position of the image surface on the optical axis in FIG. 30(a) and FIG. 30(b). 111a and 111b indicate the sub-lens group 111 located at positions shown in FIG. 30(a) and FIG. 30(b), which are schematically illustrated as thin lenses. 112a and 112b indicate the sub-lens group 112 located at positions shown in FIG. 30(a) and FIG. 30(b), which are schematically illustrated as thin lenses. Other lens groups (i.e., the sub-lens group 110, the sub-lens group 12 and the second lens group 2) are also schematically illustrated as thin lenses. u3a and u5b indicate respective convergent angles of the on-axis light when emitted from the second lens group 2 respectively in FIG. 30(a) and FIG. 30(b). Fa and F3b indicate respective focal points of the on-axis light emitted from the second lens group 2 (i.e., positions of the image surface on the optical axis) respectively in FIG. 30(a) and FIG. 30(b).

FIG. 31(b) is a diagram for illustrating a change in position of the image surface on the optical axis in FIG. 30(a) and FIG. 30(c). 111a and 111c indicate the sub-lens group 111 located at positions shown in FIG. 30(a) and FIG. 30(c), which are schematically illustrated as thin lenses. 112a and 112c indicate the sub-lens group 112 located at positions shown in FIG. 30(a) and FIG. 30(c), which are schematically illustrated as thin lenses. Other lens groups (i.e., the sub-lens group 110, the sub-lens group 12 and the second lens group 2) are also schematically illustrated as thin lenses. u3a and u5c indicate respective convergent angles of the on-axis light when emitted from the second lens group 2 respectively in FIG. 30(a) and FIG. 30(c). Fa and F3c indicate respective focal points of the on-axis light emitted from the second lens group (i.e., positions of the image surface on the optical axis) respectively in FIG. 30(a) and FIG. 30(c).

The distances Ma, Mb and Mc between the sub-lens group 110 and the sub-lens group 111a, 111b and 111c, the distances Na, Nb and Nc between the sub-lens group 111a, 111b and 111c and the sub-lens group 112a, 112b and 112c, and the distances La, Lb and Lc between the second lens group 2 and the screen 5 (i.e., distances between the second lens group 2 and the focal points on the optical axis) satisfy the following expressions (35) and (36).

$$Mc<Ma<Mb \quad (35)$$

$$Nc<Na<Nb \quad (36)$$

When the image surface is concave to the projection optical system 500 side as shown in FIG. 30(b), the sub-lens group 111b is moved from a position 111a in a direction away from the sub-lens group 110 (Ma<Mb). The on-axis light emitted from the sub-lens group 110 is in a convergent state, and therefore a region where the on-axis light is incident on the sub-lens group 111b is smaller than a region where the on-axis light is incident on the sub-lens group 111a. The sub-lens group 111 is so configured that the on-axis light is refracted with a weaker positive power as the region on which the on-axis light is incident becomes smaller (i.e., refracted with a stronger positive power as the region on which the on-axis light is incident becomes larger). Therefore, the on-axis light is refracted by the sub-lens group 111b with a weaker negative power than in FIG. 30(a). If the sub-lens group 112 is not moved in this state, the convergent angle of the on-axis light emitted from the second lens group 2 becomes excessively small, and the position of the image surface on the optical axis largely moves in a direction away from the second lens group 2 with reference to Fa.

However, in this embodiment, as shown in FIG. 31(a), as the sub-lens group 111b is moved in a direction away from the sub-lens group 110, the sub-lens group 112b is moved in the same direction by a larger amount. In other words, the distance between the sub-lens group 111b and the sub-lens group 112 increases (Na<Nb). In this state, since the on-axis light emitted from the sub-lens group 111b is in a divergent state, a region where the on-axis light is incident on the sub-lens group 112b becomes larger than when the sub-lens group 112 is not moved. The sub-lens group 112 is so configured that the on-axis light is refracted with a stronger positive power as the region on which the on-axis light is incident becomes larger (i.e., refracted with a weaker positive power as the region on which the on-axis light is incident becomes smaller). Therefore, the on-axis light is refracted by the sub-lens group 112b with a stronger positive power than when the sub-lens group 112 is not moved. As a result, it becomes possible to prevent a convergent angle u5b of the on-axis light emitted from the second lens group from becoming excessively small relative to the convergent angle u3a of the on-axis light in FIG. 30(a). Further, it becomes possible to prevent the position F3b of the image surface on the optical axis from largely moving toward the second lens group 2 with reference to the position Fa of the image surface of the on-axis light in FIG. 30(a).

When the image surface is convex to the projection optical system 500 side as shown in FIG. 30(c), the sub-lens group 111c is moved from the position 111a in a direction toward the sub-lens group 110 (Mc<Ma). The on-axis light emitted from the sub-lens group 110 is in a convergent state, and therefore a region where the on-axis light is incident on the sub-lens group 111c is larger than a region where the on-axis light is incident on the sub-lens group 111a. The sub-lens group 111 is so configured that the on-axis light is refracted with a stronger positive power as the region on which the on-axis light is incident becomes larger (i.e., refracted with a weaker positive power as the region on which the on-axis light is incident becomes smaller). Therefore, the on-axis light is refracted by the sub-lens group 111c with a stronger negative power than in FIG. 30(a). If the sub-lens group 112 is not moved in this state, the convergent angle of the on-axis light emitted from the second lens group 2 becomes excessively large, and the position of the image surface on the optical axis largely moves in a direction toward the second lens group 2 with reference to Fa.

However, in this embodiment, as shown in FIG. 31(b), as the sub-lens group 111c is moved in a direction toward the sub-lens group 110, the sub-lens group 112c is moved in the same direction by a larger amount. In other words, the distance between the sub-lens group 111 and the sub-lens group 112 decreases (Nc<Na). In this state, since the on-axis light emitted from the sub-lens group 111c is in a divergent state, a region where the on-axis light is incident on the sub-lens group 112c becomes larger than when the sub-lens group 112 is not moved. The sub-lens group 112 is so configured that the on-axis light is refracted with a weaker positive power as the region on which the on-axis light is incident becomes smaller (i.e., refracted with a stronger positive power as the region on which the on-axis light is incident becomes larger). Therefore, the on-axis light is refracted by the sub-lens group 112c with a weaker positive power than when the sub-lens group 112 is not moved. As a result, it becomes possible to prevent a convergent angle u5c of the on-axis light emitted from the second lens group from becoming excessively large relative to the convergent angle u3a of the on-axis light in FIG. 30(a). Further, it becomes possible to prevent the position F3c of the image surface on the optical axis from largely moving toward the second lens group 2 with reference to the position Fa of the image surface of the on-axis light in FIG. 30(a).

Figure 32:
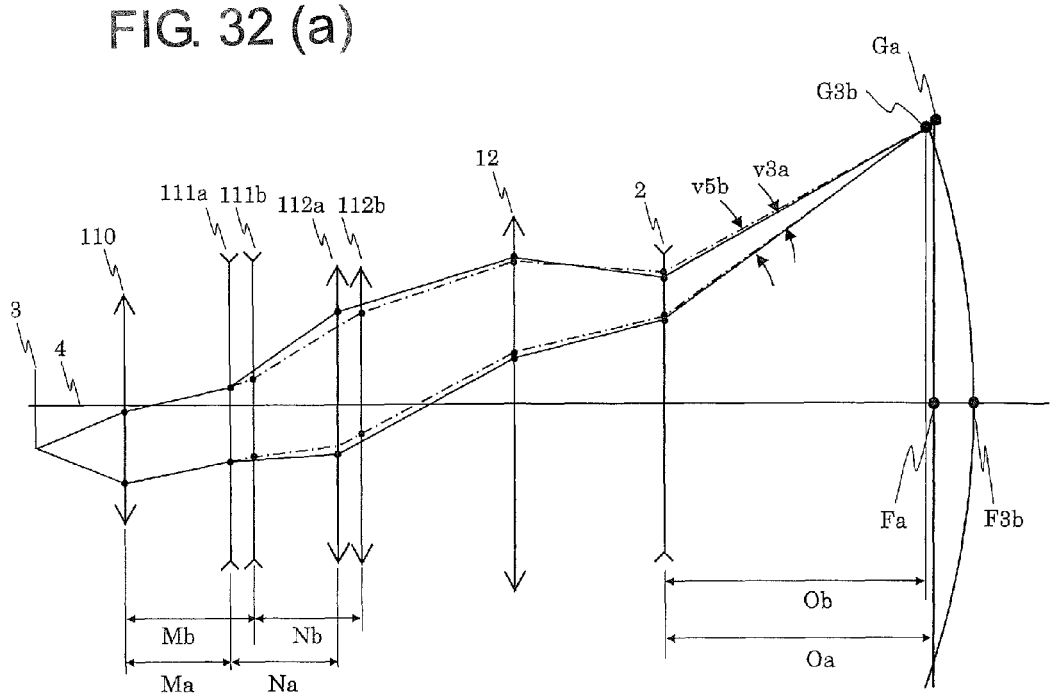
FIGS. 32(a) and 32(b) are diagrams showing a convergent state of peripheral light in Embodiment 5.
Figure 32:
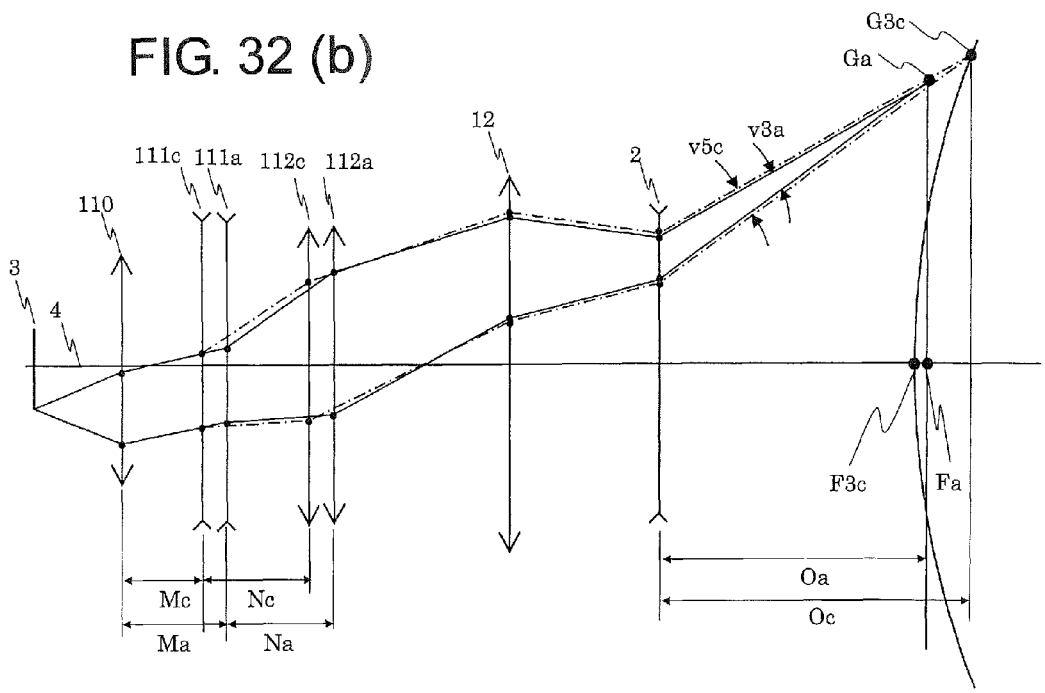

FIG. 32 is a diagram for illustrating a change in position of the image surface at the peripheral portion of the screen (i.e., the peripheral light) in FIG. 30(a) and FIG. 30(b). FIG. 32(a) shows a case where the image surface is concave to the projection optical system 500 side as shown in FIG. 30(b). FIG. 32(b) shows a case where the image surface is convex to the projection optical system 500 side as shown in FIG. 30(c). Numerals for the lenses are the same as those of FIG. 31. V5b and v5c are convergent angles of the peripheral light when emitted from the second lens group 2 respectively in FIG. 30(b) and FIG. 30(c). G3b and G3c indicate respective focal points of the peripheral light emitted from the second lens group 2 (i.e., positions of the image surface at the peripheral portion of the screen) respectively in FIG. 30(b) and FIG. 30(c).

The distances Ma, Mb and Mc between the sub-lens group 110 and the sub-lens group 111a, 111b and 111c, the distances Na, Nb and Nc between the sub-lens group 111a, 111b and 111c and the sub-lens group 112a, 112b and 112c, the distances La, Lb and Lc between the second lens group 2 and the focal points of the on-axis light, and distances Oa, Ob and Oc between the second lens group 2 and the focal points of the peripheral light satisfy the following expressions (37) through (42).

$$|Lb-La|>|Ob-Oa| \qquad (37)$$

$$|Lc-La|<|Oc-Oa| \qquad (38)$$

$$Mb-Ma<Ma-Mc \qquad (39)$$

$$Nb-Na<Na-Nc \qquad (40)$$

$$|Lc-La|<|Lb-La| \qquad (41)$$

$$|Ob-Ga|<|Oc-Oa| \qquad (42)$$

In this embodiment, the focal position of the on-axis light in the case of the concave screen is moved (with reference to the focal position of the on-axis light in the case of the planar screen) by a larger amount than the focal position of the on-axis light in the case of the convex screen (expression (37)). In contrast, the focal position of the peripheral light in the case of the convex screen is moved (with reference to the focal position of the peripheral light in the case of the planar screen) by a larger amount than the focal position of the peripheral light in the case of the concave screen (expression (38)). Therefore, in the case of the concave screen, the moving amount of the focal position (with reference to the focal position in the case of the planar screen) is larger for the on-axis light than for the peripheral light (expression (37)). In contrast, in the case of the convex screen, the moving amount of the focal position (with reference to the focal position in the case of the planar screen) is larger for the peripheral light than for the on-axis light (expression (38)).

Figure 33:
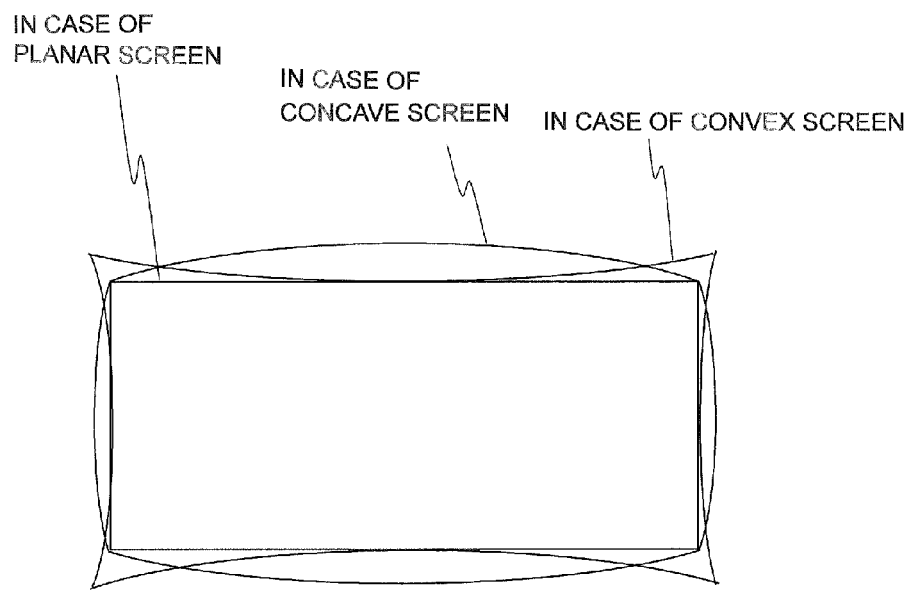
FIG. 33 is a diagram showing a distortion of a projected image on the screen in Embodiment 5.
Figure 34:
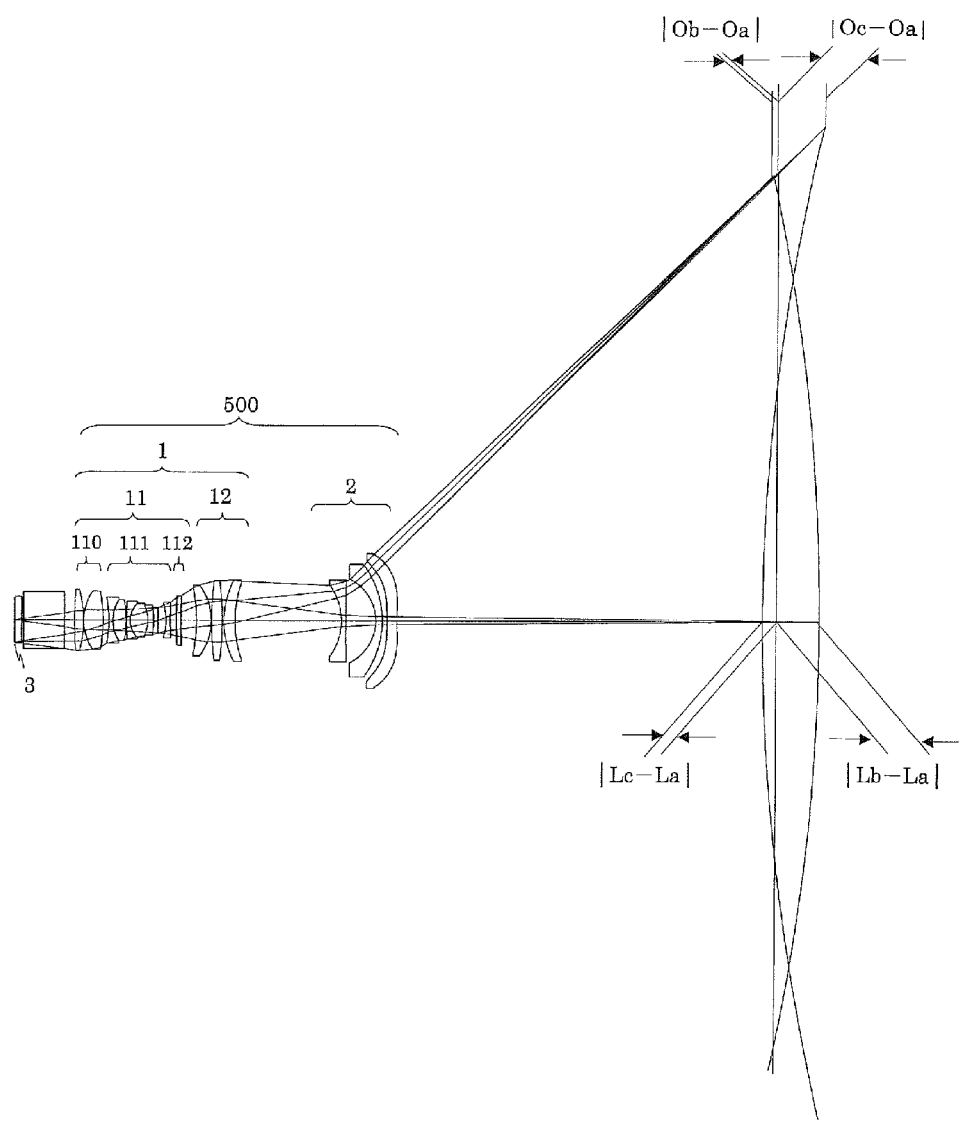
FIG. 34 is a diagram showing operations in which the projection optical system according to Embodiment 5 projects images on the screens having the planar shape, the concave shape and the convex shape, in an overlapping manner.

FIG. 33 shows profiles of the projected images on the screen 5 respectively when the screen 5 has the planar shape (i.e., the planar screen), the concave shape to the projection optical system 500 side (i.e., the concave screen), and the convex shape to the projection optical system 500 side (i.e., the convex screen). When the screen has the planar shape, the projected image has a rectangular shape which is similar to the shape of the display device 3.

In contrast, when the screen 5 has the concave shape (i.e., the concave screen), a barrel-shaped distortion occurs. In this case, by moving the focal position of the on-axis light by a relatively large amount from the focal position in the case of the planar screen, the position of the image surface of the peripheral light (corresponding to four corners of the projected image) is made substantially coincident with four corners of the projected image (having a rectangular shape) in the case of the planar screen.

In contrast, when the screen 5 has the convex shape (i.e., the convex screen), a pincushion-shaped distortion occurs. The image light (principal ray) emitted from the projection optical system 500 largely diverges. Therefore, an incident angle of the principal ray (i.e., an angle between a normal line of the screen surface and the principal ray) is larger in the case of the convex screen than in the case of the concave screen assuming that the curvatures of the screens are the same. Thus, an amount of distortion due to a positional change from the planar screen is larger in the case of the convex screen than in the case of the concave screen. Accordingly, in the case of the convex screen, the focal position of the on-axis light is to be prevented from largely moving from the focal position in the case of the planar screen, and the position of the image surface of the peripheral light (corresponding to four corners of the projected image) is made outside four corners of the projected image (rectangle) projected in the case of the planar screen. Further, in the case of the convex screen, center portions of four sides of the projected image are made in contact with the projected image (rectangle) in the case of the planar screen.

In other words, the moving amount of the focal position of the on-axis light (with reference to the focal position in the case of the planar screen) is made larger in the case of the concave screen than in the case of the convex screen (expression (41)). Further, the moving amount of the focal position of the peripheral light (with reference to the focal position in the case of the planar screen) is made larger in the case of the convex screen than in the case of the concave screen (expression (42)).

In the case of the convex screen, it is necessary that an image is imaged to a higher image height (to a position farther from the optical axis) than in the case of the concave screen, and therefore a change in image height (with reference to that in the case of the planar screen) is large. Therefore, the moving amounts of the sub-lens groups 111 and 112 are made larger in the case of the convex screen (expressions (39) and (40)). In this way, the distance between the second lens group 2 and the screen 5 and the curvature of the image surface are determined so that profiles of the projected images in the cases of the concave screen and convex screen are inscribed by the projected image (rectangle) in the case of the planar screen. Therefore, light projected outside the rectangular area can be minimized. As a result, light loss can be minimized, and a change in brightness can be minimized. Further, since pixels can be effectively used, and a decrease in effective pixels can be prevented.

As described above, when the image surface is convex toward the projection optical system 500 side as shown in FIG. 30(c), a deviation from the plane image surface is larger at the periphery of the screen than on the optical axis. Therefore, the convergent angle u3a, u3c, v3a and v3c of the on-axis light and the peripheral light are set so as to satisfy the following expression (43) which is opposite to the expression (24).

$$|u3c-u3a|<|v3c-v3a| \qquad (43)$$

In this regard, when the image surface is concave toward the projection optical system 500 side as shown in FIG. 30(b), the convergent angle u3a, u3b, v3a, v3b of the on-axis light and the peripheral light are set so as to satisfy the above described expression (23).

Numerical Examples

Numerical examples of the projection optical system 500 of this embodiment shown in FIGS. 29 and 30 will be described. Table 14 shows optical data of the projection optical system 500. Definitions in Table 14 are equivalent to those in Table 1. The surface number S16 represents the pupil P. The size of the display device 3 is 14.515 mm×8.165 mm. The F-number on the reduction side is 2.5. The size of the projected image is 15 inches diagonal, when the image surface is the planar surface. The projection magnification is 19.98 times. When the size of the pixel of the display device is 7.56 μm, the size of the pixel projected on the screen 5 is about 0.15 mm.

Table 15 shows aspherical data. Definitions in Table 15 are equivalent to those in Table 2.

TABLE 15

| | SURFACE NUMBER | |
|---|---|---|
| | S31 | S32 |
| k | 0.000000E+00 | 0.000000E+00 |
| A1 | 0.000000E+00 | 0.000000E+00 |
| A2 | −3.511165E−04 | 3.939698E−03 |
| A3 | 8.599089E−05 | 1.584909E−04 |
| A4 | −4.725471E−05 | −6.230829E−05 |
| A5 | 1.306746E−06 | 2.673245E−06 |
| A6 | 1.361054E−08 | −4.280042E−08 |
| A7 | −7.904164E−10 | −3.856039E−10 |
| A8 | −1.336386E−11 | 1.734110E−11 |
| A9 | 3.599545E−13 | 1.350567E−13 |
| A10 | 4.402012E−15 | −9.456480E−15 |
| A11 | 2.337848E−16 | −9.588499E−17 |
| A12 | −9.075947E−18 | 3.169599E−18 |
| A13 | −4.963122E−20 | 4.719028E−20 |
| A14 | 4.212299E−22 | 1.484773E−21 |

TABLE 14

| Si (SURFACE NUMBER) | LENS | Ri (RADIUS OF CURVATURE) | Di (SURFACE INTERVAL) | Nd (REFRACTIVE INDEX) | vd (ABBE NUMBER) |
|---|---|---|---|---|---|
| OBJ | | Infinity | 0.483 | | |
| S1 | CG | Infinity | 2.997 | 1.5069 | 63.1 |
| S2 | | Infinity | 1.000 | | |
| S3 | PS | Infinity | 20.000 | 1.6204 | 60.3 |
| S4 | | Infinity | 5.000 | | |
| S5 | 201 | 293.512 | 4.300 | 1.8467 | 23.8 |
| S6 | | −55.691 | 0.200 | | |
| S7 | 202 | 25.142 | 9.300 | 1.5163 | 64.1 |
| S8 | | −73.948 | (a)2.790 (b)2.840 (c)2.700 | | |
| S9 | 203 | −74.228 | 2.000 | 1.8340 | 37.2 |
| S10 | 204 | 20.181 | 6.100 | 1.5163 | 64.1 |
| S11 | | −71.629 | 0.200 | | |
| S12 | 205 | 84.085 | 2.000 | 1.7174 | 29.5 |
| S13 | 206 | 11.847 | 8.700 | 1.6180 | 63.3 |
| S14 | 207 | −16.585 | 2.800 | 1.8467 | 23.8 |
| S15 | | −47.162 | 2.120 | | |
| S16 | | Infinity | 3.950 | | |
| S17 | 208 | −25.311 | 2.000 | 1.5688 | 56.4 |
| S18 | | 204.344 | (a)3.080 (b)3.120 (c)2.860 | | |
| S19 | 209 | 115.830 | 2.400 | 1.6204 | 60.3 |
| S20 | | 415.596 | (a)7.450 (b)7.360 (c)7.760 | | |
| S21 | 210 | −80.344 | 7.100 | 1.7234 | 38.0 |
| S22 | | −28.800 | 0.200 | | |
| S23 | 211 | 151.108 | 5.400 | 1.7234 | 38.0 |
| S24 | | −151.108 | 0.560 | | |
| S25 | 212 | 43.484 | 5.400 | 1.6385 | 55.4 |
| S26 | | 56.982 | 51.450 | | |
| S27 | 213 | −29.257 | 2.000 | 1.7234 | 38.0 |
| S28 | | 462.563 | 14.710 | | |
| S29 | 214 | −22.555 | 3.000 | 1.7234 | 38.0 |
| S30 | | −46.268 | 2.290 | | |
| S31※ | 215 | Infinity | 5.000 | 1.5311 | 56.0 |
| S32※ | | Infinity | (a)185.00 (b)206.70 (c)178.60 | | |
| IMA | | (a)Infinity (b)−1000.000 (c)1000.000 | | | |

TABLE 15-continued

| | SURFACE NUMBER | |
| --- | --- | --- |
| | S31 | S32 |
| A15 | 4.562578E−23 | 5.704599E−24 |
| A16 | 2.395440E−24 | −9.831649E−25 |
| A17 | 9.166723E−26 | −2.422356E−26 |
| A18 | 2.044916E−27 | −1.301762E−27 |
| A19 | −5.128536E−29 | −2.403149E−29 |
| A20 | −3.474356E−30 | 1.986309E−30 |

Table 16 shows respective parameters of this embodiment. From Table 16, it will be appreciated that the above described expressions (35) through (43) are satisfied.

TABLE 16

| PARAMETER | VALUE |
| --- | --- |
| Ma | 2.790 |
| Mb | 2.840 |
| Mc | 2.700 |
| Na | 3.080 |
| Nb | 3.120 |
| Nc | 2.860 |
| La | 185.000 |
| Lb | 206.700 |
| Lc | 178.600 |
| Oa | 185.000 |
| Ob | 182.900 |
| Oc | 207.800 |
| Lb − La | 21.700 |
| Lc − La | 6.400 |
| Ob − Oa | 2.100 |
| Oc − Oa | 22.800 |
| Mb − Ma | 0.050 |
| Ma − Mc | 0.090 |
| Nb − Na | 0.040 |
| Na − Nc | 0.220 |
| u3a | 1.155 |
| u3b | 1.071 |
| u3c | 1.189 |
| v3a | 1.461 |
| v3b | 1.473 |
| v3c | 1.317 |
| |u3b − u3a| | 0.084 |
| |v3b − v3a| | 0.012 |
| |u3c − u3a| | 0.034 |
| |v3c − v3a| | 0.144 |

Figure 35A:
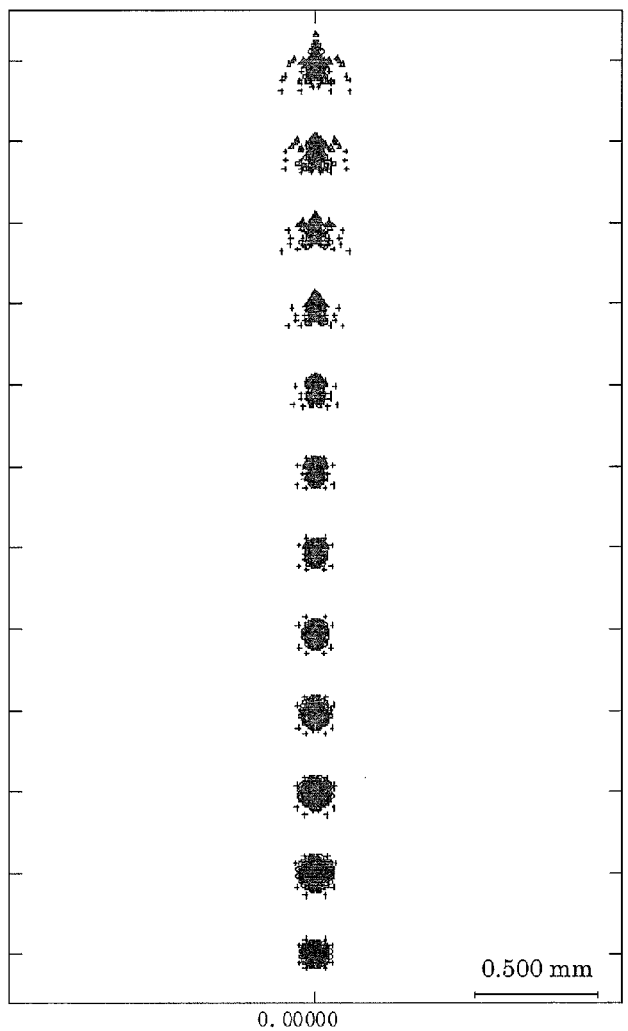
FIG. 35A is a diagram showing a spot diagram when the screen has the planar shape in Embodiment 5.
Figure 35C:
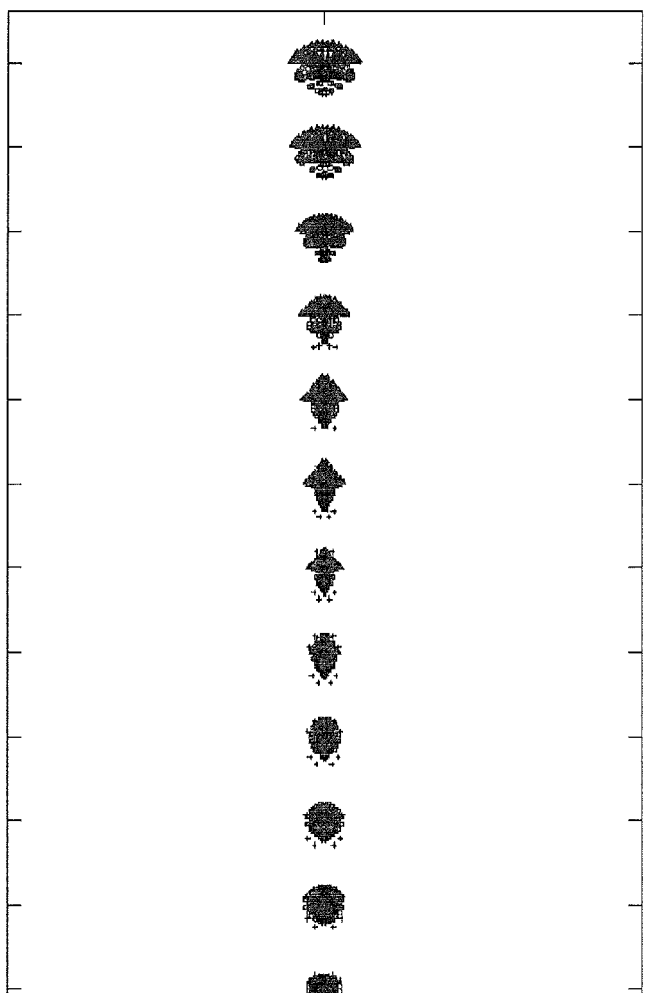
FIG. 35C is a diagram showing a spot diagram when the screen has the convex shape in Embodiment 5.

FIGS. 35A, 35B and 35C show spot diagrams on the screen respectively when the screen 5 has the planar shape, the concave shape to the projection optical system 500 side, and the convex shape to the projection optical system 500 side. Here, red light having a wavelength of 630 nm, green light having a wavelength of 530 nm, blue light having a wavelength of 460 nm are used. The ratio of the amounts of the red light, the green light and the blue light incident on the screen is set to 3:6:1.

From FIGS. 35A, 35B and 35C, a divergence of the spot is approximately less than or equal to a size of a pixel (0.15 mm). It is appreciated that satisfactory performance is obtained in all cases where the screen 5 is planar, concave and convex.

In this embodiment, a radius of curvature of the image surface is set to 1000 mm for either of the concave surface and the convex surface. However, as described above, the radius of curvature of the screen 5 may be arbitrarily set within the focal depth. Here, description has been made of the case where the screen 5 is made planar, concave and convex by adjusting the position of the lens. In this regard, satisfactory performance is obtained by adjusting the position of the lens so that an absolute value of the radius of curvature of the image surface is in a range from 1000 mm to infinity.

Further, in this embodiment, the sub-lens groups 111 and 112 respectively having negative and positive powers in the first lens group 1 are moved. However, it is also possible to move other lenses of the first lens group 1 as long as the same function is achieved.

As described above, the projection optical system 500 of Embodiment 5 of the present invention is able to change the curvature of the image surface (i.e., change the image surface to the planar, concave or convex surface) by moving the sub-lens group 111 and the sub-lens group 112. Further, the change in image size can be reduced by suitably setting the position of the screen 5. Therefore, it becomes possible to obtain the image surface that matches the desired screen shape and size. Further, since the image surface that matches the desired screen shape and size can be obtained, it becomes possible to suppress performance deterioration caused by defocusing of the image light.

In the above description, the on-axis light and the peripheral light have been described based on a tangential surface. However, the same can be said for intermediate light and for a sagittal surface. This is evident from satisfactory spot diagrams described above. That is, effects of the respective lenses and respective lens groups of the projection optical system continuously change from the on-axis light to the peripheral light. With regard to the second lens group, a focal position of the intermediate light exists between the on-axis light and the peripheral light. Therefore, the image surface can be made a smooth concave surface and a smooth convex surface.

In order for the lenses and the lens groups to achieve the above described effects on the on-axis light, the intermediate light and the peripheral light, it is preferred to optimize optical parameters such as thicknesses, surface shapes and intervals of the lenses by suitably using the above described expressions on the distances, convergent angles or the like as boundary conditions. Further, in order to more finely control the shape and position of the image surface, it is effective to make the lens surface aspherical.

In the above description, the image surface includes the optical axis. However, the image surface is not limited thereto. It is also possible that the image surface does not include the optical axis. For example, the display device may be disposed offset from the optical axis so as to perform oblique projection on the screen.

Further, in the above description, the image surface has been described to be a spherical surface. However, the image surface is not limited thereto. The image surface may be an aspherical surface or a free curved surface by changing lens parameters or applying a free curved surface lens.

Further, as described above, the screen shape is not limited to a spherical surface. As long as the screen surface intersects with light flux within the focal depth of the respective object points, the screen shape may be an aspherical surface or a free curved surface.

Further, the projection optical systems of the Embodiments 2 through 5 may be applied to, for example, the projection-type image display apparatus (FIG. 3) for use in vehicle described in Embodiment 1, and may also be applied to other projection-type image display apparatuses.

EXPLANATION OF MARKS 1, 1a, 1b, 1c . . . first lens group, 2, 2a, 2b, 2c . . . second lens group, 11, 12 . . . lens, 110, 111, 112 . . . sub-lens group, 21 . . . lens (first lens), 22 . . . lens (second lens), 3 . . . display device, 4 ... optical axis, 5, 51, 52, 53 ... screen, 6 ... light source, 7 ... light uniformizing element, 8 ... illumination optical element, P ... pupil, 10, 20, 30, 40, 50 ... projection-type image display apparatus, 100, 200, 300, 400, 500 ... projection optical system, 101 ... illumination optical system, PS ... total reflection prism.

What is claimed is:

1. A projection-type image display apparatus comprising:
a display device that generates image light, and
a projection optical system that projects the image light generated by the display device on a screen in an enlarged scale,
wherein the projection optical system is constituted by a first lens group including at least one lens and having a positive power as a whole, and a second lens group provided on the screen side of the first lens group, said second lens group including at least one lens and having a negative power as a whole,
wherein the second lens group includes a first lens and a second lens in an order from the display device side, both of the first lens and the second lens having negative powers,
wherein, of image light, light emitted from an intersection between the display device and an optical axis of the projection optical system is referred to as on-axis light, and light emitted from a periphery of the display device is referred to as peripheral light,
wherein when the first lens is moved toward the display device and the second lens is moved away from the display device with reference to positions of the first lens and the second lens in a direction of the optical axis when the image surface is planar, a focal position of the peripheral light becomes closer to the projection optical system in the direction of the optical axis than a focal position of the on-axis light, and the image surface is made concave to the projection optical system side,
wherein when the first lens is moved away from the display device and the second lens is moved toward the display device with reference to the positions of the first lens and the second lens in the direction of the optical axis when the image surface is planar, the focal position of the on-axis light becomes closer to the projection optical system in the direction of the optical axis than the focal position of the peripheral light, and the image surface is made convex to the projection optical system side,
wherein a curvature of the image surface formed by the projection optical system is changed by making the image surface convex and concave,
wherein when the image surface is concave to the projection optical system side, a convergent angle of the on-axis light incident on the first lens is expressed as $u1b$, a convergent angle of the on-axis light emitted from the first lens is expressed as $u2b$, a convergent angle of the on-axis light emitted from the second lens is expressed as $u3b$, a convergent angle of the peripheral light incident on the first lens is expressed as $v1b$, a convergent angle of the peripheral light emitted from the first lens is expressed as $v2b$, and a convergent angle of the peripheral light emitted from the second lens is expressed as $v3b$,
wherein when the image surface is convex to the projection optical system side, a convergent angle of the on-axis light incident on the first lens is expressed as $u1c$, a convergent angle of the on-axis light emitted from the first lens is expressed as $u2c$, a convergent angle of the on-axis light emitted from the second lens is expressed as $u3c$, a convergent angle of the peripheral light incident on the first lens is expressed as $v1c$, a convergent angle of the peripheral light emitted from the first lens is expressed as $v2c$, and a convergent angle of the peripheral light emitted from the second lens is expressed as $v3c$, and
wherein the following expressions are satisfied:

$$u2c > u2b,$$

$$u3c > u3b,$$

$$v2c > v2b,$$

$$v3c > v3b,$$

$$u1b - u2b > v1b - v2b,$$

$$u1c - u2c > v1c - v2c,$$

$$(U1c - u2c) - (v1c - v2c) > (u1b - u2b) - (v1b - v2b), \text{ and}$$

$$(V2c - v3c) - (u2c - u3c) > (v2b - v3b) - (u2b - u3b).$$

2. A projection-type image display apparatus comprising:
a display device that generates image light,
a projection optical system that projects the image light generated by the display device in an enlarged scale, and
a screen on which the image light is projected,
wherein the projection optical system is constituted by a first lens group including at least one lens and having a positive power as a whole, and a second lens group provided on the screen side of the first lens group, said second lens group including at least one lens and having a negative power as a whole,
wherein a curvature of an image surface formed by the projection optical system is changed in accordance with a shape of the screen by adjusting at least one lens among respective lenses constituting the first lens group and the second lens group in a direction of an optical axis,
wherein, when the image surface is concave to the projection optical system side, a focal position of on-axis light is located on a side opposite to the second lens group with reference to a focal position of the on-axis light when the image surface is planar,
wherein, when the image surface is convex to the projection optical system side, the focal position of the on-axis light is located on the same side as the second lens group with reference to the focal position of the on-axis light when the image surface is planar,
wherein light emitted by respective points on the display device intersects with a surface of the screen within a range of a focal depth,
wherein the first lens group is constituted by a first sub-lens group having a positive power, a second sub-lens group having a negative power, and a third sub-lens having a positive power, in an order from the display device side to the screen side,
wherein when the image surface is planar, a distance between the second lens group and a focal point of the on-axis light is expressed as La, a distance between the second lens group and a focal point of the peripheral light is expressed as Oa, a distance between the first sub-lens group and the second sub-lens group is expressed as Ma, and a distance between the second sub-lens group and the third sub-lens group is expressed as Na,
wherein when the image surface is concave, a distance between the second lens group and a focal point of the on-axis light is expressed as Lb, a distance between the second lens group and a focal point of the peripheral light is expressed as Ob, a distance between the first sub-lens group and the second sub-lens group is expressed as Mb, and a distance between the second sub-lens group and the third sub-lens group is expressed as Nb, wherein when the image surface is convex, a distance between the second lens group and a focal point of the on-axis light is expressed as Lc, a distance between the second lens group and a focal point of the peripheral light is expressed as Oc, a distance between the first sub-lens group and the second sub-lens group is expressed as Mc, and a distance between the second sub-lens group and the third sub-lens group is expressed as Nc, and wherein the following expressions are satisfied:

$|Lb-La|>|Ob-Oa|$, $|Lc-La|>|Oc-Oa|$, $Mb-Ma>Ma-Mc$, $Nb-Na>Na-Nc$, $|Lc-La|>|Lb-La|$, and $|Ob-Oa|>|Oc-Oa|$.

3. A projection-type image display apparatus comprising:
a display device that generates image light,
a projection optical system that projects the image light generated by the display device in an enlarged scale, and
a screen on which the image light is projected,
wherein the projection optical system is constituted by a first lens group including at least one lens and having a positive power as a whole, and a second lens group provided on the screen side of the first lens group, said second lens group including at least one lens and having a negative power as a whole,
wherein a curvature of an image surface formed by the projection optical system is changed in accordance with a shape of the screen by adjusting at least one lens among respective lenses constituting the first lens group and the second lens group in a direction of an optical axis,
wherein, when the image surface is concave to the projection optical system side, a focal position of on-axis light is located on a side opposite to the second lens group with reference to a focal position of the on-axis light when the image surface is planar,
wherein, when the image surface is convex to the projection optical system side, the focal position of the on-axis light is located on the same side as the second lens group with reference to the focal position of the on-axis light when the image surface is planar,
wherein light emitted by respective points on the display device intersects with a surface of the screen within a range of a focal depth,
when the display device generates image light of a rectangular shape, and when the image surface is concave and convex to the projection optical system side, any of profiles of images projected on the screen is inscribed by a profile of the image projected on the screen when the screen is planar.

4. The projection-type image display apparatus according to claim 1, wherein the image surface is made concave to the projection optical system side by moving at least one lens among lenses constituting the second lens group toward the display device with reference to positions of the respective lenses in the direction of the optical axis when the image plane is planar,
wherein the image surface is made convex to the projection optical system side by moving at least one lens among lenses constituting the second lens group away from the display device with reference to positions of the respective lenses in the direction of the optical axis when the image plane is planar.

5. The projection-type image display apparatus according to claim 2, wherein the image surface is made concave to the projection optical system side by moving at least one lens among lenses constituting the second lens group toward the display device with reference to positions of the respective lenses in the direction of the optical axis when the image plane is planar,
wherein the image surface is made convex to the projection optical system side by moving at least one lens among lenses constituting the second lens group away from the display device with reference to positions of the respective lenses in the direction of the optical axis when the image plane is planar.

6. The projection-type image display apparatus according to claim 3, wherein the image surface is made concave to the projection optical system side by moving at least one lens among lenses constituting the second lens group toward the display device with reference to positions of the respective lenses in the direction of the optical axis when the image plane is planar,
wherein the image surface is made convex to the projection optical system side by moving at least one lens among lenses constituting the second lens group away from the display device with reference to positions of the respective lenses in the direction of the optical axis when the image plane is planar.

7. The projection-type image display apparatus according to claim 2, wherein the image surface is made concave to the projection optical system side by moving at least one lens among lenses constituting the first lens group toward the display device with reference to positions of the respective lenses in the direction of the optical axis when the image plane is planar,
wherein the image surface is made convex to the projection optical system side by moving at least one lens among lenses constituting the first lens group away from the display device with reference to positions of the respective lenses in the direction of the optical axis when the image plane is planar.

8. The projection-type image display apparatus according to claim 3, wherein the image surface is made concave to the projection optical system side by moving at least one lens among lenses constituting the first lens group toward the display device with reference to positions of the respective lenses in the direction of the optical axis when the image plane is planar,
wherein the image surface is made convex to the projection optical system side by moving at least one lens among lenses constituting the first lens group away from the display device with reference to positions of the respective lenses in the direction of the optical axis when the image plane is planar.

9. The projection-type image display apparatus according to claim 2, wherein the image surface is made concave to the projection optical system side by moving at least one lens among lenses constituting the first lens group away from the display device and moving at least one lens among lenses constituting the second lens group toward the display device with reference to positions of the respective lenses in the direction of the optical axis when the image plane is planar, wherein the image surface is made convex to the projection optical system side by moving at least one lens among lenses constituting the first lens group toward the display device and moving at least one lens among lenses constituting the second lens group away from the display device with reference to positions of the respective lenses in the direction of the optical axis when the image plane is planar.

10. The projection-type image display apparatus according to claim 3, wherein the image surface is made concave to the projection optical system side by moving at least one lens among lenses constituting the first lens group away from the display device and moving at least one lens among lenses constituting the second lens group toward the display device with reference to positions of the respective lenses in the direction of the optical axis when the image plane is planar, wherein the image surface is made convex to the projection optical system side by moving at least one lens among lenses constituting the first lens group toward the display device and moving at least one lens among lenses constituting the second lens group away from the display device with reference to positions of the respective lenses in the direction of the optical axis when the image plane is planar.

11. The projection-type image display apparatus according to claim 2, wherein a curvature of the image surface formed by the projection optical system is changed in accordance with a shape of the screen by moving at least two lenses among lenses constituting the first lens group in the direction of the optical axis.

12. The projection-type image display apparatus according to claim 3, wherein a curvature of the image surface formed by the projection optical system is changed in accordance with a shape of the screen by moving at least two lenses among lenses constituting the first lens group in the direction of the optical axis.

13. The projection-type image display apparatus according to claim 2, wherein, of the image light, light emitted from an intersection between the display device and the optical axis of the projection optical system is referred to as on-axis light, and light emitted from a periphery of the display device is referred to as peripheral light, wherein when the image surface is planar, a convergent angle of the on-axis light emitted from the second lens group is expressed as $u3a$, and a convergent angle of the peripheral light emitted from the second lens group is expressed as $v3a$, wherein when the image surface is concave to the projection optical system side, a convergent angle of the on-axis light emitted from the second lens group is expressed as $u3b$, and a convergent angle of the peripheral light emitted from the second lens group is expressed as $v3b$, wherein when the image surface is convex to the projection optical system side, a convergent angle of the on-axis light emitted from the second lens group is expressed as $u3c$, and a convergent angle of the peripheral light emitted from the second lens group is expressed as $v3c$, and wherein the following expressions are satisfied:

$$|u3b-u3a|>|v3b-v3a|, \text{ and}$$

$$|u3c-u3a|>|v3c-v3a|.$$

14. The projection-type image display apparatus according to claim 3, wherein, of the image light, light emitted from an intersection between the display device and the optical axis of the projection optical system is referred to as on-axis light, and light emitted from a periphery of the display device is referred to as peripheral light, wherein when the image surface is planar, a convergent angle of the on-axis light emitted from the second lens group is expressed as $u3a$, and a convergent angle of the peripheral light emitted from the second lens group is expressed as $v3a$, wherein when the image surface is concave to the projection optical system side, a convergent angle of the on-axis light emitted from the second lens group is expressed as $u3b$, and a convergent angle of the peripheral light emitted from the second lens group is expressed as $v3b$, wherein when the image surface is convex to the projection optical system side, a convergent angle of the on-axis light emitted from the second lens group is expressed as $u3c$, and a convergent angle of the peripheral light emitted from the second lens group is expressed as $v3c$, and wherein the following expressions are satisfied:

$$|u3b-u3a|>|v3b-v3a|, \text{ and}$$

$$|u3c-u3a|>|v3c-v3a|.$$

15. The projection-type image display apparatus according to claim 2, wherein, of the image light, light emitted from an intersection between the display device and the optical axis of the projection optical system is referred to as on-axis light, and light emitted from a periphery of the display device is referred to as peripheral light, wherein when the image surface is planar, a convergent angle of the on-axis light emitted from the second lens group is expressed as $u3a$, and a convergent angle of the peripheral light emitted from the second lens group is expressed as $v3a$, wherein when the image surface is concave to the projection optical system side, a convergent angle of the on-axis light emitted from the second lens group is expressed as $u3b$, and a convergent angle of the peripheral light emitted from the second lens group is expressed as $v3b$, wherein when the image surface is convex to the projection optical system side, a convergent angle of the on-axis light emitted from the second lens group is expressed as $u3c$, and a convergent angle of the peripheral light emitted from the second lens group is expressed as $v3c$, and wherein the following expressions are satisfied:

$$|u3b-u3a|>|v3b-v3a|, \text{ and}$$

$$|u3c-u3a|<|v3c-v3a|.$$

16. The projection-type image display apparatus according to claim 3, wherein, of the image light, light emitted from an intersection between the display device and the optical axis of the projection optical system is referred to as on-axis light, and light emitted from a periphery of the display device is referred to as peripheral light, wherein when the image surface is planar, a convergent angle of the on-axis light emitted from the second lens group is expressed as $u3a$, and a convergent angle of the peripheral light emitted from the second lens group is expressed as $v3a$, wherein when the image surface is concave to the projection optical system side, a convergent angle of the on-axis light emitted from the second lens group is expressed as $u3b$, and a convergent angle of the peripheral light emitted from the second lens group is expressed as $v3b$, wherein when the image surface is convex to the projection optical system side, a convergent angle of the on-axis light emitted from the second lens group is expressed as $u3c$, and a convergent angle of the peripheral light emitted from the second lens group is expressed as $v3c$, and wherein the following expressions are satisfied:

$|u3b-u3a|>|v3b-v3a|$, and $|u3c-u3a|<|v3c-v3a|$.

17. The projection-type image display apparatus according to claim 2, when the display device generates image light of a rectangular shape, and when the image surface is concave and convex to the projection optical system side, any of profiles of images projected on the screen is inscribed by a profile of the image projected on the screen when the screen is planar.

18. The projection-type image display apparatus according to claim 3, when the display device generates image light of a rectangular shape, and when the image surface is concave and convex to the projection optical system side, any of profiles of images projected on the screen is inscribed by a profile of the image projected on the screen when the screen is planar.

19. The projection-type image display apparatus according to claim 2, further comprising an illumination optical system for illuminating the display device.

20. The projection-type image display apparatus according to claim 3, further comprising an illumination optical system for illuminating the display device.

* * * * *